US012486518B2

(12) United States Patent
Esteves et al.

(10) Patent No.: US 12,486,518 B2

(45) Date of Patent: Dec. 2, 2025

(54) BICISTRONIC AAV VECTORS ENCODING HEXOSAMINIDASE ALPHA AND BETA-SUBUNITS AND USES THEREOF

(71) Applicant: University of Massachusetts, Boston, MA (US)

(72) Inventors: Miguel Sena Esteves, Westford, MA (US); Diane Golebiowski, Billerica, MA (US)

(73) Assignee: University of Massachusetts, Westborough, MA (US)

( * ) Notice: Subject to any disclaimer, the term of this patent is extended or adjusted under 35 U.S.C. 154(b) by 980 days.

(21) Appl. No.: 17/046,756

(22) PCT Filed: Apr. 12, 2019

(86) PCT No.: PCT/US2019/027271

§ 371 (c)(1),
(2) Date: Oct. 9, 2020

(87) PCT Pub. No.: WO2019/200286

PCT Pub. Date: Oct. 17, 2019

(65) Prior Publication Data

US 2021/0095314 A1 Apr. 1, 2021

Related U.S. Application Data

(60) Provisional application No. 62/657,243, filed on Apr. 13, 2018.

(51) Int. Cl.

| | |
|---|---|
| ***C12N 15/86*** | (2006.01) |
| ***A61K 48/00*** | (2006.01) |
| ***A61P 25/00*** | (2006.01) |
| ***C12N 9/24*** | (2006.01) |

(52) U.S. Cl.

CPC .............. *C12N 15/86* (2013.01); *A61P 25/00* (2018.01); *C12N 9/2402* (2013.01); *C12Y 302/01052* (2013.01); *A61K 48/00* (2013.01); *C12N 2750/14143* (2013.01); *C12N 2830/50* (2013.01)

(58) Field of Classification Search

CPC .................. C12N 15/86; C12N 9/2402; C12N 2750/14143; C12N 2830/50; A61P 25/00; C12Y 302/01052; A61K 48/00

See application file for complete search history.

(56) References Cited

U.S. PATENT DOCUMENTS

| | | | | |
|---|---|---|---|---|
| 5,475,095 | A | 12/1995 | Myerowitz et al. | |
| 6,797,265 | B2 | 9/2004 | Amalfitano et al. | |
| 7,858,367 | B2 | 12/2010 | Amalfitano et al. | |
| 10,400,226 | B2 | 9/2019 | Ito et al. | |
| 11,020,443 | B2 | 6/2021 | Esteves et al. | |
| 2002/0164783 | A1 | 11/2002 | Feldhaus | |
| 2004/0192630 | A1* | 9/2004 | Kyrkanides ............ | C12N 15/86 514/44 R |
| 2008/0226615 | A1 | 9/2008 | Kyrkanides et al. | |
| 2012/0309050 | A1 | 12/2012 | Kumon et al. | |
| 2013/0090374 | A1 | 4/2013 | Sena-Esteves et al. | |
| 2015/0065560 | A1 | 3/2015 | Björklund et al. | |
| 2015/0258180 | A1 | 9/2015 | Mahuran et al. | |
| 2016/0243260 | A1 | 8/2016 | Blits | |
| 2016/0331846 | A1 | 11/2016 | Keimel et al. | |
| 2018/0028685 | A1 | 2/2018 | Walia et al. | |
| 2018/0311290 | A1 | 11/2018 | Esteves et al. | |
| 2019/0111157 | A1 | 4/2019 | Stanek et al. | |
| 2021/0228739 | A1 | 7/2021 | Esteves | |
| 2021/0381004 | A1 | 12/2021 | Esteves | |
| 2021/0393714 | A1 | 12/2021 | Sena-Esteves et al. | |

FOREIGN PATENT DOCUMENTS

| | | | | |
|---|---|---|---|---|
| AU | 2013202568 | | | 5/2013 |
| CN | 1429905 | | | 7/2003 |
| CN | 1429905 | A | * | 7/2003 |
| EP | 0669987 | B1 | | 8/2008 |
| EP | 1501465 | B1 | | 10/2009 |
| EP | 1620133 | B1 | | 12/2015 |
| EP | 2996475 | A1 | | 3/2016 |
| WO | WO 2003/092612 | | | 11/2003 |
| WO | WO 2008/154198 | | | 12/2008 |
| WO | WO 2010/027446 | | | 3/2010 |
| WO | WO 2012/145646 | | | 10/2012 |
| WO | WO 2012/177997 | | | 12/2012 |
| WO | WO 2014/061735 | | | 4/2014 |
| WO | WO 2016/172155 | | | 10/2016 |
| WO | WO 2017/136536 | | | 8/2017 |

OTHER PUBLICATIONS

Sato, M., et al., "Usefulness of double gene construct for rapid identification of transgenic mice exhibiting tissue-specific gene expression," Mol Reprod Dev 60(4): 446-456. (Year: 2001).*

Sladitschek, H. L., and Neveu, P. A., "Bidirectional Promoter Engineering for Single Cell MicroRNA Sensors in Embryonic Stem Cells," PLoS One 11(5): e0155177. doi: 10.1371/journal.pone.0155177. (Year: 2016).*

CN Office Action in Chinese Appln. No. 201980034667.4, dated Oct. 10, 2022, 13 pages (English translation).

CA Office Action in Canadian Appln. No. 3,096,102, dated Jul. 21, 2023, 6 pages.

Sargeant et al., "Adeno-associated virus-mediated expression of ß-hexosaminidase prevents neuronal loss in the Sandhoff mouse brain," Human Molecular Genetics, Nov. 15, 2011, 20(22):4371-80.

(Continued)

*Primary Examiner* — Tracy Vivlemore

(74) *Attorney, Agent, or Firm* — Fish & Richardson P.C.

(57) ABSTRACT

Aspects of the disclosure relate to bicistronic AAV nucleic acid constructs comprising a transgene encoding hexosaminidase A (HEXA) and hexosaminidase (HEXB) proteins. In some embodiments, the disclosure provides methods for treating or preventing lysosomal storage disorders, such as Tay-Sachs disease and Sandhoff disease, using bicistronic nucleic acid constructs described by the disclosure.

10 Claims, 9 Drawing Sheets

Specification includes a Sequence Listing.

(56) References Cited

OTHER PUBLICATIONS

EP Extended Search Report in European Appln. No. 1978280.0, dated Jan. 21, 2022, 6 pages.
Cheng, "Gene therapy for the neurological manifestations in lysosomal storage disorders," Journal of Lipid Research, Sep. 2014, 55(9):1827-38.
EP Office Action in European Appln. No. 16783726.9, dated Mar. 14, 2023, 5 pages.
Arfi et al., "Bicistronic lentiviral vector corrects β-hexosaminidase deficiency in transduced and cross-corrected human Sandhoff fibroblasts," Neurobiology of Disease, Nov. 1, 2005, 20(2):583-93.
Bradbury et al., "Biomarkers for disease progression and AAV therapeutic efficacy in feline Sandhoff disease," Experimental Neurology, Jan. 1, 2015, 263:102-12.
Bradbury et al., "Therapeutic response in feline sandhoff disease despite immunity to intracranial gene therapy," Molecular Therapy, Jul. 1, 2013, 21(7):1306-15.
CA Office Action in Canadian Appln. No. 3,019,315, dated Aug. 10, 2022, 6 pages.
Cork et al., "GM2 ganglioside lysosomal storage disease in cats with beta-hexosaminidase deficiency," Science, May 27, 1977, 196(4293):1014-7.
Corti et al., "MM. B-cell depletion is protective against anti-AAV capsid immune response: a human subject case study, Molecular Therapy-Methods & Clinical Development," Jan. 1, 2014, 1:14033.
Davidoff et al., "Sex significantly influences transduction of murine liver by recombinant adeno-associated viral vectors through an androgen-dependent pathway," Blood, Jul. 15, 2003, 102(2):480-8.
d'Azzo et al., "Faulty association of alpha-and beta-subunits in some forms of beta-hexosaminidase A deficiency," Journal of Biological Chemistry, Sep. 10, 1984, 259(17):11070-4.
De et al., "High levels of persistent expression of α1-antitrypsin mediated by the nonhuman primate serotype rh. 10 adeno-associated virus despite preexisting immunity to common human adeno-associated viruses," Molecular Therapy, Jan. 1, 2006, 13(1):67-76.
Dekaban et al., "Changes in brain weights during the span of human life: relation of brain weights to body heights and body weights," Annals of Neurology: Official Journal of the American Neurological Association and the Child Neurology Society, Oct. 1978, 4(4):345-56.
EP Extended Search Report in European Appln. No. 19868896.2, dated Jul. 27, 2022, 6 pages.
Gao et al., "Clades of Adeno-associated viruses are widely disseminated in human tissues," Journal of Virology, Jun. 15, 2004, 78(12):6381-8.
Golebiowski et al., "Direct intracranial injection of AAVrh8 encoding monkey β-N-acetylhexosaminidase causes neurotoxicity in the primate brain," Human Gene Therapy, Jun. 1, 2017, 28(6):510-22.
Gray-Edwards et al., "Adeno-associated virus gene therapy in a sheep model of Tay—Sachs disease," Human Gene Therapy, Mar. 1, 2018, 29(3):312-26.
Gray-Edwards et al., "Novel biomarkers of human GM1 gangliosidosis reflect the clinical efficacy of gene therapy in a feline model, " Molecular Therapy, Apr. 5, 2017, 25(4):892-903.
Lowe et al., "MRS reveals additional hexose N-acetyl resonances in the brain of a mouse model for Sandhoff disease," NMR in Biomedicine: An International Journal Devoted to the Development and Application of Magnetic Resonance In vivo, Dec. 2005, 18(8):517-26.
Maguire et al., "Mouse gender influences brain transduction by intravascularly administered AAV9," Molecular Therapy, Aug. 1, 2013, 21(8):1470-1.
Mahuran, "β-hexosaminidase: biosynthesis and processing of the normal enzyme, and identification of mutations causing Jewish Tay-Sachs discase," Clinical Biochemistry, Apr. 1, 1995, 28(2):101-6.
Mahuran, "Biochemical consequences of mutations causing the GM2 gangliosidoses," Biochimica et Biophysica Acta (BBA)-Molecular Basis of Disease, Oct. 8, 1999, 1455(2-3):105-38.
Matsuoka et al., "Therapeutic potential of intracerebroventricular replacement of modified human β-hexosaminidase B for GM2 gangliosidosis," Molecular Therapy, Jun. 1, 2011, 19(6):1017-24.
Mccarty et al., "Self-complementary recombinant adeno-associated virus (scAAV) vectors promote efficient transduction independently of DNA synthesis," Gene therapy, Aug. 2001, 8(16):1248-54.
McCurdy et al., "Widespread correction of central nervous system disease after intracranial gene therapy in a feline model of Sandhoff disease," Gene Therapy, Feb. 2015, 22(2):181-9.
Mendell et al., "Single-dose gene-replacement therapy for spinal muscular atrophy," New England Journal of Medicine, Nov. 2, 2017, 377(18):1713-22.
Okada et al., "Generalized gangliosidosis: beta-galactosidase deficiency," Science, May 31, 1968, 160(3831):1002-4.
Passini et al., "Combination brain and systemic injections of AAV provide maximal functional and survival benefits in the Niemann-Pick mouse," Proceedings of the National Academy of Sciences, May 29, 2007, 104(22):9505-10.
PCT International Preliminary Report on Patentability in International Appln. No. PCT/US2019/054649, dated Mar. 23, 2021, 10 pages.
PCT International Search Report and Written Opinion in International Appln. No. PCT/US2019/054649, dated Feb. 14, 2020, 15 pages.
Pfeifer et al., "Adeno-associated virus serotype 9-mediated pulmonary transgene expression: effect of mouse strain, animal gender and lung inflammation," Gene Therapy, Nov. 2011, 18(11):1034-42.
Proia et al., "Association of alpha-and beta-subunits during the biosynthesis of beta-hexosaminidase in cultured human fibroblasts," Journal of Biological Chemistry, Mar. 10, 1984, 259(5):3350-4.
Regier et al., "GLBI-Related Disorders," GeneReviews [Internet]. Seattle (WA): University of Washington, Seattle; 1993-2016, 42 pages.
Regier et al., "The GM1 and GM2 gangliosidoses: natural history and progress toward therapy," Pediatric Endocrinology Reviews: PER, Jun. 1, 2016, 13:663-73.
Rockwell et al., "AAV-mediated gene delivery in a feline model of Sandhoff disease corrects lysosomal storage in the central nervous system," ASN Neuro, Apr. 1, 2015, 7(2), 13 pages.
Sango et al., "Mice lacking both subunits of lysosomal β-hexosaminidase display gangliosidosis and mucopolysaccharidosis," Nature Genetics, Nov. 1996, 14(3):348-52.
Sango et al., "Mouse models of Tay-Sachs and Sandhoff diseases differ in neurologic phenotype and ganglioside metabolism," Nature Genetics, Oct. 1995, 11(2):170-6.
Sinici et al., "In cellulo examination of a beta-alpha hybrid construct of beta-hexosaminidase A subunits, reported to interact with the GM2 activator protein and hydrolyze GM2 ganglioside," PLoS One, Mar. 4, 2013, 8(3):e57908, 8 pages.
Suzuki, "β-Galactosidase deficiency (-galactosidosis): GM1 gangliosidosis and Morquio B disease," The Metabolic and Molecular Bases of Inherited Disease, 1995, 2785-823.
Tardieu et al., "Intracerebral gene therapy in children with mucopolysaccharidosis type IIIB syndrome: an uncontrolled phase 1/2 clinical trial," The Lancet Neurology, Sep. 1, 2017, 16(9):712-20.
Tropak et al., "Construction of a hybrid ß-hexosaminidase subunit capable of forming stable homodimers that hydrolyze GM2 ganglioside in vivo," Molecular Therapy—Methods & Clinical Development, Jan. 1, 2016, 3:15057, 9 pages.
Walia et al., "Long-term correction of Sandhoff disease following intravenous delivery of rAAV9 to mouse neonates," Molecular Therapy, Mar. 1, 2015, 23(3):414-22.
Wilken et al., "MRS of a child with Sandhoff disease reveals elevated brain hexosamine," European Journal of Paediatric Neurology, Jan. 1, 2008, 12(1):56-60.
Worgall et al., "Treatment of late infantile neuronal ceroid lipofuscinosis by CNS administration of a serotype 2 adeno-associated virus expressing CLN2 cDNA," Human Gene Therapy, May 1, 2008, 19(5):463-74.

(56) References Cited

OTHER PUBLICATIONS

Yamanaka et al., "Targeted disruption of the Hexa gene results in mice with biochemical and pathologic features of Tay-Sachs disease," Proceedings of the National Academy of Sciences, Oct. 11, 1994, 91(21):9975-9.
Baek et al., "AAV-mediated gene delivery in adult GM1-gangliosidosis mice corrects lysosomal storage in CNS and improves survival," PloS One, Oct. 18, 2010, 5(10), 16 pages.
Bera et al., "Bicistronic AAV Gene Therapy Vectors for Tay-Sachs Disease," Molecular Therapy, May 1, 2008, 16:S42.
Cachón-González et al., "Effective gene therapy in an authentic model of Tay-Sachs-related diseases," Proceedings of the National Academy of Sciences, Jul. 5, 2006, 103(27):10373-8.
Cachón-González et al., "Gene transfer corrects acute GM2 gangliosidosis—potential therapeutic contribution of perivascular enzyme flow." Molecular Therapy, Aug. 1, 2012, 20(8):1489-500.
Cachón-González et al., "Reversibility of neuropathology in Tay-Sachs-related diseases," Human Molecular Genetics, Feb. 1, 2014, 23(3):730-48.
Curtin et al., "Bidirectional promoter interference between two widely used internal heterologous promoters in a late-generation lentiviral construct," Gene Therapy, Mar. 2008, 15(5):384-90.
EP European Search Report in European Appln. No. 16783726.9, dated Nov. 7, 2018, 11 pages.
EP Office Action in European Appln. No. 16783726.9, dated Aug. 7, 2020, 7 pages.
EP Office Action in European Appln. No. 16783726.9, dated Dec. 6, 2019, 7 pages.
Golebiowski et al., "Optimization of AAV Vector Design for Safe Expression of β-N-Acetylhexosaminidase in the Brain for Tay-Sachs Disease Gene Therapy, " Molecular Therapy, May 1. 2015. 23:S283.
Guidotti et al., "Adenoviral gene therapy of the Tay-Sachs disease in hexosaminidase A-deficient knock-out mice," Human Molecular Genetics, May 1, 1999, 8(5):831-8.
Karumuthil-Melethil et al., "Novel vector design and hexosaminidase variant enabling self-complementary adeno-associated virus for the treatment of Tay-Sachs disease," Human Gene Therapy, Jul. 1, 2016, 27(7):509-21.
Lahey et al., "Pronounced therapeutic benefit of a single bidirectional AAV vector administered systemically in Sandhoff mice," Molecular Therapy, Oct. 7, 2020, 28(10):2150-60.
Martin-Duque et al., "Direct comparison of the insulating properties of two genetic elements in an adenoviral vector containing two different expression cassettes," Human Gene Therapy, Oct. 1, 2004 Oct. 1;15(10):995-1002.
McCurdy et al., "Sustained normalization of neurological disease after intracranial gene therapy in a feline model," Science Translational Medicine, Apr. 9, 2014, 6(231):231ra48, 24 pages.
Myerowitz et al., "Human beta-hexosaminidase alpha chain: coding sequence and homology with the beta chain," Proceedings of the National Academy of Sciences, Dec. 1, 1985, 82(23):7830-4.
PCT International Preliminary Report on Patentability in International Appln. No. PCT/US2016/028367, dated Oct. 24, 2017, 8 pages.
PCT International Preliminary Report on Patentability in International Appln. No. PCT/US2019/027271, dated Oct. 13, 2020, 8 pages.
PCT International Search Report and Written Opinion in International Appln. No. PCT/US2016/028367, dated Aug. 31, 2016, 24 pages.
PCT International Search Report and Written Opinion in PCT International Appln. No. PCT/US2019/027271, dated Sep. 11, 2019, pages.
PCT Invitation to Pay Additional Fees in International Appln. No. PCT/US2019/27271, dated Jun. 27, 2019, 3 pages.
Seo et al., "Evaluation of combinatorial cis-regulatory elements for stable gene expression in chicken cells." BMC Biotechnology, Dec. 1, 2010, 10(1):69, 8 pages.
Solovyeva et al., "New approaches to tay-sachs disease therapy," Frontiers in Physiology, Nov. 20. 2018. 9:1663, 11 pages.
Sondhi et al., "AAV2-mediated CLN2 gene transfer to rodent and non-human primate brain results in long-term TPP-I expression compatible with therapy for LINCL," Gene Therapy, Nov. 2005, 12(22):1618-32.
Weismann et al., "Systemic AAV9 gene transfer in adult GMI gangliosidosis mice reduces lysosomal storage in CNS and extends lifespan," Human Molecular Genetics, Aug. 1, 2015, 24(15):4353-64.
Weissman, "Approaches and Considerations Towards a Safe and Effective Adena-Associated Virus Mediated Therapeutic Intervention for GM 1-Gangliosidosis: A Dissertation," University Massachusetts Medical School. Aug. 5, 2014.
Woodley et al., "Efficacy of a bicistronic vector for correction of sandhoff disease in a mouse model," Molecular Therapy-Methods & Clinical Development, Mar. 15, 2019, 12:47-57.
Xu et al., "CMV-βactin promoter directs higher expression from an adeno-associated viral vector in the liver than the cytomegalovirus or elongation factor la promoter and results in therapeutic levels of human factor X in mice, " Human Gene Therapy, Mar. 20, 2001, 12(5):563-73.
Yang et al., "Intravascular Delivery of RAAVRH.8 Generates Widespreading Transduction of Neuronal and Glial Cell Types in Adult Mouse Central Nervous System, Abstract 626," Molecular Therapy, May 2012, Supplement 1, 1 page.
Generseq Accession No. ADT79424, "Human HexB (hexosaminidc, seB: DNA," Dec. 30, 2004, 3 pages.
Geneseq Accession No. BDJ35881, "Codon optirnized hexosarctinidase," Jan. 12, 2017, 3 pages.
Halder et al., "Structure of neurotropic adeno-associated virus AAVrh. 8," Journal of Structural Biology, Oct. 2015, 192(1):21-36.
CN Office Action in Chinese Appln. No. 201980080425.9, mailed on Dec. 28, 2023, 39 pages (with English translation).
Yang et al., "Global CNS Transduction of Adult Mice by Intravenously Delivered rAAVrh.8 and rAAVrh.10 and Nonhuman Primates by rAAVrh.10," Molecular Therapy, Jun. 24, 2014, 22(7):1299-1309.
Extended European Search Report in European Appln. No. 24214639.7, mailed on Feb. 19, 2025, 10 pages.
Maguire et al., "Gene Therapy for the Nervous System: Challenges and New Strategies," Neurotherapeutics, Aug. 27, 2014, 11(4):817-839.

* cited by examiner

FIGs. 6A-B

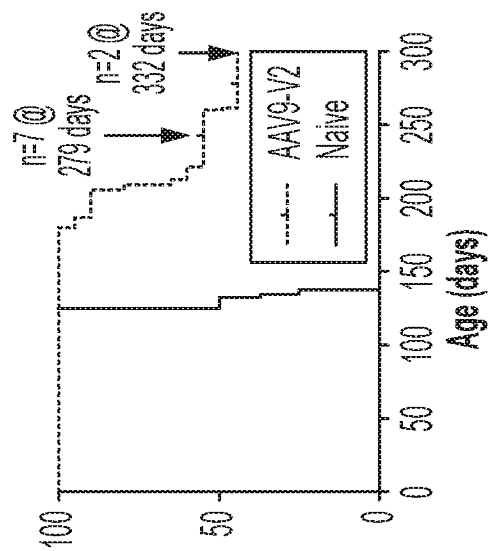
FIG. 9C
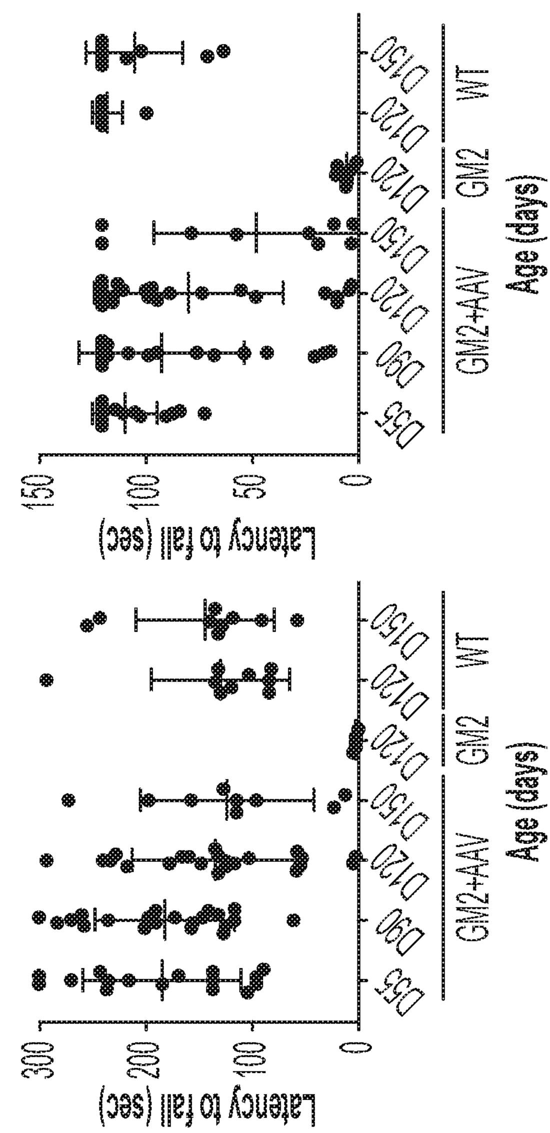
FIG. 9B
FIG. 9A

SEQUENCE LISTING

<160> NUMBER OF SEQ ID NOS: 9

<210> SEQ ID NO 1
<211> LENGTH: 529
<212> TYPE: PRT
<213> ORGANISM: Artificial Sequence
<220> FEATURE:
<223> OTHER INFORMATION: Synthetic polypeptide

<400> SEQUENCE: 1

```
Met Thr Ser Ser Arg Leu Trp Phe Ser Leu Leu Leu Ala Ala Ala Phe
1               5                   10                  15

Ala Gly Arg Ala Thr Ala Leu Trp Pro Trp Pro Gln Asn Phe Gln Thr
            20                  25                  30

Ser Asp Gln Arg Tyr Val Leu Tyr Pro Asn Asn Phe Gln Phe Gln Tyr
        35                  40                  45

Asp Val Ser Ser Ala Ala Gln Pro Gly Cys Ser Val Leu Asp Glu Ala
    50                  55                  60

Phe Gln Arg Tyr Arg Asp Leu Leu Phe Gly Ser Gly Ser Trp Pro Arg
65                  70                  75                  80
```

-continued

```
Pro Tyr Leu Thr Gly Lys Arg His Thr Leu Glu Lys Asn Val Leu Val
                85                  90                  95

Val Ser Val Val Thr Pro Gly Cys Asn Gln Leu Pro Thr Leu Glu Ser
            100                 105                 110

Val Glu Asn Tyr Thr Leu Thr Ile Asn Asp Asp Gln Cys Leu Leu Leu
        115                 120                 125

Ser Glu Thr Val Trp Gly Ala Leu Arg Gly Leu Glu Thr Phe Ser Gln
    130                 135                 140

Leu Val Trp Lys Ser Ala Glu Gly Thr Phe Phe Ile Asn Lys Thr Glu
145                 150                 155                 160

Ile Glu Asp Phe Pro Arg Phe Pro His Arg Gly Leu Leu Leu Asp Thr
                165                 170                 175

Ser Arg His Tyr Leu Pro Leu Ser Ser Ile Leu Asp Thr Leu Asp Val
            180                 185                 190

Met Ala Tyr Asn Lys Leu Asn Val Phe His Trp His Leu Val Asp Asp
        195                 200                 205

Pro Ser Phe Pro Tyr Glu Ser Phe Thr Phe Pro Glu Leu Met Arg Lys
    210                 215                 220

Gly Ser Tyr Asn Pro Val Thr His Ile Tyr Thr Ala Gln Asp Val Lys
225                 230                 235                 240

Glu Val Ile Glu Tyr Ala Arg Leu Arg Gly Ile Arg Val Leu Ala Glu
                245                 250                 255

Phe Asp Thr Pro Gly His Thr Leu Ser Trp Gly Pro Gly Ile Pro Gly
            260                 265                 270

Leu Leu Thr Pro Cys Tyr Ser Gly Ser Glu Pro Ser Gly Thr Phe Gly
        275                 280                 285

Pro Val Asn Pro Ser Leu Asn Asn Thr Tyr Glu Phe Met Ser Thr Phe
    290                 295                 300

Phe Leu Glu Val Ser Ser Val Phe Pro Asp Phe Tyr Leu His Leu Gly
305                 310                 315                 320

Gly Asp Glu Val Asp Phe Thr Cys Trp Lys Ser Asn Pro Glu Ile Gln
                325                 330                 335

Asp Phe Met Arg Lys Lys Gly Phe Gly Glu Asp Phe Lys Gln Leu Glu
            340                 345                 350

Ser Phe Tyr Ile Gln Thr Leu Leu Asp Ile Val Ser Ser Tyr Gly Lys
        355                 360                 365

Gly Tyr Val Val Trp Gln Glu Val Phe Asp Asn Lys Val Lys Ile Gln
    370                 375                 380

Pro Asp Thr Ile Ile Gln Val Trp Arg Glu Asp Ile Pro Val Asn Tyr
385                 390                 395                 400

Met Lys Glu Leu Glu Leu Val Thr Lys Ala Gly Phe Arg Ala Leu Leu
                405                 410                 415

Ser Ala Pro Trp Tyr Leu Asn Arg Ile Ser Tyr Gly Pro Asp Trp Lys
            420                 425                 430

Asp Phe Tyr Val Val Glu Pro Leu Ala Phe Glu Gly Thr Pro Glu Gln
        435                 440                 445

Lys Ala Leu Val Ile Gly Gly Glu Ala Cys Met Trp Gly Glu Tyr Val
    450                 455                 460

Asp Asn Thr Asn Leu Val Pro Arg Leu Trp Pro Arg Ala Gly Ala Val
465                 470                 475                 480

Ala Glu Arg Leu Trp Ser Asn Lys Leu Thr Ser Asp Leu Thr Phe Ala
                485                 490                 495

Tyr Glu Arg Leu Ser His Phe Arg Cys Glu Leu Leu Arg Arg Gly Val
```

```
            500                 505                 510

Gln Ala Gln Pro Leu Asn Val Gly Phe Cys Glu Gln Glu Phe Glu Gln
        515                 520                 525

Thr


<210> SEQ ID NO 2
<211> LENGTH: 556
<212> TYPE: PRT
<213> ORGANISM: Artificial Sequence
<220> FEATURE:
<223> OTHER INFORMATION: Synthetic polypeptide

<400> SEQUENCE: 2

Met Glu Leu Cys Gly Leu Gly Leu Pro Arg Pro Pro Met Leu Leu Ala
1               5                   10                  15

Leu Leu Leu Ala Thr Leu Leu Ala Ala Met Leu Ala Leu Leu Thr Gln
            20                  25                  30

Val Ala Leu Val Val Gln Val Ala Glu Ala Ala Arg Ala Pro Ser Val
        35                  40                  45

Ser Ala Lys Pro Gly Pro Ala Leu Trp Pro Leu Pro Leu Ser Val Lys
    50                  55                  60

Met Thr Pro Asn Leu Leu His Leu Ala Pro Glu Asn Phe Tyr Ile Ser
65                  70                  75                  80

His Ser Pro Asn Ser Thr Ala Gly Pro Ser Cys Thr Leu Leu Glu Glu
                85                  90                  95

Ala Phe Arg Arg Tyr His Gly Tyr Ile Phe Gly Phe Tyr Lys Trp His
            100                 105                 110

His Glu Pro Ala Glu Phe Gln Ala Lys Thr Gln Val Gln Gln Leu Leu
        115                 120                 125

Val Ser Ile Thr Leu Gln Ser Glu Cys Asp Ala Phe Pro Asn Ile Ser
    130                 135                 140

Ser Asp Glu Ser Tyr Thr Leu Leu Val Lys Glu Pro Val Ala Val Leu
145                 150                 155                 160

Lys Ala Asn Arg Val Trp Gly Ala Leu Arg Gly Leu Glu Thr Phe Ser
                165                 170                 175

Gln Leu Val Tyr Gln Asp Ser Tyr Gly Thr Phe Thr Ile Asn Glu Ser
            180                 185                 190

Thr Ile Ile Asp Ser Pro Arg Phe Ser His Arg Gly Ile Leu Ile Asp
        195                 200                 205

Thr Ser Arg His Tyr Leu Pro Val Lys Ile Ile Leu Lys Thr Leu Asp
    210                 215                 220

Ala Met Ala Phe Asn Lys Phe Asn Val Leu His Trp His Ile Val Asp
225                 230                 235                 240

Asp Gln Ser Phe Pro Tyr Gln Ser Ile Thr Phe Pro Glu Leu Ser Asn
                245                 250                 255

Lys Gly Ser Tyr Ser Leu Ser His Val Tyr Thr Pro Asn Asp Val Arg
            260                 265                 270

Met Val Ile Glu Tyr Ala Arg Leu Arg Gly Ile Arg Val Leu Pro Glu
        275                 280                 285

Phe Asp Thr Pro Gly His Thr Leu Ser Trp Gly Lys Gly Gln Lys Asp
    290                 295                 300

Leu Leu Thr Pro Cys Tyr Ser Arg Gln Asn Lys Leu Asp Ser Phe Gly
305                 310                 315                 320

Pro Ile Asn Pro Thr Leu Asn Thr Thr Tyr Ser Phe Leu Thr Thr Phe
                325                 330                 335
```

```
Phe Lys Glu Ile Ser Glu Val Phe Pro Asp Gln Phe Ile His Leu Gly
            340                 345                 350

Gly Asp Glu Val Glu Phe Lys Cys Trp Glu Ser Asn Pro Lys Ile Gln
        355                 360                 365

Asp Phe Met Arg Gln Lys Gly Phe Gly Thr Asp Phe Lys Lys Leu Glu
    370                 375                 380

Ser Phe Tyr Ile Gln Lys Val Leu Asp Ile Ile Ala Thr Ile Asn Lys
385                 390                 395                 400

Gly Ser Ile Val Trp Gln Glu Val Phe Asp Asp Lys Ala Lys Leu Ala
                405                 410                 415

Pro Gly Thr Ile Val Glu Val Trp Lys Asp Ser Ala Tyr Pro Glu Glu
            420                 425                 430

Leu Ser Arg Val Thr Ala Ser Gly Phe Pro Val Ile Leu Ser Ala Pro
        435                 440                 445

Trp Tyr Leu Asp Leu Ile Ser Tyr Gly Gln Asp Trp Arg Lys Tyr Tyr
    450                 455                 460

Lys Val Glu Pro Leu Asp Phe Gly Gly Thr Gln Lys Gln Lys Gln Leu
465                 470                 475                 480

Phe Ile Gly Gly Glu Ala Cys Leu Trp Gly Glu Tyr Val Asp Ala Thr
                485                 490                 495

Asn Leu Thr Pro Arg Leu Trp Pro Arg Ala Ser Ala Val Gly Glu Arg
            500                 505                 510

Leu Trp Ser Ser Lys Asp Val Arg Asp Met Asp Asp Ala Tyr Asp Arg
        515                 520                 525

Leu Thr Arg His Arg Cys Arg Met Val Glu Arg Gly Ile Ala Ala Gln
    530                 535                 540

Pro Leu Tyr Ala Gly Tyr Cys Asn His Glu Asn Met
545                 550                 555
```

<210> SEQ ID NO 3
<211> LENGTH: 7681
<212> TYPE: DNA
<213> ORGANISM: Artificial Sequence
<220> FEATURE:
<223> OTHER INFORMATION: Synthetic polynucleotide

<400> SEQUENCE: 3

```
ttggccactc cctctctgcg cgctcgctcg ctcactgagg ccgggcgacc aaaggtcgcc     60

cgacgcccgg gctttgcccg ggcggcctca gtgagcgagc gagcgcgcag agagggagtg    120

gccaactcca tcactagggg ttcctagatc tgaattctac cacatttgta gaggttttac    180

ttgctttaaa aaacctccca catctccccc tgaacctgaa acataaaatg aatgcaattg    240

ttgttgttaa cttgtttatt gcagcttata atggttacaa ataaagcaat agcatcacaa    300

atttcacaaa taaagcattt ttttcactgc attctagttg tggtttgtcc aaactcatca    360

atgtatctta tcatgtctgt cgaggcggcc gctcaggtct gctcaaattc ctgctcacag    420

aatccgacat tcaggggctg tgcctgcacg cctctcctca gcagctcgca cctgaagtgg    480

ctcagccttt cgtaagcgaa tgtcagatca gaggtcagct tgttggacca cagtctctcg    540

gccactgctc cggccctggg ccacagtcgt gggaccagat tggtgttgtc cacatactcg    600

ccccacatac atgcttcgcc cccgatgacc agagctttct gctcaggagt cccttcaaag    660

gccaggggct ccacaatgta gaaatccttc cagtctggtc catatgagat cctgttcagg    720

taccaagggg cactcagcag tgctcggaag ccagcttttg tcaccagttc cagctccttc    780
```

-continued

```
atataattga caggaatatc ctcgcgccac acttgaatga tggtatcggg ctggattttg    840
accttgttgt caaacacttc ctgccagacc acatagccct ttccgtatga actcacaatg    900
tccagcagag tctggatgta gaaactctcc agctgcttga agtcttcgcc gaaccctttc    960
ttccgcataa agtcctggat ctctggatta gacttccaac atgtgaaatc cacttcgtct   1020
ccgcccaggt gcagataaaa gtcagggaag acagaggaca cctccagaaa gaatgtagac   1080
atgaactcgt aggtattgtt cagggatggg ttcacaggtc cgaaggtgcc gcttggctca   1140
ctcccagagt agcaaggagt cagcagtccg ggaattcctg ggccccagct cagagtatgg   1200
ccaggtgtat cgaattcagc cagcactcga atccccctca gtcgggcata ctcgatgact   1260
tctttcacgt cctgggcggt atagatgtga gtcacgggat tgtagctgcc cttgcgcatc   1320
agctctggaa atgtgaagct ttcgtaagga aatgagggat cgtcgaccag atgccagtgg   1380
aacacgttca gcttgttata agccatcaca tccagagtgt ccagaatgct tgacaggggc   1440
aggtaatgtc tagatgtatc cagcagcagc cccggtgtgg gaaatctagg gaagtcttcg   1500
atctcagttt tgttgataaa gaatgttccc tcggctgact tccagaccag ctgactgaaa   1560
gtctccaggc ccctcagtgc cccccacact gtttcggaca gcagcagaca ctgatcgtca   1620
ttgattgtca gggtatagtt ctccacggat tccagggtgg gcagctgatt gcagcctgga   1680
gtgaccacgc tgaccaccag cacgtttttc tccagggtgt ggcgcttccc agtcagatag   1740
ggccgtggcc aggacccgct tccaaacagc agatcgcggt accgctggaa tgcctcgtcc   1800
aggacgctgc atcctggctg agcggcgctg ctcacgtcgt actgaaactg gaaattgttt   1860
ggatacagca cgtacctctg gtcagatgtc tggaagttct gaggccatgg ccacagggcg   1920
gttgctcgtc cagcaaatgc agcggccagc agcagggaga accacagtct ggagctggtc   1980
atggtggctt tatcgatact agcgctagag cttgctcccg cccgccgcgc gcttcgcttt   2040
ttatagggcc gccgccgccg ccgcctcgcc ataaaaggaa actttcggag cgcgccgctc   2100
tgattggctg ccgccgcacc tctccgcctc gccccgcccc gcccctcgcc cccatcgctg   2160
cacaaaataa ttaaaaaata aataaataca aaattggggg tggggagggg ggggagatgg   2220
ggagagtgaa gcagaacgtg gcctcggatc cccgggctg cagtattaat agtaatcaat   2280
tacggggtca ttagttcata gcccatatat ggagttccgc gttacataac ttacggtaaa   2340
tggcccgcct ggctgaccgc ccaacgaccc ccgcccattg acgtcaataa tgacgtatgt   2400
tcccatagta acgccaatag ggactttcca ttgacgtcaa tgggtggagt atttacggta   2460
aactgcccac ttggcagtac atcaagtgta tcatatgcca agtacgcccc ctattgacgt   2520
caatgacggt aaatggcccg cctggcatta tgcccagtac atgaccttat gggactttcc   2580
tacttggcag tacatctacg tattagtcat cgctattacc atgtcgaggc cacgttctgc   2640
ttcactctcc ccatctcccc cccctcccca cccccaattt tgtatttatt tatttttaa   2700
ttattttgtg cagcgatggg ggcgaggggc ggggcggggc gaggcggaga ggtgcggcgg   2760
cagccaatca gagcggcgcg ctccgaaagt ttccttttat ggcgaggcgg cggcggcggc   2820
ggccctataa aaagcgaagc gcgcggcggg cgggagcaag ctcgctagca ctagtggagc   2880
accatggagc tgtgcgggct ggggctgccc cggccgccca tgctgctggc gctgctgttg   2940
gcgacactgc tggcggcgat gttggcgctg ctgactcagg tggcgctggt ggtgcaggtg   3000
gcggaggcgg ctcgggcccc gagcgtctcg gccaagccgg ggccggcgct gtggcccctg   3060
ccgctctcgg tgaagatgac cccgaacctg ctgcatctcg ccccggagaa cttctacatc   3120
agccacagcc ccaattccac ggcgggcccc tcctgcaccc tgctggagga agcgtttcga   3180
```

```
cgatatcatg gctatatttt tggtttctac aagtggcatc atgaacctgc tgaattccag   3240

gctaaaaccc aggttcagca acttcttgtc tcaatcaccc ttcagtcaga gtgtgatgct   3300

ttccccaaca tatcttcaga tgagtcttat actttacttg tgaaagaacc agtggctgtc   3360

cttaaggcca acagagtttg gggagcatta cgaggtttag agacctttag ccagttagtt   3420

tatcaagatt cttatggaac tttcaccatc aatgaatcca ccattattga ttctccaagg   3480

ttttctcaca gaggaatttt gattgataca tccagacatt atctgccagt taagattatt   3540

cttaaaactc tggatgccat ggcttttaat aagtttaatg ttcttcactg gcacatagtt   3600

gatgaccagt ctttcccata tcagagcatc acttttcctg agttaagcaa taaaggaagc   3660

tattctttgt ctcatgttta tacaccaaat gatgtccgta tggtgattga atatgccaga   3720

ttacgaggaa ttcgagtcct gccagaattt gataccoctg ggcatacact atcttgggga   3780

aaaggtcaga aagacctcct gactccatgt tacagtagac aaaacaagtt ggactctttt   3840

ggacctataa accctactct gaatacaaca tacagcttcc ttactacatt tttcaaagaa   3900

attagtgagg tgtttccaga tcaattcatt catttgggag gagatgaagt ggaatttaaa   3960

tgttgggaat caaatccaaa aattcaagat ttcatgaggc aaaaaggctt tggcacagat   4020

tttaagaaac tagaatcttt ctacattcaa aaggttttgg atattattgc aaccataaac   4080

aagggatcca ttgtctggca ggaggttttt gatgataaag caaagcttgc gccgggcaca   4140

atagttgaag tatggaaaga cagcgcatat cctgaggaac tcagtagagt cacagcatct   4200

ggcttccctg taatcctttc tgctccttgg tacttagatt tgattagcta tggacaagat   4260

tggaggaaat actataaagt ggaacctctt gattttggcg gtactcagaa acagaaacaa   4320

cttttcattg gtggagaagc ttgtctatgg ggagaatatg tggatgcaac taacctcact   4380

ccaagattat ggcctcgggc aagtgctgtt ggtgagagac tctggagttc caaagatgtc   4440

agagatatgg atgacgccta tgacagactg acaaggcacc gctgcaggat ggtcgaacgt   4500

ggaatagctg cacaacctct ttatgctgga tattgtaacc atgagaacat gtaactcgag   4560

gcggccgctc tagagatctt tttccctctg ccaaaaatta tggggacatc atgaagcccc   4620

ttgagcatct gacttctggc taataaagga aatttatttt cattgcaata gtgtgttgga   4680

atttttttgtg tctctcactc ggcatgctgg ggagagatct aggaacccct agtgatggag   4740

ttggccactc cctctctgcg cgctcgctcg ctcactgagg ccgcccgggc aaagcccggg   4800

cgtcgggcga cctttggtcg cccggcctca gtgagcgagc gagcgcgcag agagggagtg   4860

gccatgcagc cagctggcgt aatagcgaag aggcccgcac cgatcgccct tcccaacagt   4920

tgcgtagcct gaatggcgaa tggcgcgacg cgccctgtag cggcgcatta agcgcggcgg   4980

gtgtggtggt tacgcgcagc gtgaccgcta cacttgccag cgccctagcg cccgctcctt   5040

tcgctttctt cccttccttt ctcgccacgt tcgccggctt tccccgtcaa gctctaaatc   5100

gggggctccc tttagggttc cgatttagtg ctttacggca cctcgacccc aaaaaacttg   5160

attagggtga tggttcacgt agtgggccat cgccctgata gacggttttt cgccctttga   5220

cgttggagtc cacgttcttt aatagtggac tcttgttcca aactggaaca acactcaacc   5280

ctatctcggt ctattctttt gatttataag ggattttgcc gatttcggcc tattggttaa   5340

aaaatgagct gatttaacaa aaatttaacg cgaattttaa caaaatatta acgtttacaa   5400

tttcctgatg cggtattttc tccttacgca tctgtgcggt atttcacacc gcatatggtg   5460

cactctcagt acaatctgct ctgatgccgc atagttaagc cagccccgac acccgccaac   5520
```

-continued

```
acccgctgac gcgccctgac gggcttgtct gctcccggca tccgcttaca gacaagctgt   5580

gaccgtctcc gggagctgca tgtgtcagag gttttcaccg tcatcaccga aacgcgcgag   5640

acgaaagggc ctcgtgatac gcctattttt ataggttaat gtcatgataa taatggtttc   5700

ttagacgtca ggtggcactt ttcggggaaa tgtgcgcgga acccctattt gtttattttt   5760

ctaaatacat tcaaatatgt atccgctcat gagacaataa ccctgataaa tgcttcaata   5820

atattgaaaa aggaagagta tgagtattca acatttccgt gtcgccctta ttcccttttt   5880

tgcggcattt tgccttcctg tttttgctca cccagaaacg ctggtgaaag taaaagatgc   5940

tgaagatcag ttgggtgcac gagtgggtta catcgaactg gatctcaaca gcggtaagat   6000

ccttgagagt tttcgccccg aagaacgttt tccaatgatg agcactttta aagttctgct   6060

ctattctcag aatgacttgg ttgagtactc accagtcaca gaaaagcatc ttacggatgg   6120

catgacgtaa gagaattatg cagtgctgcc ataaccatga gtgataacac tgcggccaac   6180

ttacttctga caacgatcgg aggaccgaag gagctaaccg cttttttgca caacatgggg   6240

gatcatgtaa ctcgccttga tcgttgggaa ccggagctga atgaagccat accaaacgac   6300

gagcgtgaca ccacgatgcc tgtagcaatg gcaacaacgt tgcgcaaact attaactggc   6360

gaactactta ctctagcttc ccggcaacaa ttaatagact ggatggaggc ggataaagtt   6420

gcaggaccac ttctgcgctc ggcccttccg gctggctggt ttattgctga taaatctgga   6480

gccggtgagc gtgggtctcg cggtatcatt gcagcactgg ggccagatgg taagccctcc   6540

cgtatcgtag ttatctacac gacggggagt caggcaacta tggatgaacg aaatagacag   6600

atcgctgaga taggtgcctc actgattaag cattggtaac tgtcagacca agtttactca   6660

tatatacttt agattgattt aaaacttcat ttttaattta aaaggatcta ggtgaagatc   6720

ctttttgata atctcatgac caaaatccct taacgtgagt tttcgttcca ctgagcgtca   6780

gaccccgtag aaaagatcaa aggatcttct tgagatcctt tttttctgcg cgtaatctgc   6840

tgcttgcaaa caaaaaaacc accgctacca gcggtggttt gtttgccgga tcaagagcta   6900

ccaactcttt ttccgaaggt aactggcttc agcagagcgc agataccaaa tactgtcctt   6960

ctagtgtagc cgtagttagg ccaccacttc aagaactctg tagcaccgcc tacatacctc   7020

gctctgctaa tcctgttacc agtggctgct gccagtggcg ataagtcgtg tcttaccggg   7080

ttggactcaa gacgatagtt accggataag gcgcagcggt cgggctgaac ggggggttcg   7140

tgcacacagc ccagcttgga gcgaacgacc tacaccgaac tgagatacct acagcgtgag   7200

cattgagaaa gcgccacgct tcccgaaggg agaaaggcgg acaggtatcc ggtaagcggc   7260

agggtcggaa caggagagcg cacgagggag cttccagggg gaaacgcctg gtatctttat   7320

agtcctgtcg ggtttcgcca cctctgactt gagcgtcgat ttttgtgatg ctcgtcaggg   7380

gggcggagcc tatggaaaaa cgccagcaac gcggcctttt tacggttcct ggccttttgc   7440

tggccttttg ctcacatgtt ctttcctgcg ttatcccctg attctgtgga taaccgtatt   7500

accgcctttg agtgagctga taccgctcgc cgcagccgaa cgaccgagcg cagcgagtca   7560

gtgagcgagg aagcggaaga gcgcccaata cgcaaaccgc ctctccccgc gcgttggccg   7620

attcattaat gcagctgggc tgcagggggg gggggggggg ggtggggggg gggggggggg   7680

g                                                                   7681
```

<210> SEQ ID NO 4
<211> LENGTH: 7676
<212> TYPE: DNA
<213> ORGANISM: Artificial Sequence
<220> FEATURE:
<223> OTHER INFORMATION: Synthetic polynucleotide

<400> SEQUENCE: 4

```
ttggccactc cctctctgcg cgctcgctcg ctcactgagg ccgggcgacc aaaggtcgcc     60
cgacgcccgg gctttgcccg ggcggcctca gtgagcgagc gagcgcgcag agagggagtg    120
gccaactcca tcactagggg ttcctagatc tgaattctac cacatttgta gaggttttac    180
ttgctttaaa aaacctccca catctccccc tgaacctgaa acataaaatg aatgcaattg    240
ttgttgttaa cttgtttatt gcagcttata atggttacaa ataaagcaat agcatcacaa    300
atttcacaaa taaagcattt ttttcactgc attctagttg tggtttgtcc aaactcatca    360
atgtatctta tcatgtctgt cgaggcggcc gctcaggtct gctcaaattc ctgctcacag    420
aatccgacat tcaggggctg tgcctgcacg cctctcctca gcagctcgca cctgaagtgg    480
ctcagccttt cgtaagcgaa tgtcagatca gaggtcagct tgttggacca cagtctctcg    540
gccactgctc cggccctggg ccacagtcgt gggaccagat tggtgttgtc cacatactcg    600
ccccacatac atgcttcgcc cccgatgacc agagctttct gctcaggagt cccttcaaag    660
gccaggggct ccacaatgta gaaatccttc cagtctggtc catatgagat cctgttcagg    720
taccaagggg cactcagcag tgctcggaag ccagcttttg tcaccagttc cagctccttc    780
atataattga caggaatatc ctcgcgccac acttgaatga tggtatcggg ctggattttg    840
accttgttgt caaacacttc ctgccagacc acatagccct ttccgtatga actcacaatg    900
tccagcagag tctggatgta gaaactctcc agctgcttga agtcttcgcc gaaccctttc    960
ttccgcataa agtcctggat ctctggatta gacttccaac atgtgaaatc cacttcgtct   1020
ccgcccaggt gcagataaaa gtcagggaag acagaggaca cctccagaaa gaatgtagac   1080
atgaactcgt aggtattgtt cagggatggg ttcacaggtc cgaaggtgcc gcttggctca   1140
ctcccagagt agcaaggagt cagcagtccg ggaattcctg ggccccagct cagagtatgg   1200
ccaggtgtat cgaattcagc cagcactcga atccccctca gtcgggcata ctcgatgact   1260
tctttcacgt cctgggcggt atagatgtga gtcacgggat tgtagctgcc cttgcgcatc   1320
agctctggaa atgtgaagct ttcgtaagga aatgagggat cgtcgaccag atgccagtgg   1380
aacacgttca gcttgttata agccatcaca tccagagtgt ccagaatgct tgacaggggc   1440
aggtaatgtc tagatgtatc cagcagcagc ccccggtgtg gaaatctagg gaagtcttcg   1500
atctcagttt tgttgataaa gaatgttccc tcggctgact tccagaccag ctgactgaaa   1560
gtctccaggc ccctcagtgc cccccacact gtttcggaca gcagcagaca ctgatcgtca   1620
ttgattgtca gggtatagtt ctccacggat tccagggtgg gcagctgatt gcagcctgga   1680
gtgaccacgc tgaccaccag cacgtttttc tccagggtgt ggcgcttccc agtcagatag   1740
ggccgtggcc aggacccgct tccaaacagc agatcgcggt accgctggaa tgcctcgtcc   1800
aggacgctgc atcctggctg agcggcgctg ctcacgtcgt actgaaactg gaaattgttt   1860
ggatacagca cgtacctctg gtcagatgtc tggaagttct gaggccatgg ccacagggcg   1920
gttgctcgtc cagcaaatgc agcggccagc agcagggaga accacagtct ggagctggtc   1980
atggtggctt tatcgatact agcgctagag cttgctcccg cccgccgcgc gcttcgcttt   2040
ttatagggcc gccgccgccg ccgcctcgcc ataaaaggaa actttcggag cgcgccgctc   2100
tgattggctg ccgccgcacc tctccgcctc gccccgcccc gcccctcgcc cccatcgctg   2160
cacaaaataa ttaaaaaata aataaataca aaattggggg tggggagggg ggggagatgg   2220
```

```
ggagagtgaa gcagaacgtg gcctcggatc ccccgggctg cagtattaat agtaatcaat   2280
tacggggtca ttagttcata gcccatatat ggagttccgc gttacataac ttacggtaaa   2340
tggcccgcct ggctgaccgc ccaacgaccc ccgcccattg acgtcaataa tgacgtatgt   2400
tcccatagta acgccaatag ggactttcca ttgacgtcaa tgggtggagt atttacggta   2460
aactgcccac ttggcagtac atcaagtgta tcatatgcca agtacgcccc ctattgacgt   2520
caatgacggt aaatggcccg cctggcatta tgcccagtac atgaccttat gggactttcc   2580
tacttggcag tacatctacg tattagtcat cgctattacc atgtcgaggc cacgttctgc   2640
ttcactctcc ccatctcccc cccctcccca cccccaattt tgtatttatt tattttttaa   2700
ttattttgtg cagcgatggg ggcgaggggc ggggcggggc gaggcggaga ggtgcggcgg   2760
cagccaatca gagcggcgcg ctccgaaagt ttccttttat ggcgaggcgg cggcggcggc   2820
ggccctataa aaagcgaagc gcgcggcggg cgggagcaag ctcgctagca ctagtggagc   2880
accatggagc tgtgcgggct ggggctgccc cggccgccca tgctgctggc gctgctgttg   2940
gcgacactgc tggcggcgat gttggcgctg ctgactcagg tggcgctggt ggtgcaggtg   3000
gcggaggcgg ctcgggcccc gagcgtctcg gccaagccgg ggccggcgct gtggcccctg   3060
ccgctctcgg tgaagatgac ccgaacctg ctgcatctcg ccccggagaa cttctacatc    3120
agccacagcc ccaattccac ggcgggcccc tcctgcaccc tgctggagga agcgtttcga   3180
cgatatcatg gctatatttt tggtttctac aagtggcatc atgaacctgc tgaattccag   3240
gctaaaaccc aggttcagca acttcttgtc tcaatcaccc ttcagtcaga gtgtgatgct   3300
ttccccaaca tatcttcaga tgagtcttat actttacttg tgaaagaacc agtggctgtc   3360
cttaaggcca acagagtttg ggagcattaa cgaggtttag agacctttag ccagttagtt   3420
tatcaagatt cttatggaac tttcaccatc aatgaatcca ccattattga ttctccaagg   3480
ttttctcaca gaggaatttt gattgataca tccagacatt atctgccagt taagattatt   3540
cttaaaactc tggatgccat ggcttttaat aagtttaatg ttcttcactg gcacatagtt   3600
gatgaccagt ctttcccata tcagagcatc acttttcctg agttaagcaa taaaggaagc   3660
tattctttgt ctcatgttta tacaccaaat gatgtccgta tggtgattga atatgccaga   3720
ttacgaggaa ttcgagtcct gccagaattt gataccccctg ggcatacact atcttgggga  3780
aaaggtcaga aagacctcct gactccatgt tacagtagac aaaacaagtt ggactctttt   3840
ggacctataa accctactct gaatacaaca tacagcttcc ttactacatt tttcaaagaa   3900
attagtgagg tgtttccaga tcaattcatt catttgggag gagatgaagt ggaatttaaa   3960
tgttgggaat caaatccaaa aattcaagat ttcatgaggc aaaaaggctt tggcacagat   4020
tttaagaaac tagaatcttt ctacattcaa aaggttttgg atattattgc aaccataaac   4080
aagggatcca ttgtctggca ggaggttttt gatgataaag caaagcttgc gccgggcaca   4140
atagttgaag tatggaaaga cagcgcatat cctgaggaac tcagtagagt cacagcatct   4200
ggcttccctg taatcctttc tgctccttgg tacttagatt tgattagcta tggacaagat   4260
tggaggaaat actataaagt ggaacctctt gattttggcg gtactcagaa acagaaacaa   4320
cttttcattg gtggagaagc ttgtctatgg ggagaatatg tggatgcaac taacctcact   4380
ccaagattat ggcctcgggc aagtgctgtt ggtgagagac tctggagttc caaagatgtc   4440
agagatatgg atgacgccta tgacagactg acaaggcacc gctgcaggat ggtcgaacgt   4500
ggaatagctg cacaacctct ttatgctgga tattgtaacc atgagaacat gtaactcgag   4560
gcggccgctc tagagatctt tttccctctg ccaaaaatta tggggacatc atgaagcccc   4620
```

```
ttgagcatct gacttctggc taataaagga aatttatttt cattgcaata gtgtgttgga   4680
atttttgtg tctctcactc ggcatgctgg ggagagatct aggaacccct agtgatggag    4740
ttggccactc cctctctgcg cgctcgctcg ctcactgagg ccgcccgggc aaagcccggg   4800
cgtcgggcga cctttggtcg cccggcctca gtgagcgagc gagcgcgcag agagggagtg   4860
gccatgcagc cagctggcgt aatagcgaag aggcccgcac cgatcgccct tcccaacagt   4920
tgcgtagcct gaatggcgaa tggcgcgacg cgccctgtag cggcgcatta agcgcggcgg   4980
gtgtggtggt tacgcgcagc gtgaccgcta cacttgccag cgccctagcg cccgctcctt   5040
tcgctttctt cccttccttt ctcgccacgt tcgccggctt tccccgtcaa gctctaaatc   5100
gggggctccc tttagggttc cgatttagtg ctttacggca cctcgacccc aaaaaacttg   5160
attagggtga tggttcacgt agtgggccat cgccctgata gacggttttt cgccctttga   5220
cgttggagtc cacgttcttt aatagtggac tcttgttcca aactggaaca acactcaacc   5280
ctatctcggt ctattctttt gatttataag ggattttgcc gatttcggcc tattggttaa   5340
aaaatgagct gatttaacaa aaatttaacg cgaattttaa caaaatatta acgtttacaa   5400
tttcctgatg cggtattttc tccttacgca tctgtgcggt atttcacacc gcatatggtg   5460
cactctcagt acaatctgct ctgatgccgc atagttaagc cagccccgac acccgccaac   5520
acccgctgac gcgccctgac gggcttgtct gctcccggca tccgcttaca gacaagctgt   5580
gaccgtctcc gggagctgca tgtgtcagag gttttcaccg tcatcaccga aacgcgcgag   5640
acgaaagggc ctcgtgatac gcctattttt ataggttaat gtcatgataa taatggtttc   5700
ttagacgtca ggtggcactt ttcggggaaa tgtgcgcgga acccctattt gtttattttt   5760
ctaaatacat tcaaatatgt atccgctcat gagacaataa ccctgataaa tgcttcaata   5820
atattgaaaa aggaagagta tgagtattca acatttccgt gtcgccctta ttcccttttt   5880
tgcggcattt tgccttcctg tttttgctca cccagaaacg ctggtgaaag taaaagatgc   5940
tgaagatcag ttgggtgcac gagtgggtta catcgaactg gatctcaaca gcggtaagat   6000
ccttgagagt tttcgccccg aagaacgttt tccaatgatg agcactttta aagttctgct   6060
atgtggcgcg gtattatccc gtattgacgc cgggcaagag caactcggtc gccgcataca   6120
ctattcagaa tgacttggtg agtactcacc agtcacagaa aagcatctta cggatggcat   6180
gacagtaaga gaattatgca gtgctgccat aaccatgagt gataacactg cggccaactt   6240
acttctgaca acgatcggag gaccgaagga gctaaccgct tttttgcaca acatggggga   6300
tcatgtaact cgccttgatc gttgggaacc ggagctgaat gaagccatac caaacgacga   6360
gcgtgacacc acgatgcctg tagcaatggc aacaacgttg cgcaaactat taactggcga   6420
actacttact ctagcttccc ggcaacaatt aatagactgg atggaggcgg ataaagttgc   6480
aggaccactt ctgcgctcgg cccttccggc tggctggttt attgctgata aatctggagc   6540
cggtgagcgt gggtctcgcg gtatcattgc agcactgggg ccagatggta agccctcccg   6600
tatcgtagtt atctacacga cggggagtca ggcaactatg gatgaacgaa atagacagat   6660
cgctgagata ggtgcctcac tgattaagca ttggtaactg tcagaccaag tttactcata   6720
tatactttag attgatttaa aacttcattt ttaatttaaa aggatctagg tgagatcctt   6780
tttgataatc tcatgaccaa aatcccttaa cgtgagtttt cgttccactg agcgtcagac   6840
cccgtagaaa agatcaaagg atcttcttga gatccttttt ttctgcgcgt aatctgctgc   6900
ttgcaaacaa aaaaaccacc gctaccagcg gtggtttgtt tgccggatca agagctacca   6960
```

```
actcttttc cgaaggtaac tggcttcagc agagcgcaga taccaaatac tgtccttcta   7020

gtgtagccgt agttaggcca ccacttcaag aactctgtag caccgcctac atacctcgct   7080

ctgctaatcc tgttaccagt ggctgctgcc agtggcgata agtcgtgtct taccgggttg   7140

gactcaagac gatagttacc ggataaggcg cagcggtcgg gctgaacggg gggttcgcat   7200

tgagaaagcg ccacgcttcc cgaagggaga aaggcggaca ggtatccggt aagcggcagg   7260

gtcggaacag gagagcgcac gagggagctt ccagggggaa acgcctggta tctttatagt   7320

cctgtcgggt ttcgccacct ctgacttgag cgtcgatttt tgtgatgctc gtcagggggg   7380

cggagcctat ggaaaaacgc cagcaacgcg gcctttttacg gttcctggcc ttttgctggc   7440

cttttgctca catgttcttt cctgcgttat cccctgattc tgtggataac cgtattaccg   7500

cctttgagtg agctgatacc gctcgccgca gccgaacgac cgagcgcagc gagtcagtga   7560

gcgaggaagc ggaagagcgc ccaatacgca aaccgcctct ccccgcgcgt tggccgattc   7620

attatgcagc tgggctgcag gggggggggg gggggggtgg gggggggggg gggggg       7676
```

<210> SEQ ID NO 5
<211> LENGTH: 7741
<212> TYPE: DNA
<213> ORGANISM: Artificial Sequence
<220> FEATURE:
<223> OTHER INFORMATION: Synthetic polynucleotide

<400> SEQUENCE: 5

```
ttggccactc cctctctgcg cgctcgctcg ctcactgagg ccgggcgacc aaaggtcgcc     60

cgacgcccgg gctttgcccg ggcggcctca gtgagcgagc gagcgcgcag agagggagtg    120

gccaactcca tcactagggg ttcctagatc tgaattctac cacatttgta gaggttttac    180

ttgctttaaa aaacctccca catctccccc tgaacctgaa acataaaatg aatgcaattg    240

ttgttgttaa cttgtttatt gcagcttata atggttacaa ataaagcaat agcatcacaa    300

atttcacaaa taaagcattt ttttcactgc attctagttg tggtttgtcc aaactcatca    360

atgtatctta tcatgtctgt cgaggcggcc gctcaggtct gctcaaattc ctgctcacag    420

aatccgacat tcaggggctg tgcctgcacg cctctcctca gcagctcgca cctgaagtgg    480

ctcagccttt cgtaagcgaa tgtcagatca gaggtcagct tgttggacca cagtctctcg    540

gccactgctc cggccctggg ccacagtcgt gggaccagat tggtgttgtc cacatactcg    600

ccccacatac atgcttcgcc cccgatgacc agagctttct gctcaggagt cccttcaaag    660

gccaggggct ccacaatgta gaaatccttc cagtctggtc catatgagat cctgttcagg    720

taccaagggg cactcagcag tgctcggaag ccagcttttg tcaccagttc cagctccttc    780

atataattga caggaatatc ctcgcgccac acttgaatga tggtatcggg ctggattttg    840

accttgttgt caaacacttc ctgccagacc acatagccct ttccgtatga actcacaatg    900

tccagcagag tctggatgta gaaactctcc agctgcttga agtcttcgcc gaacccttc    960

ttccgcataa agtcctggat ctctggatta gacttccaac atgtgaaatc cacttcgtct   1020

ccgcccaggt gcagataaaa gtcagggaag acagaggaca cctccagaaa gaatgtagac   1080

atgaactcgt aggtattgtt cagggatggg ttcacaggtc cgaaggtgcc gcttggctca   1140

ctcccagagt agcaaggagt cagcagtccg ggaattcctg ggccccagct cagagtatgg   1200

ccaggtgtat cgaattcagc cagcactcga atccccctca gtcgggcata ctcgatgact   1260

tctttcacgt cctgggcggt atagatgtga gtcacgggat tgtagctgcc cttgcgcatc   1320

agctctggaa atgtgaagct ttcgtaagga aatgagggat cgtcgaccag atgccagtgg   1380
```

```
aacacgttca gcttgttata agccatcaca tccagagtgt ccagaatgct tgacaggggc   1440
aggtaatgtc tagatgtatc cagcagcagc ccccggtgtg gaaatctagg gaagtcttcg   1500
atctcagttt tgttgataaa gaatgttccc tcggctgact tccagaccag ctgactgaaa   1560
gtctccaggc ccctcagtgc cccccacact gtttcggaca gcagcagaca ctgatcgtca   1620
ttgattgtca gggtatagtt ctccacggat tccagggtgg gcagctgatt gcagcctgga   1680
gtgaccacgc tgaccaccag cacgtttttc tccagggtgt ggcgcttccc agtcagatag   1740
ggccgtggcc aggacccgct tccaaacagc agatcgcggt accgctggaa tgcctcgtcc   1800
aggacgctgc atcctggctg agcggcgctg ctcacgtcgt actgaaactg gaaattgttt   1860
ggatacagca cgtacctctg gtcagatgtc tggaagttct gaggccatgg ccacagggcg   1920
gttgctcgtc cagcaaatgc agcggccagc agcagggaga accacagtct ggagctggtc   1980
atggtggctt tatcgatact agcgctagag cttgctcccg cccgccgcgc gcttcgcttt   2040
ttatagggcc gccgccgccg ccgcctcgcc ataaaaggaa actttcggag cgcgccgctc   2100
tgattggctg ccgccgcacc tctccgcctc gccccgcccc gcccctcgcc cccatcgctg   2160
cacaaaataa ttaaaaaata aataaataca aaattggggg tggggagggg ggggagatgg   2220
ggagagtgaa gcagaacgtg gcctcggatc ccccgggctg cagtattaat agtaatcaat   2280
tacggggtca ttagttcata gcccatatat ggagttccgc gttacataac ttacggtaaa   2340
tggcccgcct ggctgaccgc ccaacgaccc ccgcccattg acgtcaataa tgacgtatgt   2400
tcccatagta acgccaatag ggactttcca ttgacgtcaa tgggtggagt atttacggta   2460
aactgcccac ttggcagtac atcaagtgta tcatatgcca agtacgcccc ctattgacgt   2520
caatgacggt aaatggcccg cctggcatta tgcccagtac atgaccttat gggactttcc   2580
tacttggcag tacatctacg tattagtcat cgctattacc atgtcgaggc cacgttctgc   2640
ttcactctcc ccatctcccc cccctcccca cccccaattt tgtatttatt tattttttaa   2700
ttattttgtg cagcgatggg ggcgaggggc ggggcggggc gaggcggaga ggtgcggcgg   2760
cagccaatca gagcggcgcg ctccgaaagt ttccttttat ggcgaggcgg cggcggcggc   2820
ggccctataa aaagcgaagc gcgcggcggg cgggagcaag ctcgctagca ctagtaaagc   2880
caccatggaa ctgtgcggac tgggactgcc tagacccccct atgctgctgg ctctgctgct   2940
ggctaccctg ctggctgcta tgctggccct gctgactcag gtggccctgg tggtccaggt   3000
cgcagaggca gctagggctc cttcagtgag cgcaaagcca ggacctgccc tgtggccact   3060
gccactgtcc gtgaaaatga caccaaacct gctgcacctg gcccccgaaa atttctacat   3120
ctcccattct cctaacagta cagcagggcc atcatgcact ctgctggagg aagccttccg   3180
gagataccac gggtatattt tcggcttcta caagtggcac catgagcccg cagaatttca   3240
ggccaaaacc caggtgcagc agctgctggt cagcatcaca ctgcagtccg agtgtgacgc   3300
tttcccaaat attagctccg atgagagcta caccctgctg gtgaaggaac ccgtggctgt   3360
cctgaaagca aacagagtct ggggcgcact gagggggctg gagacattct cccagctggt   3420
gtaccaggac tcttacggaa catttactat caacgaatcc actatcatcg actcccctag   3480
gttttctcac cgcggcatcc tgattgatac ttctcgccat tacctgccag tgaagatcat   3540
tctgaaaacc ctggatgcaa tggccttcaa caagtttaat gtgctgcact ggcatatcgt   3600
cgacgatcag tctttccctt accagagtat tacatttcca gagctgagta ataaaggcag   3660
ttactcactg agccacgtgt atactccaaa cgacgtgaga atggtcatcg agtatgccag   3720
```

```
gctgcgcgga attagggtgc tgccagaatt cgatactccc ggccataccc tgtcttgggg   3780
caaggggcag aaagacctgc tgaccccctg ctacagtcgg cagaacaagc tggattcatt   3840
cggccctatc aacccaacac tgaataccac atactctttt ctgactacct tctttaagga   3900
gatcagtgaa gtgttccccg accagtttat tcacctgggc ggggatgagg tcgaattcaa   3960
gtgttgggag agcaatccta aatccagga ctttatgaga cagaagggat tcggcaccga   4020
cttcaagaaa ctggaatcat tctacattca gaaggtgctg gacatcattg ccacaatcaa   4080
caaagggagc atcgtgtggc aggaggtctt tgacgataag gccaaactgg ctcccggaac   4140
tatcgtggaa gtctggaagg atagcgccta tcctgaggaa ctgtcacgcg tgaccgctag   4200
cggctttccc gtcatcctga gcgcaccttg gtacctggac ctgatttcct atgggcagga   4260
ttggcgaaag tactataaag tggagcccct ggacttcgga ggcacccaga agcagaaaca   4320
gctgtttatc gggggagagg cctgcctgtg gggggaatac gtggatgcta ccaatctgac   4380
accacgactg tggcctcggg ctagcgcagt gggagagcgc ctgtggtcta gtaaggacgt   4440
gcgggatatg gacgatgcct atgaccggct gacccgacat cggtgtagaa tggtggaacg   4500
gggcattgcc gctcagccac tgtatgccgg gtactgtaat cacgaaaata tgtgactcga   4560
ggcggccgct ctagagatct tttccctct gccaaaaatt atggggacat catgaagccc   4620
cttgagcatc tgacttctgg ctaataaagg aaatttattt tcattgcaat agtgtgttgg   4680
aatttttgt gtctctcact cggcatgctg gggagagatc taggaacccc tagtgatgga   4740
gttggccact ccctctctgc gcgctcgctc gctcactgag gccgcccggg caaagcccgg   4800
gcgtcgggcg acctttggtc gcccggcctc agtgagcgag cgagcgcgca gagagggagt   4860
ggccatgcag ccagctggcg taatagcgaa gaggcccgca ccgatcgccc ttcccaacag   4920
ttgcgtagcc tgaatggcga atggcgcgac gcgccctgta gcggcgcatt aagcgcggcg   4980
ggtgtggtgg ttacgcgcag cgtgaccgct acacttgcca gcgccctagc gcccgctcct   5040
ttcgctttct tcccttcctt tctcgccacg ttcgccggct ttccccgtca agctctaaat   5100
cgggggctcc ctttagggtt ccgatttagt gctttacggc acctcgaccc caaaaaactt   5160
gattagggtg atggttcacg tagtgggcct cgccctgata gacggttttt cgccctttga   5220
cgttggagtc cacgttcttt aatagtggac tcttgttcca aactggaaca acactcaacc   5280
ctatctcggt ctattctttt gatttataag ggattttgcc gatttcggcc tattggttaa   5340
aaaatgagct gatttaacaa aaatttaacg cgaattttaa caaaatatta acgtttacaa   5400
tttcctgatg cggtattttc tccttacgca tctgtgcggt atttcacacc gcatatggtg   5460
cactctcagt acaatctgct ctgatgccgc atagttaagc cagccccgac acccgccaac   5520
acccgctgac gcgccctgac gggcttgtct gctcccggca tccgcttaca gacaagctgt   5580
gaccgtctcc gggagctgca tgtgtcagag gttttcaccg tcatcaccga aacgcgcgag   5640
acgaaagggc ctcgtgatac gcctattttt ataggttaat gtcatgataa taatggtttc   5700
ttagacgtca ggtggcactt ttcggggaaa tgtgcgcgga acccctattt gtttattttt   5760
ctaaatacat tcaaatatgt atccgctcat gagacaataa ccctgataaa tgcttcaata   5820
atattgaaaa aggaagagta tgagtattca acatttccgt gtcgccctta ttcccttttt   5880
tgcggcattt tgccttcctg tttttgctca cccagaaacg ctggtgaaag taaaagatgc   5940
tgaagatcag ttgggtgcag agtgggttac atcgaactgg atctcaacag cggtaagatc   6000
cttgagagtt ttcgccccga agaacgtttt ccaatgatga gcacttttaa agttctgcta   6060
tgtggcgcgg tattatcccg tattgacgcc gggcaagagc aactcggtcg ccgcatacac   6120
```

tattctcaga atgacttggt tgagtactca ccagtcacag aaaagcatct tacggatggc 6180
atgacagtaa gagaattatg cagtgctgcc ataaccatga gtgataacac tgcggccaac 6240
ttacttctga caacgatcgg aggaccgaag gagctaaccg cttttttgca caacatgggg 6300
gatcatgtaa ctcgccttga tcgttgggaa ccggagctga atgaagccat accaaacgac 6360
gagcgtgaca ccacgatgcc tgtagcaatg gcaacaacgt tgcgcaaact attaactggc 6420
gaactactta ctctagcttc ccggcaacaa ttaatagact ggatggaggc ggataaagtt 6480
gcaggaccac ttctgcgctc ggcccttccg gctggctggt ttattgctga taaatctgga 6540
gccggtgagc gtgggtctcg cggtatcatt gcagcactgg ggccagatgg taagccctcc 6600
cgtatcgtag ttatctacac gacggggagt caggcaacta tggatgaacg aaatagacag 6660
atcgctgaga taggtgcctc actgattaag cattggtaac tgtcagacca agtttactca 6720
tatatacttt agattgattt aaaacttcat ttttaattta aaaggatcta ggtgaagatc 6780
ctttttgata atctcatgac caaaatccct taacgtgagt tttcgttcca ctgagcgtca 6840
gaccccgtag aaaagatcaa aggatcttct tgagatcctt tttttctgcg cgtaatctgc 6900
tgcttgcaaa caaaaaaacc accgctacca gcggtggttt gtttgccgga tcaagagcta 6960
ccaactcttt ttccgaaggt aactggcttc agcagagcgc agataccaaa tactgtcctt 7020
ctagtgtagc cgtagttagg ccaccacttc aagaactctg tagcaccgcc tacatacctc 7080
gctctgctaa tcctgttacc agtggctgct gccagtggcg ataagtcgtg tcttaccggg 7140
ttggactcaa gacgatagtt accggataag gcgcagcggt cgggctgaac ggggggttcg 7200
tgcacacagc ccagcttgga gcgaacgacc tacaccgaac tgagatacct acagcgtgag 7260
cattgagaaa gcgccacgct tcccgaaggg agaaaggcgg acaggtatcc ggtaagcggc 7320
agggtcggaa caggagagcg cacgagggag cttccagggg gaaacgcctg gtatctttat 7380
agtcctgtcg ggtttcgcca cctctgactt gagcgtcgat ttttgtgatg ctcgtcaggg 7440
gggcggagcc tatggaaaaa cgccagcaac gcggcctttt tacggttcct ggccttttgc 7500
tggccttttg ctcacatgtt ctttcctgcg ttatcccctg attctgtgga taaccgtatt 7560
accgcctttg agtgagctga taccgctcgc cgcagccgaa cgaccgagcg cagcgagtca 7620
gtgagcgagg aagcggaaga gcgcccaata cgcaaaccgc ctctccccgc gcgttggccg 7680
attcattaat gcagctgggc tgcagggggg gggggggggg ggtggggggg gggggggggg 7740
g 7741

<210> SEQ ID NO 6
<211> LENGTH: 7090
<212> TYPE: DNA
<213> ORGANISM: Artificial Sequence
<220> FEATURE:
<223> OTHER INFORMATION: Synthetic polynucleotide

<400> SEQUENCE: 6
ttggccactc cctctctgcg cgctcgctcg ctcactgagg ccgggcgacc aaaggtcgcc 60
cgacgcccgg gctttgcccg ggcggcctca gtgagcgagc gagcgcgcag agagggagtg 120
gccaactcca tcactagggg ttcctagatc tgaattcctg gagccggtgt caggttgctc 180
cggtaacggt gacgtgcacg cgtgggcgga gccatcacgc aggttgctat ataagcagag 240
ctcgtttagt gaaccgtcag aatcgatcca ccatggccgg ctgcaggctc tgggtttcgc 300
tgctgctggc ggcggcgttg gcttgcttgg ccacggcact gtggccgtgg ccccagtaca 360

```
tccaaaccta ccaccggcgc tacaccctgt accccaacaa cttccagttc cggtaccatg    420
tcagttcggc cgcgcaggcg ggctgcgtcg tcctcgacga ggcctttcga cgctaccgta    480
acctgctctt cggttccggc tcttggcccc gacccagctt ctcaaataaa cagcaaacgt    540
tggggaagaa cattctggtg gtctccgtcg tcacagctga atgtaatgaa tttcctaatt    600
tggagtcggt agaaaattac accctaacca ttaatgatga ccagtgttta ctcgcctctg    660
agactgtctg ggcgctctc cgaggtctgg agactttcag tcagcttgtt tggaaatcag    720
ctgagggcac gttctttatc aacaagacaa agattaaaga ctttcctcga ttccctcacc    780
ggggcgtact gctggataca tctcgccatt acctgccatt gtctagcatc ctggatacac    840
tggatgtcat ggcatacaat aaattcaacg tgttccactg gcacttggtg gacgactctt    900
ccttcccata tgagagcttc actttcccag agctcaccag aaaggggtcc ttcaaccctg    960
tcactcacat ctacacagca caggatgtga aggaggtcat tgaatacgca aggcttcggg   1020
gtatccgtgt gctggcagaa tttgacactc ctggccacac tttgtcctgg gggccaggtg   1080
cccctgggtt attaacacct tgctactctg ggtctcatct ctctggcaca tttggaccgg   1140
tgaaccccag tctcaacagc acctatgact tcatgagcac actcttcctg gagatcagct   1200
cagtcttccc ggacttttat ctccacctgg gaggggatga agtcgacttc acctgctgga   1260
agtccaaccc caacatccag gccttcatga agaaaaaggg ctttactgac ttcaagcagc   1320
tggagtcctt ctacatccag acgctgctgg acatcgtctc tgattatgac aagggctatg   1380
tggtgtggca ggaggtattt gataataaag tgaaggttcg gccagataca atcatacagg   1440
tgtggcggga agaaatgcca gtagagtaca tgttggagat gcaagatatc accagggctg   1500
gcttccgggc cctgctgtct gctccctggt acctgaaccg tgtaaagtat ggccctgact   1560
ggaaggacat gtacaaagtg gagcccctgg cgtttcatgg tacgcctgaa cagaaggctc   1620
tggtcattgg aggggaggcc tgtatgtggg gagagtatgt ggacagcacc aacctggtcc   1680
ccagactctg gcccagagcg ggtgccgtcg ctgagagact gtggagcagt aacctgacaa   1740
ctaatataga ctttgccttt aaacgtttgt cgcatttccg ttgtgagctg gtgaggagag   1800
gaatccaggc ccagcccatc agtgtaggct actgtgagca ggagtttgag cagacttgag   1860
cggccgcgac tagagctcgc tgatcagcct cgactgtgcc ttctagttgc cagccatctg   1920
ttgtttgccc ctcccccgtg ccttccttga ccctggaagg tgccactccc actgtccttt   1980
cctaataaaa tgaggaaatt gcatcgcatt gtctgagtag gtgtcattct attctggggg   2040
gtggggtggg gcaggacagc aagggggagg attgggaaga caatagcagt accacatttg   2100
tagaggtttt acttgcttta aaaaacctcc cacatctccc cctgaacctg aaacataaaa   2160
tgaatgcaat tgttgttgtt aacttgttta ttgcagctta taatggttac aaataaagca   2220
atagcatcac aaatttcaca aataaagcat ttttttcact gcattctagt tgtggtttgt   2280
ccaaactcat caatgtatct tatcatgtct gctcgacctc gagctatatt ttattctcat   2340
agttacagta tccagtatag agaggttgtg cagctattcc acggctgacc attctgcagc   2400
ggtgcacggc cagtcgtttg taggcatttt ctaggtcagt gacagtttta gggctccaga   2460
gtctctcacc aacagcgctt gctcgaggcc ataatcttgg agtaaggtta gttgcatcca   2520
caaattctcc ccacaggcaa gcttctccac caataacaag ttgtttctgc ttctcagagc   2580
cttcaaaatt aaggggctca actttgtagt agtttttcca gtcttgccca tagctgatca   2640
ggtctaagta ccaaggagca gaaaggatgg cagggaagcc agagcctgtg acttgcttta   2700
gctcatatga ataatgctca ctcttccaca cttcgactac tgtgcccggc tgaagctcca   2760
```

```
ccttatcatc aaaaacttct tgccaaacaa tggagttctt ctttaaggat gaaataattt   2820
ccaaaatctt tttaatataa aaggattcta gtcttctaaa atcgctgcca aagccctttc   2880
tcttcatgaa accttggatg tttggatttg atgcccaaca ttgaaattct acttcatctc   2940
ctcccaagtg gatgaactga tctggaaaca cactgctgat ttctttgaaa aatgtgttaa   3000
agaatgcata cgttgtgttt acagttgggt ctacaggccc aaacacttga gttttagttt   3060
tttgattgta acatggagtt agaaggtttt tctgtccttt gccccaagac tgtgtatggc   3120
caggggtatc aaattctggt atgactcgaa tccctcggag ccgggcgtac tccagcacca   3180
tccggacatc gtttggtgta tagacatgag acaaagagta gcttccctta ttgcttagct   3240
caggaaaagt ggtactctga taagggaaag actggtcgtc cactatgtgc cagtgaagaa   3300
cattaaactt attaaaagcc atggcatcca gagtttttaa aattgtcttc acaggcagga   3360
agtgtctaga tgtatcaatt aaaattcctc tatgagggaa tcttggagaa tcagctatac   3420
tggattcatt gatggtgaaa gtcccgaaag agtcttggta aactaactgg ctaaacgtct   3480
ctaaacctcg taacgctccc caaacgctgt tggccttgag gacggctact ggttcttgta   3540
caagcagaga ataggtttca tctgaagaca gactagggaa ggactcgcac tctgactcga   3600
gggtaatgga gaccaggagc ttctgcaact gtggctcagc tcgaaatcta gcagggccat   3660
gatgtctctt gtagaaacca aaaacatagt tgtaatatcg ccgaaacgcc tcctgtagca   3720
gcgagcagga agggcccgct gtggaattgg gactgtggtc gatgctgaag tcctccgcgg   3780
agatgtacaa cagccgcggg aacatctgca ccgagcgcgg gaagggccat agcgcaggtt   3840
gcagtcgggc cggggccact agggccagcg acactagcga caccagcgcc tgcagcagca   3900
gcagcccggg ggcgctacgc ggggactgcg gcatggtgga ctagttctga cggttcacta   3960
aacgagctct gcttatatag caacctgcgt gatggctccg cccacgcgtg cacgtcaccg   4020
ttaccggagc aacctgacac cggctccagg catgctgggg agagatctag gaacccctag   4080
tgatggagtt ggccactccc tctctgcgcg ctcgctcgct cactgaggcc gcccgggcaa   4140
agcccgggcg tcgggcgacc tttggtcgcc cggcctcagt gagcgagcga gcgcgcagag   4200
agggagtggc catgcagcca gctggcgtaa tagcgaagag gcccgcaccg atcgcccttc   4260
ccaacagttg cgtagcctga atggcgaatg gcgcgacgcg ccctgtagcg gcgcattaag   4320
cgcggcgggt gtggtggtta cgcgcagcgt gaccgctaca cttgccagcg ccctagcgcc   4380
cgctcctttc gctttcttcc cttcctttct cgccacgttc gccggctttc cccgtcaagc   4440
tctaaatcgg gggctccctt tagggttccg atttagtgct ttacggcacc tcgaccccaa   4500
aaaacttgat tagggtgatg gttcacgtag tgggccatcg ccctgataga cggtttttcg   4560
ccctttgacg ttggagtcca cgttctttaa tagtggactc ttgttccaaa ctggaacaac   4620
actcaaccct atctcggtct attcttttga tttataaggg attttgccga tttcggccta   4680
ttggttaaaa aatgagctga tttaacaaaa atttaacgcg aattttaaca aaatattaac   4740
gtttacaatt tcctgatgcg gtattttctc cttacgcatc tgtgcggtat ttcacaccgc   4800
atatggtgca ctctcagtac aatctgctct gatgccgcat agttaagcca gccccgacac   4860
ccgccaacac ccgctgacgc gccctgacgg gcttgtctgc tcccggcatc cgcttacaga   4920
caagctgtga ccgtctccgg gagctgcatg tgtcagaggt tttcaccgtc atcaccgaaa   4980
cgcgcgagac gaaagggcct cgtgatacgc ctatttttat aggttaatgt catgataata   5040
atggtttctt agacgtcagg tggcactttt cggggaaatg tgcgcggaac ccctatttgt   5100
```

ttatttttct aaatacattc aaatatgtat ccgctcatga gacaataacc ctgataaatg 5160
cttcaataat attgaaaaag gaagagtatg agtattcaac atttccgtgt cgcccttatt 5220
cccttttttg cggcattttg ccttcctgtt tttgctcacc cagaaacgct ggtgaaagta 5280
aaagatgctg aagatcagtt gggtgcacga gtgggttaca tcgaactgga tctcaacagc 5340
ggtaagatcc ttgagagttt tcgccccgaa gaacgttttc caatgatgag cacttttaaa 5400
gttctgctat gtggcgcggt attatcccgt attgacgccg ggcaagagca actcggtcgc 5460
cgcatacact attctcagaa tgacttggtt gagtactcac cagtcacaga aaagcatctt 5520
acggatggca tgacagtaag agaattatgc agtgctgcca taaccatgag tgataacact 5580
gcggccaact tacttctgac aacgatcgga ggaccgaagg agctaaccgc ttttttgcac 5640
aacatggggg atcatgtaac tcgccttgat cgttgggaac cggagctgaa tgaagccata 5700
ccaaacgacg agcgtgacac cacgatgcct gtagcaatgg caacaacgtt gcgcaaacta 5760
ttaactggcg aactacttac tctagcttcc cggcaacaat taatagactg gatggaggcg 5820
gataaagttg caggaccact tctgcgctcg gcccttccgg ctggctggtt tattgctgat 5880
aaatctggag ccggtgagcg tgggtctcgc ggtatcattg cagcactggg gccagatggt 5940
aagccctccc gtatcgtagt tatctacacg acggggagtc aggcaactat ggatgaacga 6000
aatagacaga tcgctgagat aggtgcctca ctgattaagc attggtaact gtcagaccaa 6060
gtttactcat atatacttta gattgattta aaacttcatt tttaatttaa aaggatctag 6120
gtgaagatcc tttttgataa tctcatgacc aaaatccctt aacgtgagtt ttcgttccac 6180
tgagcgtcag accccgtaga aaagatcaaa ggatcttctt gagatccttt ttttctgcgc 6240
gtaatctgct gcttgcaaac aaaaaaacca ccgctaccag cggtggtttg tttgccggat 6300
caagagctac caactctttt tccgaaggta actggcttca gcagagcgca gataccaaat 6360
actgtccttc tagtgtagcc gtagttaggc caccacttca agaactctgt agcaccgcct 6420
acatacctcg ctctgctaat cctgttacca gtggctgctg ccagtggcga taagtcgtgt 6480
cttaccgggt tggactcaag acgatagtta ccggataagg cgcagcggtc gggctgaacg 6540
gggggttcgt gcacacagcc cagcttggag cgaacgacct acaccgaact gagataccta 6600
cagcgtgagc attgagaaag cgccacgctt cccgaaggga gaaaggcgga caggtatccg 6660
gtaagcggca gggtcggaac aggagagcgc acgagggagc ttccaggggg aaacgcctgg 6720
tatctttata gtcctgtcgg gtttcgccac ctctgacttg agcgtcgatt tttgtgatgc 6780
tcgtcagggg ggcggagcct atggaaaaac gccagcaacg cggccttttt acggttcctg 6840
gccttttgct ggccttttgc tcacatgttc tttcctgcgt tatcccctga ttctgtggat 6900
aaccgtatta ccgcctttga gtgagctgat accgctcgcc gcagccgaac gaccgagcgc 6960
agcgagtcag tgagcgagga agcggaagag cgcccaatac gcaaaccgcc tctccccgcg 7020
cgttggccga ttcattaatg cagctgggct gcaggggggg gggggggggg gtgggggggg 7080
gggggggggg 7090

<210> SEQ ID NO 7
<211> LENGTH: 7743
<212> TYPE: DNA
<213> ORGANISM: Artificial Sequence
<220> FEATURE:
<223> OTHER INFORMATION: Synthetic polynucleotide

<400> SEQUENCE: 7
ttggccactc cctctctgcg cgctcgctcg ctcactgagg ccgggcgacc aaaggtcgcc 60

```
cgacgcccgg gctttgcccg ggcggcctca gtgagcgagc gagcgcgcag agagggagtg   120
gccaactcca tcactagggg ttcctagatc tgaattctac cacatttgta gaggttttac   180
ttgctttaaa aaacctccca catctccccc tgaacctgaa acataaaatg aatgcaattg   240
ttgttgttaa cttgtttatt gcagcttata atggttacaa ataaagcaat agcatcacaa   300
atttcacaaa taaagcattt ttttcactgc attctagttg tggtttgtcc aaactcatca   360
atgtatctta tcatgtctgt cgaggcggcc gctcaggtct gctcaaattc ctgctcacag   420
aatccgacat tcaggggctg tgcctgcacg cctctcctca gcagctcgca cctgaagtgg   480
ctcagccttt cgtaagcgaa tgtcagatca gaggtcagct tgttggacca cagtctctcg   540
gccactgctc cggccctggg ccacagtcgt gggaccagat tggtgttgtc cacatactcg   600
ccccacatac atgcttcgcc cccgatgacc agagctttct gctcaggagt cccttcaaag   660
gccaggggct ccacaatgta gaaatccttc cagtctggtc catatgagat cctgttcagg   720
taccaagggg cactcagcag tgctcggaag ccagcttttg tcaccagttc cagctccttc   780
atataattga caggaatatc ctcgcgccac acttgaatga tggtatcggg ctggattttg   840
accttgttgt caaacacttc ctgccagacc acatagccct ttccgtatga actcacaatg   900
tccagcagag tctggatgta gaaactctcc agctgcttga agtcttcgcc gaaccctttc   960
ttccgcataa agtcctggat ctctggatta gacttccaac atgtgaaatc cacttcgtct  1020
ccgcccaggt gcagataaaa gtcagggaag acagaggaca cctccagaaa gaatgtagac  1080
atgaactcgt aggtattgtt cagggatggg ttcacaggtc cgaaggtgcc gcttggctca  1140
ctcccagagt agcaaggagt cagcagtccg ggaattcctg ggccccagct cagagtatgg  1200
ccaggtgtat cgaattcagc cagcactcga atccccctca gtcgggcata ctcgatgact  1260
tctttcacgt cctgggcggt atagatgtga gtcacgggat tgtagctgcc cttgcgcatc  1320
agctctggaa atgtgaagct ttcgtaagga aatgagggat cgtcgaccag atgccagtgg  1380
aacacgttca gcttgttata agccatcaca tccagagtgt ccagaatgct tgacaggggc  1440
aggtaatgtc tagatgtatc cagcagcagc ccccggtgtg gaaatctagg gaagtcttcg  1500
atctcagttt tgttgataaa gaatgttccc tcggctgact tccagaccag ctgactgaaa  1560
gtctccaggc ccctcagtgc cccccacact gtttcggaca gcagcagaca ctgatcgtca  1620
ttgattgtca gggtatagtt ctccacggat tccagggtgg gcagctgatt gcagcctgga  1680
gtgaccacgc tgaccaccag cacgtttttc tccagggtgt ggcgcttccc agtcagatag  1740
ggccgtggcc aggacccgct tccaaacagc agatcgcggt accgctggaa tgcctcgtcc  1800
aggacgctgc atcctggctg agcggcgctg ctcacgtcgt actgaaactg gaaattgttt  1860
ggatacagca cgtacctctg gtcagatgtc tggaagttct gaggccatgg ccacagggcg  1920
gttgctcgtc cagcaaatgc agcggccagc agcagggaga accacagtct ggagctggtc  1980
atggtggctt tatcgatact agcgctagag cttgctcccg cccgccgcgc gcttcgcttt  2040
ttatagggcc gccgccgccg ccgcctcgcc ataaaaggaa actttcggag cgcgccgctc  2100
tgattggctg ccgccgcacc tctccgcctc gccccgcccc gcccctcgcc cccatcgctg  2160
cacaaaataa ttaaaaaata aataaataca aaattggggg tggggagggg ggggagatgg  2220
ggagagtgaa gcagaacgtg gcctcggatc ccccgggctg cagtattaat agtaatcaat  2280
tacggggtca ttagttcata gcccatatat ggagttccgc gttacataac ttacggtaaa  2340
tggcccgcct ggctgaccgc ccaacgaccc ccgcccattg acgtcaataa tgacgtatgt  2400
```

```
tcccatagta acgccaatag ggactttcca ttgacgtcaa tgggtggagt atttacggta   2460
aactgcccac ttggcagtac atcaagtgta tcatatgcca agtacgcccc ctattgacgt   2520
caatgacggt aaatggcccg cctggcatta tgcccagtac atgaccttat gggactttcc   2580
tacttggcag tacatctacg tattagtcat cgctattacc atgtcgaggc cacgttctgc   2640
ttcactctcc ccatctcccc cccctcccca cccccaattt tgtatttatt tattttttaa   2700
ttattttgtg cagcgatggg ggcgaggggc ggggcggggc gaggcggaga ggtgcggcgg   2760
cagccaatca gagcggcgcg ctccgaaagt ttccttttat ggcgaggcgg cggcggcggc   2820
ggccctataa aaagcgaagc gcgcggcggg cgggagcaag ctcgctagca ctagtggagc   2880
accatggagc tgtgcgggct ggggctgccc cggccgccca tgctgctggc gctgctgttg   2940
gcgacactgc tggcggcgat gttggcgctg ctgactcagg tggcgctggt ggtgcaggtg   3000
gcggaggcgg ctcgggcccc gagcgtctcg gccaagccgg ggccggcgct gtggcccctg   3060
ccgctctcgg tgaagatgac ccgaacctg ctgcatctcg ccccggagaa cttctacatc   3120
agccacagcc ccaattccac ggcgggcccc tcctgcaccc tgctggagga agcgtttcga   3180
cgatatcatg gctatatttt tggtttctac aagtggcatc atgaacctgc tgaattccag   3240
gctaaaaccc aggttcagca acttcttgtc tcaatcaccc ttcagtcaga gtgtgatgct   3300
ttccccaaca tatcttcaga tgagtcttat actttacttg tgaaagaacc agtggctgtc   3360
cttaaggcca acagagtttg ggagcatta cgaggtttag agacctttag ccagttagtt   3420
tatcaagatt cttatggaac tttcaccatc aatgaatcca ccattattga ttctccaagg   3480
ttttctcaca gaggaatttt gattgataca tccagacatt atctgccagt taagattatt   3540
cttaaaactc tggatgccat ggcttttaat aagtttaatg ttcttcactg gcacatagtt   3600
gatgaccagt ctttcccata tcagagcatc acttttcctg agttaagcaa taaaggaagc   3660
tattctttgt ctcatgttta tacaccaaat gatgtccgta tggtgattga atatgccaga   3720
ttacgaggaa ttcgagtcct gccagaattt gatacccctg ggcatacact atcttgggga   3780
aaaggtcaga aagacctcct gactccatgt tacagtagac aaaacaagtt ggactctttt   3840
ggacctataa accctactct gaatacaaca tacagcttcc ttactacatt tttcaaagaa   3900
attagtgagg tgtttccaga tcaattcatt catttgggag gagatgaagt ggaatttaaa   3960
tgttgggaat caaatccaaa aattcaagat ttcatgaggc aaaaaggctt tggcacagat   4020
tttaagaaac tagaatcttt ctacattcaa aaggttttgg atattattgc aaccataaac   4080
aagggatcca ttgtctggca ggaggttttt gatgataaag caaagcttgc gccgggcaca   4140
atagttgaag tatggaaaga cagcgcatat cctgaggaac tcagtagagt cacagcatct   4200
ggcttccctg taatcctttc tgctccttgg tacttagatt tgattagcta tggacaagat   4260
tggaggaaat actataaagt ggaacctctt gattttggcg gtactcagaa acagaaacaa   4320
cttttcattg gtggagaagc ttgtctatgg ggagaatatg tggatgcaac taacctcact   4380
ccaagattat ggcctcgggc aagtgctgtt ggtgagagac tctggagttc caaagatgtc   4440
agagatatgg atgacgccta tgacagactg acaaggcacc gctgcaggat ggtcgaacgt   4500
ggaatagctg cacaacctct ttatgctgga tattgtaacc atgagaacat gtaactcgag   4560
gcggccgctc tagagatctt tttccctctg ccaaaaatta tggggacatc atgaagcccc   4620
ttgagcatct gacttctggc taataaagga aatttatttt cattgcaata gtgtgttgga   4680
atttttttgtg tctctcactc ggcatgctgg ggagagatct gaggaacccc tagtgatgga   4740
gttggccact ccctctctgc gcgctcgctc gctcactgag gccgcccggg caaagcccgg   4800
```

-continued

```
gcgtcgggcg acctttggtc gcccggcctc agtgagcgag cgagcgcgca gagagggagt   4860
ggccatgcag ccagctggcg taatagcgaa gaggcccgca ccgatcgccc ttcccaacag   4920
ttgcgtagcc tgaatggcga atggcgcgac gcgccctgta gcggcgcatt aagcgcggcg   4980
ggtgtggtgg ttacgcgcag cgtgaccgct acacttgcca gcgccctagc gcccgctcct   5040
ttcgctttct tcccttcctt tctcgccacg ttcgccggct ttccccgtca agctctaaat   5100
cgggggctcc ctttagggtt ccgatttagt gctttacggc acctcgaccc caaaaaactt   5160
gattagggtg atggttcacg tagtgggcca tcgccctgat agacggtttt tcgccctttg   5220
acgttggagt ccacgttctt taatagtgga ctcttgttcc aaactggaac aacactcaac   5280
cctatctcgg tctattcttt tgatttataa gggattttgc cgatttcggc ctattggtta   5340
aaaaatgagc tgatttaaca aaaatttaac gcgaatttta acaaaatatt aacgtttaca   5400
atttcctgat gcggtatttt ctccttacgc atctgtgcgg tatttcacac cgcatatggt   5460
gcactctcag tacaatctgc tctgatgccg catagttaag ccagccccga cacccgccaa   5520
cacccgctga cgcgccctga cgggcttgtc tgctcccggc atccgcttac agacaagctg   5580
tgaccgtctc cgggagctgc atgtgtcaga ggttttcacc gtcatcaccg aaacgcgcga   5640
gacgaaaggg cctcgtgata cgcctatttt tataggttaa tgtcatgata ataatggttt   5700
cttagacgtc aggtggcact tttcggggaa atgtgcgcgg aacccctatt tgtttatttt   5760
tctaaataca ttcaaatatg tatccgctca tgagacaata accctgataa atgcttcaat   5820
aatattgaaa aaggaagagt atgagtattc aacatttccg tgtcgccctt attccctttt   5880
ttgcggcatt ttgccttcct gtttttgctc acccagaaac gctggtgaaa gtaaaagatg   5940
ctgaagatca gttgggtgca cgagtgggtt acatcgaact ggatctcaac agcggtaaga   6000
tccttgagag ttttcgcccc gaagaacgtt ttccaatgat gagcactttt aaagttctgc   6060
tatgtggcgc ggtattatcc cgtattgacg ccgggcaaga gcaactcggt cgccgcatac   6120
actattctca gaatgacttg gttgagtact caccagtcac agaaaagcat cttacggatg   6180
gcatgacagt aagagaatta tgcagtgctg ccataaccat gagtgataac actgcggcca   6240
acttacttct gacaacgatc ggaggaccga aggagctaac cgcttttttg cacaacatgg   6300
gggatcatgt aactcgcctt gatcgttggg aaccggagct gaatgaagcc ataccaaacg   6360
acgagcgtga caccacgatg cctgtagcaa tggcaacaac gttgcgcaaa ctattaactg   6420
gcgaactact tactctagct tcccggcaac aattaataga ctggatggag gcggataaag   6480
ttgcaggacc acttctgcgc tcggcccttc cggctggctg gtttattgct gataaatctg   6540
gagccggtga gcgtgggtct cgcggtatca ttgcagcact ggggccagat ggtaagccct   6600
cccgtatcgt agttatctac acgacgggga gtcaggcaac tatggatgaa cgaaatagac   6660
agatcgctga gataggtgcc tcactgatta agcattggta actgtcagac caagtttact   6720
catatatact ttagattgat ttaaaacttc atttttaatt taaaaggatc taggtgaaga   6780
tcctttttga taatctcatg accaaaatcc cttaacgtga gttttcgttc cactgagcgt   6840
cagaccccgt agaaaagatc aaaggatctt cttgagatcc tttttttctg cgcgtaatct   6900
gctgcttgca aacaaaaaaa ccaccgctac cagcggtggt ttgtttgccg gatcaagagc   6960
taccaactct ttttccgaag gtaactggct tcagcagagc gcagatacca aatactgtcc   7020
ttctagtgta gccgtagtta ggccaccact tcaagaactc tgtagcaccg cctacatacc   7080
tcgctctgct aatcctgtta ccagtggctg ctgccagtgg cgataagtcg tgtcttaccg   7140
```

ggttggactc aagacgatag ttaccggata aggcgcagcg gtcgggctga acggggggtt 7200
cgtgcacaca gcccagcttg gagcgaacga cctacaccga actgagatac ctacagcgtg 7260
agcattgaga aagcgccacg cttcccgaag ggagaaaggc ggacaggtat ccggtaagcg 7320
gcagggtcgg aacaggagag cgcacgaggg agcttccagg gggaaacgcc tggtatcttt 7380
atagtcctgt cgggtttcgc cacctctgac ttgagcgtcg atttttgtga tgctcgtcag 7440
gggggcggag cctatggaaa aacgccagca acgcggcctt tttacggttc ctggcctttt 7500
gctggccttt tgctcacatg ttctttcctg cgttatcccc tgattctgtg gataaccgta 7560
ttaccgcctt tgagtgagct gataccgctc gccgcagccg aacgaccgag cgcagcgagt 7620
cagtgagcga ggaagcggaa gagcgcccaa tacgcaaacc gcctctcccc gcgcgttggc 7680
cgattcatta atgcagctgg gctgcagggg gggggggggg ggggtggggg gggggggggg 7740
ggg 7743

<210> SEQ ID NO 8
<211> LENGTH: 7745
<212> TYPE: DNA
<213> ORGANISM: Artificial Sequence
<220> FEATURE:
<223> OTHER INFORMATION: Synthetic polynucleotide

<400> SEQUENCE: 8
ttggccactc cctctctgcg cgctcgctcg ctcactgagg ccgggcgacc aaaggtcgcc 60
cgacgcccgg gctttgcccg ggcggcctca gtgagcgagc gagcgcgcag agagggagtg 120
gccaactcca tcactagggg ttcctcagat ctgaattcta ccacatttgt agaggtttta 180
cttgctttaa aaaacctccc acatctcccc ctgaacctga aacataaaat gaatgcaatt 240
gttgttgtta acttgtttat tgcagcttat aatggttaca aataaagcaa tagcatcaca 300
aatttcacaa ataaagcatt tttttcactg cattctagtt gtggtttgtc caaactcatc 360
aatgtatctt atcatgtctg tcgaggcggc cgctcaggtc tgctcaaatt cctgctcaca 420
gaatccgaca ttcaggggct gtgcctgcac gcctctcctc agcagctcgc acctgaagtg 480
gctcagcctt tcgtaagcga atgtcagatc agaggtcagc ttgttggacc acagtctctc 540
ggccactgct ccggccctgg gccacagtcg tgggaccaga ttggtgttgt ccacatactc 600
gccccacata catgcttcgc ccccgatgac cagagctttc tgctcaggag tcccttcaaa 660
ggccaggggc tccacaatgt agaaatcctt ccagtctggt ccatatgaga tcctgttcag 720
gtaccaaggg gcactcagca gtgctcggaa gccagctttt gtcaccagtt ccagctcctt 780
catataattg acaggaatat cctcgcgcca cacttgaatg atggtatcgg gctggatttt 840
gaccttgttg tcaaacactt cctgccagac cacatagccc tttccgtatg aactcacaat 900
gtccagcaga gtctggatgt agaaactctc cagctgcttg aagtcttcgc cgaacccttt 960
cttccgcata aagtcctgga tctctggatt agacttccaa catgtgaaat ccacttcgtc 1020
tccgcccagg tgcagataaa agtcagggaa gacagaggac acctccagaa agaatgtaga 1080
catgaactcg taggtattgt tcagggatgg gttcacaggt ccgaaggtgc cgcttggctc 1140
actcccagag tagcaaggag tcagcagtcc gggaattcct gggccccagc tcagagtatg 1200
gccaggtgta tcgaattcag ccagcactcg aatccccctc agtcgggcat actcgatgac 1260
ttctttcacg tcctgggcgg tatagatgtg agtcacggga ttgtagctgc ccttgcgcat 1320
cagctctgga aatgtgaagc tttcgtaagg aaatgaggga tcgtcgacca gatgccagtg 1380
gaacacgttc agcttgttat aagccatcac atccagagtg tccagaatgc ttgacagggg 1440

-continued

```
caggtaatgt ctagatgtat ccagcagcag cccccggtgt ggaaatctag ggaagtcttc   1500
gatctcagtt ttgttgataa agaatgttcc ctcggctgac ttccagacca gctgactgaa   1560
agtctccagg cccctcagtg ccccccacac tgtttcggac agcagcagac actgatcgtc   1620
attgattgtc agggtatagt tctccacgga ttccagggtg ggcagctgat tgcagcctgg   1680
agtgaccacg ctgaccacca gcacgttttt ctccagggtg tggcgcttcc cagtcagata   1740
gggccgtggc caggacccgc ttccaaacag cagatcgcgg taccgctgga atgcctcgtc   1800
caggacgctg catcctggct gagcggcgct gctcacgtcg tactgaaact ggaaattgtt   1860
tggatacagc acgtacctct ggtcagatgt ctggaagttc tgaggccatg gccacagggc   1920
ggttgctcgt ccagcaaatg cagcggccag cagcagggag aaccacagtc tggagctggt   1980
catggtggct ttatcgatac tagcgctaga gcttgctccc gcccgccgcg cgcttcgctt   2040
tttatagggc cgccgccgcc gccgcctcgc cataaaagga aactttcgga gcgcgccgct   2100
ctgattggct gccgccgcac ctctccgcct cgccccgccc cgcccctcgc cccatcgct    2160
gcacaaaata attaaaaaat aaataaatac aaaattgggg gtggggaggg gggggagatg   2220
gggagagtga agcagaacgt ggcctcggat cccccgggct gcagtattaa tagtaatcaa   2280
ttacggggtc attagttcat agcccatata tggagttccg cgttacataa cttacggtaa   2340
atggcccgcc tggctgaccg cccaacgacc cccgcccatt gacgtcaata atgacgtatg   2400
ttcccatagt aacgccaata gggactttcc attgacgtca atgggtggag tatttacggt   2460
aaactgccca cttggcagta catcaagtgt atcatatgcc aagtacgccc cctattgacg   2520
tcaatgacgg taaatggccc gcctggcatt atgcccagta catgacctta tgggactttc   2580
ctacttggca gtacatctac gtattagtca tcgctattac catgtcgagg ccacgttctg   2640
cttcactctc cccatctccc ccccctcccc acccccaatt ttgtatttat ttatttttta   2700
attattttgt gcagcgatgg gggcgagggg cggggcgggg cgaggcggag aggtgcggcg   2760
gcagccaatc agagcggcgc gctccgaaag tttcctttta tggcgaggcg gcggcggcgg   2820
cggccctata aaaagcgaag cgcgcggcgg gcgggagcaa gctcgctagc actagtaaag   2880
ccaccatgga actgtgcgga ctgggactgc ctagaccccc tatgctgctg gctctgctgc   2940
tggctaccct gctggctgct atgctggccc tgctgactca ggtggccctg gtggtccagg   3000
tcgcagaggc agctagggct ccttcagtga gcgcaaagcc aggacctgcc ctgtggccac   3060
tgccactgtc cgtgaaaatg acaccaaacc tgctgcacct ggcccccgaa aatttctaca   3120
tctcccattc tcctaacagt acagcagggc catcatgcac tctgctggag gaagccttcc   3180
ggagatacca cgggtatatt ttcggcttct acaagtggca ccatgagccc gcagaatttc   3240
aggccaaaac ccaggtgcag cagctgctgg tcagcatcac actgcagtcc gagtgtgacg   3300
ctttcccaaa tattagctcc gatgagagct acaccctgct ggtgaaggaa cccgtggctg   3360
tcctgaaagc aaacagagtc tggggcgcac tgagggggct ggagacattc tcccagctgg   3420
tgtaccagga ctcttacgga acatttacta tcaacgaatc cactatcatc gactccccta   3480
ggttttctca ccgcggcatc ctgattgata cttctcgcca ttacctgcca gtgaagatca   3540
ttctgaaaac cctggatgca atggccttca acaagtttaa tgtgctgcac tggcatatcg   3600
tcgacgatca gtctttccct taccagagta ttacatttcc agagctgagt aataaaggca   3660
gttactcact gagccacgtg tatactccaa acgacgtgag aatggtcatc gagtatgcca   3720
ggctgcgcgg aattagggtg ctgccagaat tcgatactcc cggccatacc ctgtcttggg   3780
```

```
gcaaggggca gaaagacctg ctgacccccct gctacagtcg gcagaacaag ctggattcat   3840

tcggccctat caacccaaca ctgaatacca catactcttt tctgactacc ttctttaagg   3900

agatcagtga agtgttcccc gaccagttta ttcacctggg cggggatgag gtcgaattca   3960

agtgttggga gagcaatcct aaaatccagg actttatgag acagaaggga ttcggcaccg   4020

acttcaagaa actggaatca ttctacattc agaaggtgct ggacatcatt gccacaatca   4080

acaaagggag catcgtgtgg caggaggtct ttgacgataa ggccaaactg gctcccggaa   4140

ctatcgtgga agtctggaag gatagcgcct atcctgagga actgtcacgc gtgaccgcta   4200

gcggctttcc cgtcatcctg agcgcacctt ggtacctgga cctgatttcc tatgggcagg   4260

attggcgaaa gtactataaa gtggagcccc tggacttcgg aggcacccag aagcagaaac   4320

agctgtttat cgggggagag gcctgcctgt ggggggaata cgtggatgct accaatctga   4380

caccacgact gtggcctcgg gctagcgcag tgggagagcg cctgtggtct agtaaggacg   4440

tgcgggatat ggacgatgcc tatgaccggc tgacccgaca tcggtgtaga atggtggaac   4500

ggggcattgc cgctcagcca ctgtatgccg ggtactgtaa tcacgaaaat atgtgactcg   4560

aggcggccgc tctagagatc tttttccctc tgccaaaaat tatggggaca tcatgaagcc   4620

ccttgagcat ctgacttctg gctaataaag gaaatttatt ttcattgcaa tagtgtgttg   4680

gaattttttg tgtctctcac tcggcatgct ggggagagat ctgaggaacc cctagtgatg   4740

gagttggcca ctccctctct gcgcgctcgc tcgctcactg aggccgcccg ggcaaagccc   4800

gggcgtcggg cgacctttgg tcgcccggcc tcagtgagcg agcgagcgcg cagagaggga   4860

gtggccatgc agccagctgg cgtaatagcg aagaggcccg caccgatcgc ccttcccaac   4920

agttgcgtag cctgaatggc gaatggcgcg acgcgccctg tagcggcgca ttaagcgcgg   4980

cgggtgtggt ggttacgcgc agcgtgaccg ctacacttgc cagcgcccta gcgcccgctc   5040

ctttcgcttt cttcccttcc tttctcgcca cgttcgccgg ctttccccgt caagctctaa   5100

atcgggggct ccctttaggg ttccgattta gtgctttacg gcacctcgac cccaaaaaac   5160

ttgattaggg tgatggttca cgtagtgggc catcgccctg atagacggtt tttcgccctt   5220

tgacgttgga gtccacgttc tttaatagtg gactcttgtt ccaaactgga acaacactca   5280

accctatctc ggtctattct tttgatttat aagggatttt gccgatttcg gcctattggt   5340

taaaaaatga gctgatttaa caaaaattta acgcgaattt taacaaaata ttaacgttta   5400

caatttcctg atgcggtatt ttctccttac gcatctgtgc ggtatttcac accgcatatg   5460

gtgcactctc agtacaatct gctctgatgc cgcatagtta agccagcccc gacacccgcc   5520

aacacccgct gacgcgccct gacgggcttg tctgctcccg gcatccgctt acagacaagc   5580

tgtgaccgtc tccgggagct gcatgtgtca gaggttttca ccgtcatcac cgaaacgcgc   5640

gagacgaaag ggcctcgtga tacgcctatt tttataggtt aatgtcatga taataatggt   5700

ttcttagacg tcaggtggca cttttcgggg aaatgtgcgc ggaaccccta tttgtttatt   5760

tttctaaata cattcaaata tgtatccgct catgagacaa taaccctgat aaatgcttca   5820

ataatattga aaaaggaaga gtatgagtat tcaacatttc cgtgtcgccc ttattccctt   5880

ttttgcggca ttttgccttc ctgtttttgc tcacccagaa acgctggtga aagtaaaaga   5940

tgctgaagat cagttgggtg cacgagtggg ttacatcgaa ctggatctca acagcggtaa   6000

gatccttgag agttttcgcc ccgaagaacg ttttccaatg atgagcactt ttaaagttct   6060

gctatgtggc gcggtattat cccgtattga cgccgggcaa gagcaactcg gtcgccgcat   6120

acactattct cagaatgact tggttgagta ctcaccagtc acagaaaagc atcttacgga   6180
```

tggcatgaca gtaagagaat tatgcagtgc tgccataacc atgagtgata acactgcggc 6240
caacttactt ctgacaacga tcggaggacc gaaggagcta accgcttttt tgcacaacat 6300
gggggatcat gtaactcgcc ttgatcgttg ggaaccggag ctgaatgaag ccataccaaa 6360
cgacgagcgt gacaccacga tgcctgtagc aatggcaaca acgttgcgca aactattaac 6420
tggcgaacta cttactctag cttcccggca acaattaata gactggatgg aggcggataa 6480
agttgcagga ccacttctgc gctcggccct tccggctggc tggtttattg ctgataaatc 6540
tggagccggt gagcgtgggt ctcgcggtat cattgcagca ctggggccag atggtaagcc 6600
ctcccgtatc gtagttatct acacgacggg gagtcaggca actatggatg aacgaaatag 6660
acagatcgct gagataggtg cctcactgat taagcattgg taactgtcag accaagttta 6720
ctcatatata ctttagattg atttaaaact tcatttttaa tttaaaagga tctaggtgaa 6780
gatccttttt gataatctca tgaccaaaat cccttaacgt gagttttcgt tccactgagc 6840
gtcagacccc gtagaaaaga tcaaaggatc ttcttgagat cctttttttc tgcgcgtaat 6900
ctgctgcttg caaacaaaaa aaccaccgct accagcggtg gtttgtttgc cggatcaaga 6960
gctaccaact ctttttccga aggtaactgg cttcagcaga gcgcagatac caaatactgt 7020
ccttctagtg tagccgtagt taggccacca cttcaagaac tctgtagcac cgcctacata 7080
cctcgctctg ctaatcctgt taccagtggc tgctgccagt ggcgataagt cgtgtcttac 7140
cgggttggac tcaagacgat agttaccgga taaggcgcag cggtcgggct gaacgggggg 7200
ttcgtgcaca cagcccagct tggagcgaac gacctacacc gaactgagat acctacagcg 7260
tgagcattga gaaagcgcca cgcttcccga agggagaaag gcggacaggt atccggtaag 7320
cggcagggtc ggaacaggag agcgcacgag ggagcttcca gggggaaacg cctggtatct 7380
ttatagtcct gtcgggtttc gccacctctg acttgagcgt cgatttttgt gatgctcgtc 7440
aggggggcgg agcctatgga aaaacgccag caacgcggcc tttttacggt tcctggcctt 7500
ttgctggcct tttgctcaca tgttctttcc tgcgttatcc cctgattctg tggataaccg 7560
tattaccgcc tttgagtgag ctgataccgc tcgccgcagc cgaacgaccg agcgcagcga 7620
gtcagtgagc gaggaagcgg aagagcgccc aatacgcaaa ccgcctctcc ccgcgcgttg 7680
gccgattcat taatgcagct gggctgcagg gggggggggg ggggggtggg gggggggggg 7740
ggggg 7745

<210> SEQ ID NO 9
<211> LENGTH: 7729
<212> TYPE: DNA
<213> ORGANISM: Artificial Sequence
<220> FEATURE:
<223> OTHER INFORMATION: Synthetic polynucleotide

<400> SEQUENCE: 9
ttggccactc cctctctgcg cgctcgctcg ctcactgagg ccgggcgacc aaaggtcgcc 60
cgacgcccgg gctttgcccg ggcggcctca gtgagcgagc gagcgcgcag agagggagtg 120
gccaactcca tcactagggg ttcctcagat ctgaattcta ccacatttgt agaggtttta 180
cttgctttaa aaaacctccc acatctcccc ctgaacctga aacataaaat gaatgcaatt 240
gttgttgtta acttgtttat tgcagcttat aatggttaca aataaagcaa tagcatcaca 300
aatttcacaa ataaagcatt tttttcactg cattctagtt gtggtttgtc caaactcatc 360
aatgtatctt atcatgtctg tcgagtcagg tctgttcaaa ctcctgctca cagaagccta 420

```
cattgagggg ttgggcctgg acacctcgcc tcagcaactc acagcggaag tgtgacaaac    480
gttcataggc aaatgtcagg tcagatgtca acttgttgct ccacagcctt tcggcaacag    540
cccctgctct gggccagagc ctggggacca ggtttgtgtt gtccacatat tctccccaca    600
tacaagcctc tccaccaatc accagagcct tctgctcagg ggtaccttca aatgccaggg    660
gttccactat gtagaaatcc ttccagtcag ggccatagga tatacggttc aggtaccagg    720
gggcagagag aagggcccgg aagccggcct tggtgaccag ttccagctcc ttcatatagt    780
tcactggaat atcctctcgc cacacctgta tgattgtgtc tggctgaatc tttactttat    840
tatcaaacac ctcctgccac accacatagc ccttgccata agaagagacg atgtccagca    900
gcgtctggat gtagaaggac tccagctgct tgaagtcctc accgaagcct ttcttcctca    960
taaagtcctg gatctctggg ttggacttcc agcaggtgaa atcaacctca tctcctccaa   1020
gatgaagata aaaatctggg aagacagagc tgacttctaa gaagaatgtg ctcatgaact   1080
cataggtatt attgagactg ggattcactg gtccaaaggt gccagagggc tcagacccag   1140
agtagcaagg agtcagtaat ccagggatac ctggtcccca ggacaaagtg tggccaggag   1200
tgtcaaactc tgcaagcaca cggatacccc ggagccgtgc gtattcaatg acctccttca   1260
catcctgtgc tgtgtagatg tgggtgacag ggttgtagga cccctttctc atgagctctg   1320
gaaaagtgaa gctctcatat gggaaggaag gatcatctac cagatgccag tggaacacgt   1380
tcaatttatt gtacgccatg acatccagag tgtccaggat gctagagagt ggcaggtaat   1440
ggcgagatgt atccaacagc aagccccggt gaggaaagcg gggaaagtcc tcaatctcag   1500
tcttgttgat aaagaatgtg ccctcagcag atttccaaac aagctggcta aaagtctcca   1560
gacctcggag agctccccag acagtctcag agaggagtaa acactggtca tcatttatgg   1620
tcagggtata attctccact gactccaaag taggaagctg gttacatcca ggtgtgacta   1680
cagagacaac caacacattc ttctccagtg tatgccgttt ccctgtgagg taaggacggg   1740
gccaagaccc ggaaccgaaa agcaggtcac gatagcgctg gaaggcctcg tcgaggactg   1800
agcagccggg ctgcgcggcc gagctgacat cgtactggaa ttgaaagttg ttcgggtaaa   1860
ggacgtagcg ctggtcggag gtttggaagt tctgaggcca gggccagagg gccgtcgccc   1920
gtcctgcgaa cgctgccgcc agcagcagcg aaaaccaaag cctggaactt gtcatggtgc   1980
tccactagcg ctagagcttg ctcccgcccg ccgcgcgctt cgctttttat agggccgccg   2040
ccgccgccgc ctcgccataa aaggaaactt tcggagcgcg ccgctctgat tggctgccgc   2100
cgcacctctc cgcctcgccc cgccccgccc ctcgccccca tcgctgcaca aaataattaa   2160
aaaataaata aatacaaaat tgggggtggg gagggggggg agatggggag agtgaagcag   2220
aacgtggcct cggatccccc gggctgcagt attaatagta atcaattacg gggtcattag   2280
ttcatagccc atatatggag ttccgcgtta cataacttac ggtaaatggc ccgcctggct   2340
gaccgcccaa cgacccccgc ccattgacgt caataatgac gtatgttccc atagtaacgc   2400
caatagggac tttccattga cgtcaatggg tggagtattt acggtaaact gcccacttgg   2460
cagtacatca agtgtatcat atgccaagta cgccccctat tgacgtcaat gacggtaaat   2520
ggcccgcctg gcattatgcc cagtacatga ccttatggga ctttcctact tggcagtaca   2580
tctacgtatt agtcatcgct attaccatgt cgaggccacg ttctgcttca ctctccccat   2640
ctcccccccc tccccacccc caattttgta tttatttatt ttttaattat tttgtgcagc   2700
gatgggggcg gggggggggg cgggggcgcg cgccaggcgg ggcggggcgg ggcgaggggc   2760
ggcgcgctcc gaaagtttcc ttttatggcg aggcggcggc ggcggcggcc ctataaaaag   2820
```

```
cgaagcgcgc ggcgggcggg agcaagctcg ctagcactag tggagcacca tggagctgtg   2880
cgggctgggg ctgccccggc cgcccatgct gctggcgctg ctgttggcga cactgctggc   2940
ggcgatgttg gcgctgctga ctcaggtggc gctggtggtg caggtggcgg aggcggctcg   3000
ggccccgagc gtctcggcca agccggggcc ggcgctgtgg cccctgccgc tctcggtgaa   3060
gatgaccccg aacctgctgc atctcgcccc ggagaacttc tacatcagcc acagccccaa   3120
ttccacggcg ggcccctcct gcaccctgct ggaggaagcg tttcgacgat atcatggcta   3180
tatttttggt ttctacaagt ggcatcatga acctgctgaa ttccaggcta aaacccaggt   3240
tcagcaactt cttgtctcaa tcacccttca gtcagagtgt gatgctttcc ccaacatatc   3300
ttcagatgag tcttatactt tacttgtgaa agaaccagtg gctgtcctta aggccaacag   3360
agtttgggga gcattacgag gtttagagac ctttagccag ttagtttatc aagattctta   3420
tggaactttc accatcaatg aatccaccat tattgattct ccaaggtttt ctcacagagg   3480
aattttgatt gatacatcca gacattatct gccagttaag attattctta aaactctgga   3540
tgccatggct tttaataagt ttaatgttct tcactggcac atagttgatg accagtcttt   3600
cccatatcag agcatcactt ttcctgagtt aagcaataaa ggaagctatt ctttgtctca   3660
tgtttataca ccaaatgatg tccgtatggt gattgaatat gccagattac gaggaattcg   3720
agtcctgcca gaatttgata cccctgggca tacactatct tggggaaaag gtcagaaaga   3780
cctcctgact ccatgttaca gtagacaaaa caagttggac tcttttggac ctataaaccc   3840
tactctgaat acaacataca gcttccttac tacatttttc aaagaaatta gtgaggtgtt   3900
tccagatcaa ttcattcatt tgggaggaga tgaagtggaa tttaaatgtt gggaatcaaa   3960
tccaaaaatt caagatttca tgaggcaaaa aggctttggc acagatttta agaaactaga   4020
atctttctac attcaaaagg ttttggatat tattgcaacc ataaacaagg gatccattgt   4080
ctggcaggag gtttttgatg ataaagcaaa gcttgcgccg ggcacaatag ttgaagtatg   4140
gaaagacagc gcatatcctg aggaactcag tagagtcaca gcatctggct tccctgtaat   4200
cctttctgct ccttggtact tagatttgat tagctatgga caagattgga ggaaatacta   4260
taaagtggaa cctcttgatt ttggcggtac tcagaaacag aaacaacttt tcattggtgg   4320
agaagcttgt ctatggggag aatatgtgga tgcaactaac ctcactccaa gattatggcc   4380
tcgggcaagt gctgttggtg agagactctg gagttccaaa gatgtcagag atatggatga   4440
cgcctatgac agactgacaa ggcaccgctg caggatggtc gaacgtggaa tagctgcaca   4500
acctctttat gctggatatt gtaaccatga gaacatgtaa ctcgaggcgg ccgctctaga   4560
gatctttttc cctctgccaa aaattatggg gacatcatga agccccttga gcatctgact   4620
tctggctaat aaaggaaatt tattttcatt gcaatagtgt gttggaattt tttgtgtctc   4680
tcactcggca tgctggggag agatctgagg aacccctagt gatggagttg gccactccct   4740
ctctgcgcgc tcgctcgctc actgaggccg cccgggcaaa gcccgggcgt cgggcgacct   4800
ttggtcgccc ggcctcagtg agcgagcgag cgcgcagaga gggagtggcc atgcagccag   4860
ctggcgtaat agcgaagagg cccgcaccga tcgcccttcc caacagttgc gtagcctgaa   4920
tggcgaatgg cgcgacgcgc cctgtagcgg cgcattaagc gcggcgggtg tggtggttac   4980
gcgcagcgtg accgctacac ttgccagcgc cctagcgccc gctcctttcg ctttcttccc   5040
ttcctttctc gccacgttcg ccggctttcc ccgtcaagct ctaaatcggg ggctcccttt   5100
agggttccga tttagtgctt tacggcacct cgaccccaaa aacttgatt agggtgatgg   5160
```

```
ttcacgtagt gggccatcgc cctgatagac ggtttttcgc cctttgacgt tggagtccac   5220
gttctttaat agtggactct tgttccaaac tggaacaaca ctcaacccta tctcggtcta   5280
ttcttttgat ttataaggga ttttgccgat ttcggcctat tggttaaaaa atgagctgat   5340
ttaacaaaaa tttaacgcga attttaacaa aatattaacg tttacaattt cctgatgcgg   5400
tattttctcc ttacgcatct gtgcggtatt tcacaccgca tatggtgcac tctcagtaca   5460
atctgctctg atgccgcata gttaagccag ccccgacacc cgccaacacc cgctgacgcg   5520
ccctgacggg cttgtctgct cccggcatcc gcttacagac aagctgtgac cgtctccggg   5580
agctgcatgt gtcagaggtt ttcaccgtca tcaccgaaac gcgcgagacg aaagggcctc   5640
gtgatacgcc tatttttata ggttaatgtc atgataataa tggtttctta gacgtcaggt   5700
ggcacttttc ggggaaatgt gcgcggaacc cctatttgtt tatttttcta aatacattca   5760
aatatgtatc cgctcatgag acaataaccc tgataaatgc ttcaataata ttgaaaaagg   5820
aagagtatga gtattcaaca tttccgtgtc gcccttattc ccttttttgc ggcattttgc   5880
cttcctgttt ttgctcaccc agaaacgctg gtgaaagtaa aagatgctga agatcagttg   5940
ggtgcacgag tgggttacat cgaactggat ctcaacagcg gtaagatcct tgagagtttt   6000
cgccccgaag aacgttttcc aatgatgagc acttttaaag ttctgctatg tggcgcggta   6060
ttatcccgta ttgacgccgg gcaagagcaa ctcggtcgcc gcatacacta ttctcagaat   6120
gacttggttg agtactcacc agtcacagaa aagcatctta cggatggcat gacagtaaga   6180
gaattatgca gtgctgccat aaccatgagt gataacactg cggccaactt acttctgaca   6240
acgatcggag gaccgaagga gctaaccgct tttttgcaca acatggggga tcatgtaact   6300
cgccttgatc gttgggaacc ggagctgaat gaagccatac caaacgacga gcgtgacacc   6360
acgatgcctg tagcaatggc aacaacgttg cgcaaactat taactggcga actacttact   6420
ctagcttccc ggcaacaatt aatagactgg atggaggcgg ataaagttgc aggaccactt   6480
ctgcgctcgg cccttccggc tggctggttt attgctgata aatctggagc cggtgagcgt   6540
gggtctcgcg gtatcattgc agcactgggg ccagatggta agccctcccg tatcgtagtt   6600
atctacacga cggggagtca ggcaactatg gatgaacgaa atagacagat cgctgagata   6660
ggtgcctcac tgattaagca ttggtaactg tcagaccaag tttactcata tatactttag   6720
attgatttaa aacttcattt ttaatttaaa aggatctagg tgaagatcct ttttgataat   6780
ctcatgacca aaatccctta acgtgagttt tcgttccact gagcgtcaga ccccgtagaa   6840
aagatcaaag gatcttcttg agatcctttt tttctgcgcg taatctgctg cttgcaaaca   6900
aaaaaaccac cgctaccagc ggtggtttgt ttgccggatc aagagctacc aactcttttt   6960
ccgaaggtaa ctggcttcag cagagcgcag ataccaaata ctgtccttct agtgtagccg   7020
tagttaggcc accacttcaa gaactctgta gcaccgccta catacctcgc tctgctaatc   7080
ctgttaccag tggctgctgc cagtggcgat aagtcgtgtc ttaccgggtt ggactcaaga   7140
cgatagttac cggataaggc gcagcggtcg ggctgaacgg ggggttcgtg cacacagccc   7200
agcttggagc gaacgaccta caccgaactg agatacctac agcgtgagca ttgagaaagc   7260
gccacgcttc ccgaagggag aaaggcggac aggtatccgg taagcggcag ggtcggaaca   7320
ggagagcgca cgagggagct tccaggggga aacgcctggt atctttatag tcctgtcggg   7380
tttcgccacc tctgacttga gcgtcgattt ttgtgatgct cgtcaggggg gcggagccta   7440
tggaaaaacg ccagcaacgc ggccttttta cggttcctgg ccttttgctg gccttttgct   7500
cacatgttct ttcctgcgtt atcccctgat tctgtggata accgtattac cgcctttgag   7560
```

-continued

```
tgagctgata ccgctcgccg cagccgaacg accgagcgca gcgagtcagt gagcgaggaa   7620

gcggaagagc gcccaatacg caaaccgcct ctccccgcgc gttggccgat tcattaatgc   7680

agctgggctg caggggggggg gggggggggg tggggggggg ggggggggg               7729
```

BICISTRONIC AAV VECTORS ENCODING HEXOSAMINIDASE ALPHA AND BETA-SUBUNITS AND USES THEREOF

RELATED APPLICATIONS

This application is a National Stage Application under 35 U.S.C. § 371 and claims the benefit of International Application No. PCT/US2019/027271, filed Apr. 12, 2019, which application claims the benefit under 35 U.S.C. § 119(e) of the filing date of U.S. Provisional Application Ser. No. 62/657,243, filed Apr. 13, 2018. The entire contents of each of the foregoing are incorporated herein by reference.

FEDERALLY SPONSORED RESEARCH

This invention was made with government support under grant number NS093941, awarded by the National Institutes of Health. The government has certain rights in the invention.

BACKGROUND OF INVENTION

Tay-Sachs disease (TSD) and Sandhoff disease (SD) are autosomal recessive lysosomal storage diseases (LSDs) caused by deficiency in hexosaminidase A (HexA) resulting from mutations in the HEXA or HEXB genes, respectively. HexA deficiency leads to storage of GM2 ganglioside in the central nervous system (CNS) and progressively deteriorating neurological function, developmental regression and eventually premature death. Currently there are no treatments available for these diseases collectively known as GM2 gangliosidoses.

SUMMARY OF INVENTION

Aspects of the disclosure relate to recombinant AAV vectors for gene delivery. The disclosure is based, in part, on the discovery that a single AAV vector encoding simultaneously hexosaminidase alpha and beta-subunits allows less invasive and potentially more effective expression of HexA in the CNS of a subject (e.g., a subject having Tay-Sachs disease or Sandhoff disease). As described in the Examples section, compositions of the disclosure comprise two HexA subunits (e.g., encode HEXA and HEXB transcripts) in a configuration that has been shown to be functional in vivo and achieve important therapeutic milestones.

Accordingly, in some aspects, the disclosure provides an isolated nucleic acid construct comprising: a first expression cassette, comprising a nucleic acid encoding a hexosaminidase alpha-subunit (HexA) under the control of a first promoter, and a first intron; and, a second expression cassette, comprising a nucleic acid encoding a hexosaminidase beta-subunit (HexB) under the control of a second promoter, and a second intron. In some embodiments, the first expression cassette and the second expression cassette are flanked by adeno-associated virus (AAV) inverted terminal repeats (ITRs).

In some embodiments, the HexA comprises an amino acid sequence as set forth in SEQ ID NO: 1. In some embodiments, the HexB comprises an amino acid sequence as set forth in SEQ ID NO: 2.

In some embodiments, the first intron is positioned between the first promoter and the nucleic acid sequence encoding the HexA. In some embodiments, the first intron is a chimeric intron. In some embodiments, the first promoter is positioned proximal to an AAV ITR, optionally wherein the first promoter is positioned between an AAV ITR and a nucleic acid sequence encoding HexA. In some embodiments, the first promoter and/or the second promoter is a P2 promoter. In some embodiments, the second intron is positioned between the second promoter and the nucleic acid sequence encoding the HexB. In some embodiments, the second intron is a chimeric intron. In some embodiments, the second promoter is positioned proximal to an AAV ITR. In some embodiments, wherein the second promoter is positioned between an AAV ITR and a nucleic acid sequence encoding HexB.

In some embodiments, the first expression cassette comprises a first poly A signal (e.g., poly A tail) operably linked to the nucleic acid sequence encoding HexA, optionally wherein the first poly A signal (e.g., poly A tail) is a BGH poly A signal (e.g., BGH poly A tail). In some embodiments, the second expression cassette comprises a second poly A signal (e.g., poly A tail) operably linked to the nucleic acid sequence encoding HexB. In some embodiments, the second poly A signal (e.g., poly A tail) is an SV40 poly A signal (e.g., SV40 poly A tail). In some embodiments, the first poly A signal (e.g., poly A tail) and the second poly A signal (e.g., poly A tail) are positioned adjacent to one another. In some embodiments, the first expression cassette and the second expression cassette are orientated in opposing directions (e.g., the first expression cassette and the second expression cassette are transcribed toward one another).

In some aspects, the disclosure provides an isolated nucleic acid construct comprising: a first expression cassette, comprising a nucleic acid sequence encoding a hexosaminidase alpha-subunit; and, a second expression cassette, comprising a nucleic acid sequence encoding a hexosaminidase beta-subunit, wherein the first expression cassette and the second expression cassette are operably linked by a bidirectional promoter. In some embodiments, the first expression cassette and the second expression cassette are flanked by adeno-associated virus (AAV) inverted terminal repeats (ITRs).

In some embodiments, the HexA comprises an amino acid sequence as set forth in SEQ ID NO: 1. In some embodiments, the HexB comprises an amino acid sequence as set forth in SEQ ID NO: 2.

In some embodiments, the bidirectional promoter comprises at least one chicken beta-actin (CBA) promoter. In some embodiments, the bidirectional promoter comprises two CBA promoters, wherein the CBA promoters initiate transcription of the first expression cassette and the second expression cassette in opposite directions (e.g., transcription of the first expression cassette occurs in a direction that is distal with respect to the second expression cassette). In some embodiments, the bidirectional promoter comprises a CMV enhancer sequence. In some embodiments, the CMV enhancer sequence is positioned between the two CBA promoters.

In some embodiments, the first expression construct comprises a first poly A signal (e.g., first poly A tail), optionally wherein the first poly A signal (e.g., first poly A tail) is proximal to an AAV ITR. In some embodiments, the first expression construct comprises a second poly A signal (e.g., second poly A tail). In some embodiments, the second poly A signal (e.g., second poly A tail) is proximal to an AAV ITR. In some embodiments, the first and/or second poly A signal (e.g., poly A tail) is each selected from SV40 poly A signal (e.g., SV40 poly A tail), rabbit beta-globulin (RBG) poly A signal (e.g., RBG poly A tail), and bovine growth hormone (BGH) poly A signal (e.g., BGH poly A tail).

In some aspects, the disclosure provides an isolated nucleic acid comprising the sequence set forth in SEQ ID NO: 3-9. In some embodiments, an isolated nucleic acid encoding HexA protein and/or HexB is codon-optimized.

In some aspects, the disclosure provides a recombinant AAV (rAAV) comprising: a capsid protein; and an isolated nucleic acid sequence of any of the above. In some embodiments, the capsid protein is of a serotype selected from AAV1, AAV2, AAV3, AAV4, AAV5, AAV6, AAV7, AAV8, AAVrh8, AAV9, AAV10, AAVrh10, AAV-PHP.B, and AAV-PHP.eB.

In some embodiments, the isolated nucleic acid comprises an ITR selected from the group consisting of AAV1 ITR, AAV2 ITR, AAV3 ITR, AAV4 ITR, AAV5 ITR, or AAV6 ITR.

In some embodiments, the disclosure provides a host cell comprising the nucleic acid or the rAAV. In some embodiments, the host cell is a mammalian cell, yeast cell, bacterial cell, insect cell, plant cell, or fungal cell.

In some aspects, the disclosure provides a method for treating a lysosomal storage disease, the method comprising administering the isolated nucleic acid or the rAAV to a subject having or suspected of having a lysosomal storage disease. In some embodiments, a subject is a human.

In some embodiments, the lysosomal storage disease is Tay-Sachs disease or Sandhoff disease. In some embodiments, the subject is characterized as having a mutation in a HEXA gene resulting in reduced (or loss of) function of a hexosaminidase alpha-subunit of the subject. In some embodiments, the subject is characterized as having a mutation in a HEXB gene resulting in reduced or loss of function of a hexosaminidase beta-subunit of the subject.

In some embodiments, the rAAV is administered by intracranial injection, intracerebral injection, or injection into the CSF via the cerebral ventricular system, cisterna magna, or intrathecal space. In some embodiments, the subject is administered the isolated nucleic acid or the rAAV during a pre-symptomatic stage of the lysosomal storage disease. In some embodiments, the pre-symptomatic stage of the lysosomal storage disease occurs between birth (e.g., perinatal) and 4-weeks of age.

BRIEF DESCRIPTION OF DRAWINGS

FIG. 2A shows the performance of SD mice using the accelerating rotarod test (4-40 rpm over 300 seconds). FIG. 2B shows the performance of SD mice using the inverted screen test assessing latency to falling and FIG. 2C shows the performance of SD mice using the inverted screen test assessing the number of hindlimb movements.

FIG. 4A shows HexA enzyme activity in the cerebrum using the artificial substrate MUGS. FIG. 4B shows total Hex (HexA+HexB) activity in the cerebrum using the artificial substrate MUG. FIG. 4C shows HexA enzyme activity in the cerebellum using MUGS. FIG. 4D shows total Hex activity in the cerebellum using MUG.

FIG. 6A shows treatment with low dose AAV9-Bic ($1\times10^{12}$ vg), AAV9-P2I ($1\times10^{12}$ vg), AAV-PHP.B-Bic ($3\times10^{11}$ vg), AAV-PHP.B-P2I ($3\times10^{11}$ vg), vectors or PBS (KO). FIG. 6B shows treatment with high dose AAV9-Bic ($4\times10^{12}$ vg), AAV9-P2I ($4\times10^{12}$ vg), AAV-PHP.B ($1\times10^{12}$ vg), AAV-PHP.B-Bic-P2I ($1\times10^{12}$ vg), vectors or PBS (KO).

FIG. 8A shows GM2 ganglioside content in cerebrum [C], cerebellum and brainstem [Cb+BS] at 1 month of age after injection of AAV9-BiCB-HexAB. FIG. 8B shows assessment of motor performance by an accelerating rotarod (4-40 rpm over 5 min) test. FIG. 8C shows data relating to an inverted screen test (max of 120 sec) at 120 and 150 days of age. FIG. 8D shows Kaplan-Meier survival plot. Median survival of untreated GM2 mice is 129.5 days. Two-sided t-tests were used to compare outcomes between AAV and untreated GM2 controls (** $P<0.0001$; * $P<0.001$; ** $P<0.01$).

FIGS. 9A-9C show data indicating lumbar intrathecal delivery of AAV9-BiCB-HexAB improves motor performance and increases survival of GM2 mice. FIG. 9A shows assessment of motor performance over time in GM2 mice treated with 1×1012 vg at ~6 weeks of age using the accelerating rotarod (4-40 rpm over 5 min) test. FIG. 9B shows data relating to an inverted screen test (max of 120 sec). FIG. 9C shows a Kaplan-Meier analysis indicating a significant increase ($P<0.0001$) in survival of AAV treated GM2 mice with a current median survival of 265 days compared to 129.5 days for untreated GM2 mice. Log-rank test was used to assess survival benefit.

DETAILED DESCRIPTION OF INVENTION

Adeno-associated virus (AAV) mediated gene therapy is one experimental approach for treatment of TSD and SD, for example via intracranial delivery of a transgene to brain parenchyma. Overexpression of both alpha and beta-subunits is necessary as HexA is a $\alpha\beta$ heterodimer. This is usually achieved by co-injection of two vectors encoding Hex alpha and beta-subunits separately due to the transgene size limitation of recombinant AAV vectors (~4.7 kb). Delivery of two separate vectors through the bloodstream or CSF compromises the efficacy of this approach as HexA overexpression requires co-infection of cells with both vectors, and the likelihood of this even declines precipitously as the vectors are diluted upon infusion into these body fluids.

In some aspects, the disclosure relates to compositions and methods useful in the treatment of lysosomal storage disorders, for example Tay-Sachs disease or Sandhoff disease. The disclosure is based, in part, on recombinant AAV vectors (e.g., isolated nucleic acids) and recombinant adeno-associated viruses (rAAVs) comprising expression cassettes configured for bicistronic expression of multiple (e.g., 2, 3, etc.) therapeutic transgenes in the CNS of a subject Isolated Nucleic Acids In some aspects, the disclosure provides isolated nucleic acids (e.g., bicistronic expression constructs, such as rAAV vectors) that are useful in expressing therapeutic transgenes in the CNS of a subject.

Figure 1:
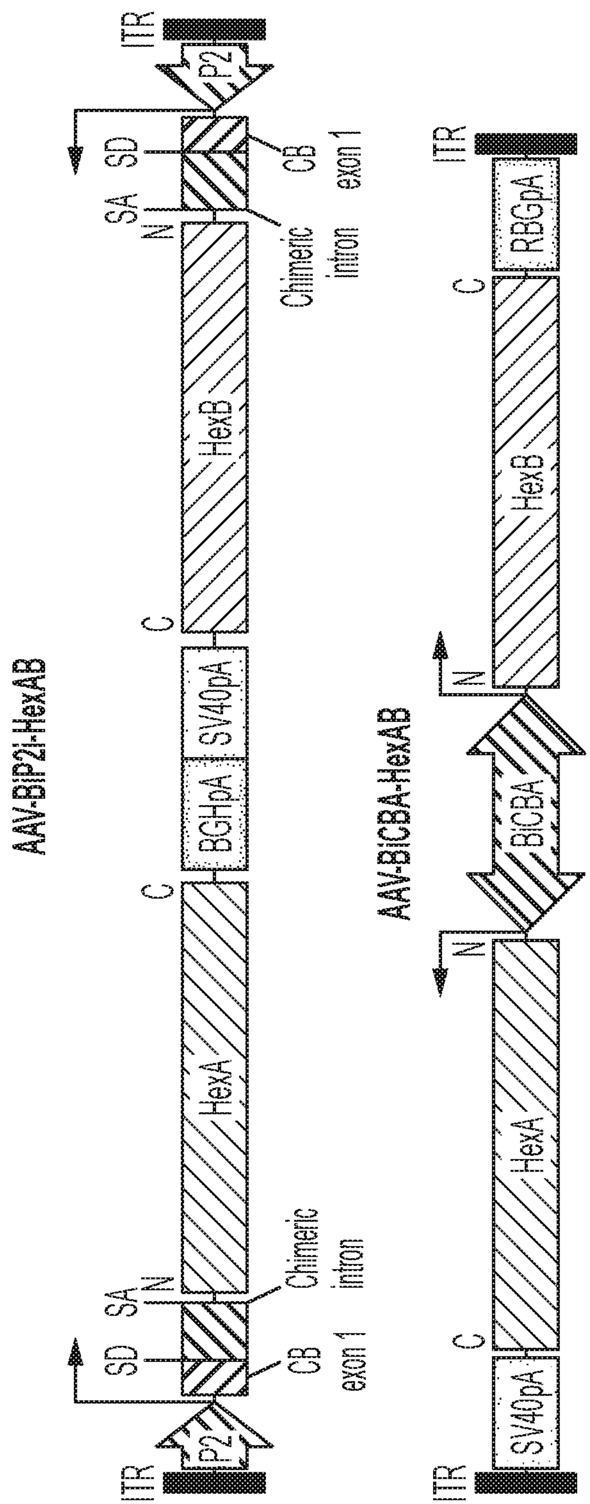
FIG. 1 shows a schematic depiction of the structure of bicistronic AAV vectors encoding simultaneously hexosaminidase alpha and beta-subunits. In some embodiments, the AAV-BiP2i-HexAB vector carries two copies of a small promoter with a small intron (P2i) at the ends of the AAV genome driving expression of Hex alpha and beta subunits in opposing directions. In some embodiments, the AAV-BiCBA-HexAB vector carries a bidirectional CBA promoter designed by duplication of the chicken beta-actin promoter in opposing directions with a CMV enhancer in the middle.

In some embodiments, a therapeutic transgene encodes one or more proteins associated with a lysosomal storage disease (e.g., Tay-Sachs disease, Sandhoff disease), for example HexA protein, HexB protein, or HexA and HexB protein. In some embodiments, a HexA protein comprises an amino acid sequence as set forth in SEQ ID NO: 1. In some embodiments, a HexB protein comprises an amino acid sequence as set forth in SEQ ID NO: 2. In some embodiments, a transgene (e.g., a transgene encoding HexA) encodes a sequence that is at least 70% (e.g., at least 70%, 80%, 90%, 95%, 99%, etc.) identical to an amino acid sequence as set forth in SEQ ID NO: 1. In some embodiments, a transgene (e.g., a transgene encoding HexB) encodes an amino acid sequence that is at least 70% (e.g., at least 70%, 80%, 90%, 95%, 99%, etc.) identical to an amino acid sequence as set forth in SEQ ID NO: 2. In some embodiments a transgene encodes a bicistronic expression construct harboring two expression cassettes in opposite orientations as shown in FIG. 1, AAV-BiP2i-HexAB and AAV-BiCBA-HexAB. Each of the HexA and HexB proteins encoded by a bicistronic construct may comprise an amino acid sequence that is at least 70% (e.g., at least 70%, 80%, 90%, 95%, 99%, etc.) identical to an amino acid sequence as set forth in SEQ ID NO: 1 or 2, respectively.

In some embodiments, a transgene (e.g., a transgene encoding HexA) comprises a nucleic acid sequence that is at least 70% (e.g., at least 70%, 80%, 90%, 95%, 99%, etc.) identical to a HexA-encoding nucleic acid sequence (e.g. wild-type HexA nucleic acid sequence, codon-optimized HexA encoding sequence, etc.) as set forth in any one of SEQ ID NOs: 3-9 (or a portion thereof). In some embodiments, a transgene (e.g., a transgene encoding HexB) comprises a nucleic acid sequence that is at least 70% (e.g., at least 70%, 80%, 90%, 95%, 99%, etc.) identical to a HexB-encoding nucleic acid sequence (e.g. wild-type HexB nucleic acid sequence, codon-optimized HexB encoding sequence, etc.) as set forth in any one of SEQ ID NOs: 3-9 (or a portion thereof).

A "nucleic acid" sequence refers to a DNA or RNA sequence. In some embodiments, proteins and nucleic acids of the disclosure are isolated. As used herein, the term "isolated" means artificially produced. As used herein with respect to nucleic acids, the term "isolated" means: (i) amplified in vitro by, for example, polymerase chain reaction (PCR); (ii) recombinantly produced by cloning; (iii) purified, as by cleavage and gel separation; or (iv) synthesized by, for example, chemical synthesis. An isolated nucleic acid is one which is readily manipulable by recombinant DNA techniques well known in the art. Thus, a nucleotide sequence contained in a vector in which 5' and 3' restriction sites are known or for which polymerase chain reaction (PCR) primer sequences have been disclosed is considered isolated but a nucleic acid sequence existing in its native state in its natural host is not. An isolated nucleic acid may be substantially purified, but need not be. For example, a nucleic acid that is isolated within a cloning or expression vector is not pure in that it may comprise only a tiny percentage of the material in the cell in which it resides. Such a nucleic acid is isolated, however, as the term is used herein because it is readily manipulable by standard techniques known to those of ordinary skill in the art. As used herein with respect to proteins or peptides, the term "isolated" refers to a protein or peptide that has been isolated from its natural environment or artificially produced (e.g., by chemical synthesis, by recombinant DNA technology, etc.).

The isolated nucleic acids of the invention may be recombinant adeno-associated virus (AAV) vectors (rAAV vectors). In some embodiments, an isolated nucleic acid as described by the disclosure comprises a region (e.g., a first region) comprising a first adeno-associated virus (AAV) inverted terminal repeat (ITR), or a variant thereof. The isolated nucleic acid (e.g., the recombinant AAV vector) may be packaged into a capsid protein and administered to a subject and/or delivered to a selected target cell. "Recombinant AAV (rAAV) vectors" are typically composed of, at a minimum, a transgene and its regulatory sequences, and 5' and 3' AAV inverted terminal repeats (ITRs). The transgene may comprise a region encoding, for example, a protein and/or an expression control sequence (e.g., a poly-A tail), as described elsewhere in the disclosure.

Generally, ITR sequences are about 145 bp in length. Preferably, substantially the entire sequences encoding the ITRs are used in the molecule, although some degree of minor modification of these sequences is permissible. The ability to modify these ITR sequences is within the skill of the art. (See, e.g., texts such as Sambrook et al., "Molecular Cloning. A Laboratory Manual", 2d ed., Cold Spring Harbor Laboratory, New York (1989); and K. Fisher et al., J Virol., 70:520 532 (1996)). An example of such a molecule employed in the present invention is a "cis-acting" plasmid containing the transgene, in which the selected transgene sequence and associated regulatory elements are flanked by the 5' and 3' AAV ITR sequences. The AAV ITR sequences may be obtained from any known AAV, including presently identified mammalian AAV types. In some embodiments, the isolated nucleic acid (e.g., the rAAV vector) comprises at least one ITR having a serotype selected from AAV1, AAV2, AAV3, AAV4, AAV5, AAV6, and variants thereof.

In some embodiments, the isolated nucleic acid further comprises a region (e.g., a second region, a third region, a fourth region, etc.) comprising a second AAV ITR. In some embodiments, the second AAV ITR has a serotype selected from AAV1, AAV2, AAV3, AAV4, AAV5, AAV6, and variants thereof.

In addition to the major elements identified above for the recombinant AAV vector, the vector also includes conventional control elements which are operably linked with elements of the transgene in a manner that permits its transcription, translation and/or expression in a cell transfected with the vector or infected with the virus produced by the invention. As used herein, "operably linked" sequences include both expression control sequences that are contiguous with the gene of interest and expression control sequences that act in trans or at a distance to control the gene of interest. Expression control sequences include appropriate transcription initiation, termination, promoter and enhancer sequences; efficient RNA processing signals such as splicing and polyadenylation (polyA) signals; sequences that stabilize cytoplasmic mRNA; sequences that enhance translation efficiency (e.g., Kozak consensus sequence); sequences that enhance protein stability; and when desired, sequences that enhance secretion of the encoded product. A number of expression control sequences, including promoters which are native, constitutive, inducible and/or tissue-specific, are known in the art and may be utilized.

As used herein, a nucleic acid sequence (e.g., coding sequence) and regulatory sequences are said to be operably linked when they are covalently linked in such a way as to place the expression or transcription of the nucleic acid sequence under the influence or control of the regulatory sequences. If it is desired that the nucleic acid sequences be translated into a functional protein, two DNA sequences are said to be operably linked if induction of a promoter in the 5' regulatory sequences results in the transcription of the coding sequence and if the nature of the linkage between the two DNA sequences does not (1) result in the introduction of a frame-shift mutation, (2) interfere with the ability of the promoter region to direct the transcription of the coding sequences, or (3) interfere with the ability of the corresponding RNA transcript to be translated into a protein. Thus, a promoter region would be operably linked to a nucleic acid sequence if the promoter region were capable of effecting transcription of that DNA sequence such that the resulting transcript might be translated into the desired protein or polypeptide. Similarly two or more coding regions are operably linked when they are linked in such a way that their transcription from a common promoter results in the expression of two or more proteins having been translated in frame. In some embodiments, operably linked coding sequences yield a fusion protein.

A region comprising a transgene (e.g., a second region, third region, fourth region, etc.) may be positioned at any suitable location of the isolated nucleic acid. The region may be positioned in any untranslated portion of the nucleic acid, including, for example, an intron, a 5' or 3' untranslated region, etc.

In some cases, it may be desirable to position the region (e.g., the second region, third region, fourth region, etc.) upstream of the first codon of a nucleic acid sequence encoding a protein (e.g., a protein coding sequence). For example, the region may be positioned between the first codon of a protein coding sequence) and 2000 nucleotides upstream of the first codon. The region may be positioned between the first codon of a protein coding sequence and 1000 nucleotides upstream of the first codon. The region may be positioned between the first codon of a protein coding sequence and 500 nucleotides upstream of the first codon. The region may be positioned between the first codon of a protein coding sequence and 250 nucleotides upstream of the first codon. The region may be positioned between the first codon of a protein coding sequence and 150 nucleotides upstream of the first codon.

In some cases (e.g., when a transgene lacks a protein coding sequence), it may be desirable to position the region (e.g., the second region, third region, fourth region, etc.) upstream of the poly-A signal of a transgene. For example, the region may be positioned between the first base of the poly-A signal and 2000 nucleotides upstream of the first base. The region may be positioned between the first base of the poly-A signal and 1000 nucleotides upstream of the first base. The region may be positioned between the first base of the poly-A signal and 500 nucleotides upstream of the first base. The region may be positioned between the first base of the poly-A signal and 250 nucleotides upstream of the first base. The region may be positioned between the first base of the poly-A signal and 150 nucleotides upstream of the first base. The region may be positioned between the first base of the poly-A signal and 100 nucleotides upstream of the first base. The region may be positioned between the first base of the poly-A signal and 50 nucleotides upstream of the first base. The region may be positioned between the first base of the poly-A signal and 20 nucleotides upstream of the first base. In some embodiments, the region is positioned between the last nucleotide base of a promoter sequence and the first nucleotide base of a poly-A signal sequence.

In some cases, the region may be positioned downstream of the last base of the poly-A signal of a transgene. The region may be between the last base of the poly-A signal and a position 2000 nucleotides downstream of the last base. The region may be between the last base of the poly-A signal and a position 1000 nucleotides downstream of the last base. The region may be between the last base of the poly-A signal and a position 500 nucleotides downstream of the last base. The region may be between the last base of the poly-A signal and a position 250 nucleotides downstream of the last base. The region may be between the last base of the poly-A signal and a position 150 nucleotides downstream of the last base.

It should be appreciated that in cases where a transgene encodes more than one polypeptide, each polypeptide may be positioned in any suitable location within the transgene. For example, a nucleic acid encoding a first polypeptide may be positioned in an intron of the transgene and a nucleic acid sequence encoding a second polypeptide may be positioned in another untranslated region (e.g., between the last codon of a protein coding sequence and the first base of the poly-A signal of the transgene).

A "promoter" refers to a DNA sequence recognized by the synthetic machinery of the cell, or introduced synthetic machinery, required to initiate the specific transcription of a gene. The phrases "operatively positioned," "under control" or "under transcriptional control" means that the promoter is in the correct location and orientation in relation to the nucleic acid to control RNA polymerase initiation and expression of the gene.

For nucleic acids encoding proteins, a polyadenylation sequence generally is inserted following the transgene sequences and before the 3' AAV ITR sequence. A rAAV construct useful in the present disclosure may also contain an intron, desirably located between the promoter/enhancer sequence and the transgene. One possible intron sequence is derived from SV-40, and is referred to as the SV-40 T intron sequence. Another vector element that may be used is an internal ribosome entry site (IRES). An IRES sequence is used to produce more than one polypeptide from a single gene transcript. An IRES sequence would be used to produce a protein that contain more than one polypeptide chains. Selection of these and other common vector elements are conventional and many such sequences are available [see, e.g., Sambrook et al., and references cited therein at, for example, pages 3.18 3.26 and 16.17 16.27 and Ausubel et al., Current Protocols in Molecular Biology, John Wiley & Sons, New York, 1989]. In some embodiments, a Foot and Mouth Disease Virus 2A sequence is included in polyprotein; this is a small peptide (approximately 18 amino acids in length) that has been shown to mediate the cleavage of polyproteins (Ryan, M D et al., EMBO, 1994; 4: 928-933;

Mattion, N M et al., J Virology, November 1996; p. 8124-8127; Furler, S et al., Gene Therapy, 2001; 8: 864-873; and Halpin, C et al., The Plant Journal, 1999; 4: 453-459). The cleavage activity of the 2A sequence has previously been demonstrated in artificial systems including plasmids and gene therapy vectors (AAV and retroviruses) (Ryan, M D et al., EMBO, 1994; 4: 928-933; Mattion, N M et al., J Virology, November 1996; p. 8124-8127; Furler, S et al., Gene Therapy, 2001; 8: 864-873; and Halpin, C et al., The Plant Journal, 1999; 4: 453-459; de Felipe, P et al., Gene Therapy, 1999; 6: 198-208; de Felipe, P et al., Human Gene Therapy, 2000; 11: 1921-1931.; and Klump, H et al., Gene Therapy, 2001; 8: 811-817).

Examples of constitutive promoters include, without limitation, the retroviral Rous sarcoma virus (RSV) LTR promoter (optionally with the RSV enhancer), the cytomegalovirus (CMV) promoter (optionally with the CMV enhancer) [see, e.g., Boshart et al., Cell, 41:521-530 (1985)], the SV40 promoter, the dihydrofolate reductase promoter, the β-actin promoter, the phosphoglycerol kinase (PGK) promoter, and the EF1α promoter [Invitrogen]. In some embodiments, a promoter is a P2 promoter. In some embodiments, a promoter is a chicken β-actin (CBA) promoter. In some embodiments, a promoter is two CBA promoters. In some embodiments, a promoter is two CBA promoters separated by a CMV enhancer.

Inducible promoters allow regulation of gene expression and can be regulated by exogenously supplied compounds, environmental factors such as temperature, or the presence of a specific physiological state, e.g., acute phase, a particular differentiation state of the cell, or in replicating cells only. Inducible promoters and inducible systems are available from a variety of commercial sources, including, without limitation, Invitrogen, Clontech and Ariad. Many other systems have been described and can be readily selected by one of skill in the art. Examples of inducible promoters regulated by exogenously supplied promoters include the zinc-inducible sheep metallothionine (MT) promoter, the dexamethasone (Dex)-inducible mouse mammary tumor virus (MMTV) promoter, the T7 polymerase promoter system (WO 98/10088); the ecdysone insect promoter (No et al., Proc. Natl. Acad. Sci. USA, 93:3346-3351 (1996)), the tetracycline-repressible system (Gossen et al., Proc. Natl. Acad. Sci. USA, 89:5547-5551 (1992)), the tetracycline-inducible system (Gossen et al., Science, 268:1766-1769 (1995), see also Harvey et al., Curr. Opin. Chem. Biol., 2:512-518 (1998)), the RU486-inducible system (Wang et al., Nat. Biotech., 15:239-243 (1997) and Wang et al., Gene Ther., 4:432-441 (1997)) and the rapamycin-inducible system (Magari et al., J. Clin. Invest., 100:2865-2872 (1997)). Still other types of inducible promoters which may be useful in this context are those which are regulated by a specific physiological state, e.g., temperature, acute phase, a particular differentiation state of the cell, or in replicating cells only.

In another embodiment, the native promoter for the transgene will be used. The native promoter may be preferred when it is desired that expression of the transgene should mimic the native expression. The native promoter may be used when expression of the transgene must be regulated temporally or developmentally, or in a tissue-specific manner, or in response to specific transcriptional stimuli. In a further embodiment, other native expression control elements, such as enhancer elements, polyadenylation sites or Kozak consensus sequences may also be used to mimic the native expression.

In some embodiments, the regulatory sequences impart tissue-specific gene expression capabilities. In some cases, the tissue-specific regulatory sequences bind tissue-specific transcription factors that induce transcription in a tissue specific manner. Such tissue-specific regulatory sequences (e.g., promoters, enhancers, etc.) are well known in the art. Exemplary tissue-specific regulatory sequences include, but are not limited to the following tissue specific promoters: a liver-specific thyroxin binding globulin (TBG) promoter, an insulin promoter, a glucagon promoter, a somatostatin promoter, a pancreatic polypeptide (PPY) promoter, a synapsin-1 (Syn) promoter, a creatine kinase (MCK) promoter, a mammalian desmin (DES) promoter, a α-myosin heavy chain (α-MHC) promoter, or a cardiac Troponin T (cTnT) promoter. Other exemplary promoters include Beta-actin promoter, hepatitis B virus core promoter, Sandig et al., Gene Ther., 3:1002-9 (1996); alpha-fetoprotein (AFP) promoter, Arbuthnot et al., Hum. Gene Ther., 7:1503-14 (1996)), bone osteocalcin promoter (Stein et al., Mol. Biol. Rep., 24:185-96 (1997)); bone sialoprotein promoter (Chen et al., J. Bone Miner. Res., 11:654-64 (1996)), CD2 promoter (Hansal et al., J. Immunol., 161:1063-8 (1998); immunoglobulin heavy chain promoter; T cell receptor α-chain promoter, neuronal such as neuron-specific enolase (NSE) promoter (Andersen et al., Cell. Mol. Neurobiol., 13:503-15 (1993)), neurofilament light-chain gene promoter (Piccioli et al., Proc. Natl. Acad. Sci. USA, 88:5611-5 (1991)), and the neuron-specific vgf gene promoter (Piccioli et al., Neuron, 15:373-84 (1995)), among others which will be apparent to the skilled artisan.

Aspects of the disclosure relate to an isolated nucleic acid comprising more than one promoter (e.g., 2, 3, 4, 5, or more promoters). For example, in the context of a construct having a transgene comprising a first region encoding a protein and an second region encoding a protein it may be desirable to drive expression of the first protein coding region using a first promoter sequence (e.g., a first promoter sequence operably linked to the protein coding region), and to drive expression of the second protein coding region with a second promoter sequence (e.g., a second promoter sequence operably linked to the second protein coding region). Generally, the first promoter sequence and the second promoter sequence can be the same promoter sequence or different promoter sequences. In some embodiments, the first promoter sequence (e.g., the promoter driving expression of the protein coding region) is a RNA polymerase III (pol III) promoter sequence. Non-limiting examples of pol III promoter sequences include U6 and H1 promoter sequences. In some embodiments, the second promoter sequence (e.g., the promoter sequence driving expression of the second protein) is a RNA polymerase II (pol II) promoter sequence. Non-limiting examples of pol II promoter sequences include T7, T3, SP6, RSV, and cytomegalovirus promoter sequences. In some embodiments, a pol III promoter sequence drives expression of the first protein coding region. In some embodiments, a pol II promoter sequence drives expression of the second protein coding region.

In some embodiments, the nucleic acid comprises a transgene that encodes a protein. The protein can be a therapeutic protein (e.g., a peptide, protein, or polypeptide useful for the treatment or prevention of disease states in a mammalian subject) or a reporter protein. In some embodiments, the therapeutic protein is useful for treatment or prevention of lysosomal storage diseases such as Tay-Sachs or Sandhoff disease, including, but not limited to, Hexosaminidase A (HexA) and Hexosaminidase B (HexB).

Bicistronic Nucleic Acid Constructs

Some aspects of this invention provide bicistronic nucleic acid constructs. The term "cistron" refers to a nucleic acid cassette sufficient for expression of a gene product. In some embodiments, a cistron is an expression cassette. Accordingly, some aspects of this invention provide nucleic acid constructs comprising two or more cistrons, for example, two or more expression cassettes. The term "expression cassette" refers to a nucleic construct comprising nucleic acid elements sufficient for the expression of a gene product. Typically, an expression cassette comprises a nucleic acid encoding a gene product operatively linked to a promoter sequence. Encoding sequences can be operatively linked to regulatory sequences in sense or antisense orientation. In some embodiments, the promoter is a heterologous promoter. The term "heterologous promoter", as used herein, refers to a promoter that does is not found to be operatively linked to a given encoding sequence in nature. In some embodiments, an expression cassette may comprise additional elements, for example, an intron, an enhancer, a polyadenylation site, a woodchuck hepatitis virus post-transcriptional regulatory element (WPRE), and/or other elements known to affect expression levels of the encoding sequence. Without wishing to be bound by theory, inclusion of an intron in an expression cassette, for example, between the transcriptional start site and an encoding nucleic acid sequence, for example, a protein-encoding cDNA sequence, is believed to result in increased expression levels of the encoding nucleic acid and the encoded gene product as compared to an expression construct not including an intron.

The term "intron" refers to a nucleic acid sequence in an expression cassette that is removed after transcription of a primary transcript by a cellular process termed splicing. Intron sequences generally comprise a splice donor and a splice acceptor and sequences of such donor and acceptor sites are well known to those of skill in the art. "Chimeric intron" as used herein, are composed of nucleic acid sequences from two or more different sources.

Some aspects of this invention provide bicistronic expression constructs comprising two or more expression cassettes in various configurations.

In different embodiments, bicistronic expression constructs are provided in which the expression cassettes are positioned in different ways. For example, in some embodiments, a multicistronic expression construct is provided in which a first expression cassette is positioned adjacent to a second expression cassette. In some embodiments, the first expression cassette and the second expression cassette are operably linked by a bidirectional promoter, wherein the first expression cassette and the second expression cassette are flanked by adeno-associated virus (AAV) inverted terminal repeats (ITRs).

In different embodiments, bicistronic expression constructs are provided in which the expression cassettes are oriented in different ways. For example, in some embodiments, bicistronic expression construct is provided comprising a first and a second expression cassette in opposite orientations.

The term "orientation" as used herein in connection with expression cassettes, refers to the directional characteristic of a given cassette or structure. In some embodiments, an expression cassette harbors a promoter 5' of the encoding nucleic acid sequence, and transcription of the encoding nucleic acid sequence runs from the 5' terminus to the 3' terminus of the sense strand, making it a directional cassette (e.g., 5'-promoter/(intron)/encoding sequence-3'). Since virtually all expression cassettes are directional in this sense, those of skill in the art can easily determine the orientation of a given expression cassette in relation to a second nucleic acid structure, for example, a second expression cassette, a viral genome, or, if the cassette is comprised in an AAV construct, in relation to an AAV ITR.

For example, if a given nucleic acid construct comprises two expression cassettes in the configuration 5'-promoter 1/encoding sequence 1---promoter2/encoding sequence 2-3',

>>>>>>>>>>>>>>>>>>>>>>>>

>>>>>>>>>>>>>>>>>>>>>>>> the expression cassettes are in the same orientation, the arrows indicate the direction of transcription of each of the cassettes. For another example, if a given nucleic acid construct comprises a sense strand comprising two expression cassettes in the configuration 5'-promoter 1/encoding sequence 1---encoding sequence 2/promoter 2-3',

>>>>>>>>>>>>>>>>>>>>>>>>

<<<<<<<<<<<<<<<<<<<<< the expression cassettes are in opposite orientation to each other and, as indicated by the arrows, the direction of transcription of the expression cassettes, are opposed. In this example, the strand shown comprises the antisense strand of promoter 2 and encoding sequence 2.

For another example, if an expression cassette is comprised in an AAV construct, the cassette can either be in the same orientation as an AAV ITR or a second expression cassette (e.g., transcription of the expression cassette proceeds in the same direction as transcription of the AAV ITR or second expression cassette), or in opposite orientation (e.g., transcription of the expression cassette proceeds in the opposite direction (e.g., distally) as transcription of the AAV ITR or second expression cassette). AAV ITRs are directional. For example, an AAV construct comprising a 5'ITR exemplified in FIG. 1 (top) would be in the same orientation as the HexA expression cassette expression cassette. In another example, an AAV construct comprising the 5'ITR exemplified in FIG. 1 (bottom), would be in the opposite orientation as the HexA expression cassette expression cassette.

A large body of evidence suggests that bicistronic expression constructs often do not achieve optimal expression levels as compared to expression systems containing only one cistron. One of the suggested causes of sub-par expression levels achieved with bicistronic expression constructs comprising two or more promoter elements is the phenomenon of promoter interference (see, e.g., Curtin J A, Dane A P, Swanson A, Alexander I E, Ginn S L. Bidirectional promoter interference between two widely used internal heterologous promoters in a late-generation lentiviral construct. Gene Ther. 2008 March; 15(5):384-90; and Martin-Duque P, Jezzard S, Kaftansis L, Vassaux G. Direct comparison of the insulating properties of two genetic elements in an adenoviral vector containing two different expression cassettes. Hum Gene Ther. 2004 October; 15(10):995-1002; both references incorporated herein by reference for disclosure of promoter interference phenomenon). Various strategies have been suggested to overcome the problem of promoter interference, for example, by producing bicistronic expression constructs comprising only one promoter driving transcription of multiple encoding nucleic acid sequences separated by internal ribosomal entry sites, or by separating cistrons comprising their own promoter with transcriptional insulator elements. All suggested strategies to overcome promoter interference are burdened with their own set of problems, though. For example, single-promoter driven expression of multiple cistrons usually results in uneven expression levels of the cistrons. Further some promoters cannot efficiently be isolated and isolation elements are not compatible with some gene transfer vectors, for example, some retroviral vectors.

In some embodiments, a bicistronic expression construct is provided that allows efficient expression of a first encoding nucleic acid sequence driven by a first promoter and of a second encoding nucleic acid sequence driven by a second promoter without the use of transcriptional insulator elements. Various configurations of such bicistronic expression constructs are provided herein, for example, expression constructs harboring a first expression cassette comprising an intron and a second expression cassette comprising an intron, wherein the first expression cassette and second expression cassette are under the control of separate promoters located proximal to the AAV ITRs that flank the first expression cassette and the second expression cassette. In some embodiments, the first expression cassette and the second expression cassette are operably linked by a bidirectional promoter and are flanked by AAV ITRs.

In some embodiments, bicistronic expression constructs are provided allowing for efficient expression of two or more encoding nucleic acid sequences. In some embodiments, the bicistronic expression construct comprises two expression cassettes. In some embodiments, a first expression cassette of a bicistronic expression construct as provided herein comprises an RNA polymerase II promoter and a second expression cassette comprises an RNA polymerase III promoter. In some embodiments, a first expression cassette comprises a P2 promoter and a second expression cassette comprises a P2 promoter. In some embodiments, a first expression cassette and a second expression cassette are operably linked by a bidirectional promoter. In some embodiments, the bicistronic expression construct provided is a recombinant AAV (rAAV) construct.

Recombinant Adeno-Associated Viruses (rAAVs)

In some aspects, the disclosure provides isolated adeno-associated viruses (AAVs). As used herein with respect to AAVs, the term "isolated" refers to an AAV that has been artificially produced or obtained. Isolated AAVs may be produced using recombinant methods. Such AAVs are referred to herein as "recombinant AAVs". Recombinant AAVs (rAAVs) preferably have tissue-specific targeting capabilities, such that a nuclease and/or transgene of the rAAV will be delivered specifically to one or more predetermined tissue(s). The AAV capsid is an important element in determining these tissue-specific targeting capabilities. Thus, an rAAV having a capsid appropriate for the tissue being targeted can be selected.

Methods for obtaining recombinant AAVs having a desired capsid protein are well known in the art. (See, for example, US 2003/0138772), the contents of which are incorporated herein by reference in their entirety). Typically the methods involve culturing a host cell which contains a nucleic acid sequence encoding an AAV capsid protein; a functional rep gene; a recombinant AAV vector composed of AAV inverted terminal repeats (ITRs) and a transgene; and sufficient helper functions to permit packaging of the recombinant AAV vector into the AAV capsid proteins. In some embodiments, capsid proteins are structural proteins encoded by the cap gene of an AAV. AAVs comprise three capsid proteins, virion proteins 1 to 3 (named VP1, VP2 and VP3), all of which are transcribed from a single cap gene via alternative splicing. In some embodiments, the molecular weights of VP1, VP2 and VP3 are respectively about 87 kDa, about 72 kDa and about 62 kDa. In some embodiments, upon translation, capsid proteins form a spherical 60-mer protein shell around the viral genome. In some embodiments, the functions of the capsid proteins are to protect the viral genome, deliver the genome and interact with the host. In some aspects, capsid proteins deliver the viral genome to a host in a tissue specific manner.

In some embodiments, an AAV capsid protein is of an AAV serotype selected from the group consisting of AAV1, AAV2, AAV3, AAV4, AAV5, AAV6, AAV7, AAV8, AAVrh8, AAV9, AAV10, AAVrh10, and AAV.PHP.B. In some embodiments, an AAV capsid protein is of a serotype derived from a non-human primate, for example AAVrh8 serotype. In some embodiments, an AAV capsid protein is of a serotype derived for broad and efficient CNS transduction, for example AAV.PHP.B. In some embodiments, the capsid protein is of AAV serotype 9.

The components to be cultured in the host cell to package a rAAV vector in an AAV capsid may be provided to the host cell in trans. Alternatively, any one or more of the required components (e.g., recombinant AAV vector, rep sequences, cap sequences, and/or helper functions) may be provided by a stable host cell which has been engineered to contain one or more of the required components using methods known to those of skill in the art. Most suitably, such a stable host cell will contain the required component(s) under the control of an inducible promoter. However, the required component(s) may be under the control of a constitutive promoter. Examples of suitable inducible and constitutive promoters are provided herein, in the discussion of regulatory elements suitable for use with the transgene. In still another alternative, a selected stable host cell may contain selected component(s) under the control of a constitutive promoter and other selected component(s) under the control of one or more inducible promoters. For example, a stable host cell may be generated which is derived from 293 cells (which contain E1 helper functions under the control of a constitutive promoter), but which contain the rep and/or cap proteins under the control of inducible promoters. Still other stable host cells may be generated by one of skill in the art.

In some embodiments, the instant disclosure relates to a host cell containing a nucleic acid that comprises a coding sequence encoding a protein or proteins (e.g., HEXA and HEXB proteins). In some embodiments, the host cell is a mammalian cell, a yeast cell, a bacterial cell, an insect cell, a plant cell, or a fungal cell.

The recombinant AAV vector, rep sequences, cap sequences, and helper functions required for producing the rAAV of the disclosure may be delivered to the packaging host cell using any appropriate genetic element (vector). The selected genetic element may be delivered by any suitable method, including those described herein. The methods used to construct any embodiment of this disclosure are known to those with skill in nucleic acid manipulation and include genetic engineering, recombinant engineering, and synthetic techniques. See, e.g., Sambrook et al., Molecular Cloning: A Laboratory Manual, Cold Spring Harbor Press, Cold Spring Harbor, N.Y. Similarly, methods of generating rAAV virions are well known and the selection of a suitable method is not a limitation on the present disclosure. See, e.g., K. Fisher et al., J. Virol., 70:520-532 (1993) and U.S. Pat. No. 5,478,745.

In some embodiments, recombinant AAVs may be produced using the triple transfection method (described in detail in U.S. Pat. No. 6,001,650). Typically, the recombinant AAVs are produced by transfecting a host cell with an AAV vector (comprising a transgene flanked by ITR elements) to be packaged into AAV particles, an AAV helper function vector, and an accessory function vector. An AAV helper function vector encodes the "AAV helper function" sequences (e.g., rep and cap), which function in trans for productive AAV replication and encapsidation. Preferably, the AAV helper function vector supports efficient AAV vector production without generating any detectable wild-type AAV virions (e.g., AAV virions containing functional rep and cap genes). Non-limiting examples of vectors suitable for use with the present disclosure include pHLP19, described in U.S. Pat. No. 6,001,650 and pRep6cap6 vector, described in U.S. Pat. No. 6,156,303, the entirety of both incorporated by reference herein. The accessory function vector encodes nucleotide sequences for non-AAV derived viral and/or cellular functions upon which AAV is dependent for replication (e.g., "accessory functions"). The accessory functions include those functions required for AAV replication, including, without limitation, those moieties involved in activation of AAV gene transcription, stage specific AAV mRNA splicing, AAV DNA replication, synthesis of cap expression products, and AAV capsid assembly. Viral-based accessory functions can be derived from any of the known helper viruses such as adenovirus, herpesvirus (other than herpes simplex virus type-1), and vaccinia virus.

In some aspects, the disclosure provides transfected host cells. The term "transfection" is used to refer to the uptake of foreign DNA by a cell, and a cell has been "transfected" when exogenous DNA has been introduced inside the cell membrane. A number of transfection techniques are generally known in the art. See, e.g., Graham et al. (1973) Virology, 52:456, Sambrook et al. (1989) Molecular Cloning, a laboratory manual, Cold Spring Harbor Laboratories, New York, Davis et al. (1986) Basic Methods in Molecular Biology, Elsevier, and Chu et al. (1981) Gene 13:197. Such techniques can be used to introduce one or more exogenous nucleic acids, such as a nucleotide integration vector and other nucleic acid molecules, into suitable host cells.

A "host cell" refers to any cell that harbors, or is capable of harboring, a substance of interest. Often a host cell is a mammalian cell. A host cell may be used as a recipient of an AAV helper construct, an AAV minigene plasmid, an accessory function vector, or other transfer DNA associated with the production of recombinant AAVs. The term includes the progeny of the original cell which has been transfected. Thus, a "host cell" as used herein may refer to a cell which has been transfected with an exogenous DNA sequence. It is understood that the progeny of a single parental cell may not necessarily be completely identical in morphology or in genomic or total DNA complement as the original parent, due to natural, accidental, or deliberate mutation.

As used herein, the term "cell line" refers to a population of cells capable of continuous or prolonged growth and division in vitro. Often, cell lines are clonal populations derived from a single progenitor cell. It is further known in the art that spontaneous or induced changes can occur in karyotype during storage or transfer of such clonal populations. Therefore, cells derived from the cell line referred to may not be precisely identical to the ancestral cells or cultures, and the cell line referred to includes such variants.

As used herein, the terms "recombinant cell" refers to a cell into which an exogenous DNA segment, such as DNA segment that leads to the transcription of a biologically-active polypeptide or production of a biologically active nucleic acid such as an RNA, has been introduced.

As used herein, the term "vector" includes any genetic element, such as a plasmid, phage, transposon, cosmid, chromosome, artificial chromosome, virus, virion, etc., which is capable of replication when associated with the proper control elements and which can transfer gene sequences between cells. Thus, the term includes cloning and expression vehicles, as well as viral vectors. In some embodiments, useful vectors are contemplated to be those vectors in which the nucleic acid segment to be transcribed is positioned under the transcriptional control of a promoter. A "promoter" refers to a DNA sequence recognized by the synthetic machinery of the cell, or introduced synthetic machinery, required to initiate the specific transcription of a gene. The phrases "operatively positioned," "under control" or "under transcriptional control" means that the promoter is in the correct location and orientation in relation to the nucleic acid to control RNA polymerase initiation and expression of the gene. The term "expression vector or construct" means any type of genetic construct containing a nucleic acid in which part or all of the nucleic acid encoding sequence is capable of being transcribed. In some embodiments, expression includes transcription of the nucleic acid, for example, to generate a biologically-active polypeptide product from a transcribed gene. The foregoing methods for packaging recombinant vectors in desired AAV capsids to produce the rAAVs of the disclosure are not meant to be limiting and other suitable methods will be apparent to the skilled artisan.

Methods for Treating Lysosomal Storage Diseases

Methods for delivering a transgene to a subject are provided by the disclosure. A subject may be any mammal, for example a human, non-human primate, rodent, dog, cat, horse, pig, etc. In some embodiments, a subject is a human. The methods typically involve administering to a subject an effective amount of isolated nucleic acid encoding hexosaminidase A (HEXA) and hexosaminidase B (HEXB) (e.g., wild-type HEXA and/or HEXB, codon optimized HEXA and/or HEXB, or any combination of the foregoing) proteins capable of compensating for mutant HEXA and HEXB proteins in a subject. HEXA and HEXB proteins form the heterodimeric isozyme beta-hexosaminidase A, which is the lysosomal protein/enzyme in human that breaks down GM2 ganglioside. As such, bi-allelic mutations in a HEXA gene and/or a HEXB gene generally result in the toxic accumulation of GM2 ganglioside and lysosomal storage disorders.

As used herein, a "lysosomal storage disorder" refers to an inherited metabolic disease characterized by an abnormal build-up of GM2 ganglioside in cells, particularly neurons, resulting from bi-allelic mutations in a HEXA gene and/or a HEXB gene. In some embodiments, a subject is characterized by having a mutation in a HEXA gene resulting in reduced or loss of function of the beta-hexosaminidase A protein of the subject. In some embodiments, a subject is characterized by having a mutation in a HEXB gene resulting in a reduced or loss of function of the beta-hexosaminidase A protein of the subject. "Bi-allelic mutations" refers to both copies of a gene, in this case either HEXA and/or HEXB, possessing alterations in amino acid sequence. The progressive build-up of GM2 ganglioside in lysosomes leads to the destruction of neurons. In some embodiments, the lysosomal storage disorder is Tay-Sachs disease (TSD), a condition caused by reduced or loss of function of the HEXA protein. In some embodiments, the lysosomal storage disorder is Sandhoff disease (SD), a condition caused by reduced or loss of function of the HEXB protein.

An "effective amount" of a substance is an amount sufficient to produce a desired effect. In some embodiments, an effective amount of an isolated nucleic acid is an amount sufficient to transfect (or infect in the context of rAAV mediated delivery) a sufficient number of target cells of a target tissue of a subject. In some embodiments, a target tissue is central nervous system (CNS) tissue (e.g., brain tissue, spinal cord tissue, cerebrospinal fluid (CSF), etc.). In some embodiments, an effective amount of an isolated nucleic acid (e.g., which may be delivered via an rAAV) may be an amount sufficient to have a therapeutic benefit in a subject, e.g., to compensate for reduction or loss of function of a protein resulting from mutation of a gene (e.g., HEXA or HEXB), to extend the lifespan of a subject, to improve in the subject one or more symptoms of disease (e.g., a symptom of TSD or SD), etc. The effective amount will depend on a variety of factors such as, for example, the species, age, weight, health of the subject, and the tissue to be targeted, and may thus vary among subject and tissue as described elsewhere in the disclosure.

In some embodiments an isolated nucleic acid or rAAV as described herein is useful to treat a lysosomal storage disease, for example Tay-Sachs disease or Sandhoff disease. As used herein, the term "treating" refers to the application or administration of a composition encoding an isolated nucleic acid (e.g., an rAAV comprising an isolated nucleic acid) as described herein to a subject, who has a lysosomal storage disease, a symptom of a lysosomal storage disease, or a predisposition toward a lysosomal storage disease (e.g., one or more mutations in the HEXA gene, HEXB gene, etc.), with the purpose to cure, heal, alleviate, relieve, alter, remedy, ameliorate, improve, or affect the disorder, the symptom of the disease, or the predisposition toward the lysosomal storage disease.

Alleviating a lysosomal storage disease includes delaying the development or progression of the disease, or reducing disease severity. Alleviating the disease does not necessarily require curative results. As used therein, "delaying" the development of a lysosomal storage disease means to defer, hinder, slow, retard, stabilize, and/or postpone progression of the disease. This delay can be of varying lengths of time, depending on the history of the disease and/or individuals being treated. A method that "delays" or alleviates the development of a disease, or delays the onset of the disease, is a method that reduces probability of developing one or more symptoms of the disease in a given time frame and/or reduces extent of the symptoms in a given time frame, when compared to not using the method. Such comparisons are typically based on clinical studies, using a number of subjects sufficient to give a statistically significant result.

"Development" or "progression" of a disease means initial manifestations and/or ensuing progression of the disease. Development of the disease can be detectable and assessed using standard clinical techniques as well known in the art. However, development also refers to progression that may be undetectable. For purpose of this disclosure, development or progression refers to the biological course of the symptoms. "Development" includes occurrence, recurrence, and onset. As used herein "onset" or "occurrence" of a lysosomal storage disease includes initial onset and/or recurrence.

Modes of Administration

The rAAVs of the disclosure may be delivered to a subject in compositions according to any appropriate methods known in the art. For example, an rAAV, preferably suspended in a physiologically compatible carrier (e.g., in a composition), may be administered to a subject, i.e. host animal, such as a human, mouse, rat, cat, dog, sheep, rabbit, horse, cow, goat, pig, guinea pig, hamster, chicken, turkey, or a non-human primate (e.g., Macaque). In some embodiments a host animal does not include a human.

Delivery of the rAAVs to a mammalian subject may be by, for example, intramuscular injection or by administration into the bloodstream of the mammalian subject. Administration into the bloodstream may be by injection into a vein, an artery, or any other vascular conduit. In some embodiments, the rAAVs are administered into the bloodstream by way of isolated limb perfusion, a technique well known in the surgical arts, the method essentially enabling the artisan to isolate a limb from the systemic circulation prior to administration of the rAAV virions. A variant of the isolated limb perfusion technique, described in U.S. Pat. No. 6,177,403, can also be employed by the skilled artisan to administer the virions into the vasculature of an isolated limb to potentially enhance transduction into muscle cells or tissue. Moreover, in certain instances, it may be desirable to deliver the virions to the CNS of a subject. By "CNS" is meant all cells and tissue of the brain and spinal cord of a vertebrate. Thus, the term includes, but is not limited to, neuronal cells, glial cells, astrocytes, cerebrospinal fluid (CSF), interstitial spaces, bone, cartilage and the like. Recombinant AAVs may be delivered directly to the CNS or brain by injection into, e.g., the ventricular region, as well as to the striatum (e.g., the caudate nucleus or putamen of the striatum), thalamus, spinal cord and neuromuscular junction, or cerebellar lobule, with a needle, catheter or related device, using neurosurgical techniques known in the art, such as by stereotactic injection (see, e.g., Stein et al., J Virol 73:3424-3429, 1999; Davidson et al., PNAS 97:3428-3432, 2000; Davidson et al., Nat. Genet. 3:219-223, 1993; and Alisky and Davidson, Hum. Gene Ther. 11:2315-2329, 2000). In some embodiments, an rAAV as described in the disclosure are administered by intravenous injection. In some embodiments, rAAVs are administered by intracerebral injection. In some embodiments, rAAVs are administered by intrathecal injection. In some embodiments, rAAVs are administered by intrastriatal injection. In some embodiments, rAAVs are delivered by intracranial injection. In some embodiments, rAAVs are delivered by cisterna magna injection. In some embodiments, the rAAV are delivered by cerebral lateral ventricle injection.

Aspects of the instant disclosure relate to compositions comprising a recombinant AAV comprising a capsid protein and a nucleic acid encoding a transgene, wherein the transgene comprises a nucleic acid sequence encoding one or more proteins. In some embodiments, each protein comprises a sequence set forth in any one of SEQ ID NO: 1 or 2. In some embodiments, the nucleic acid further comprises AAV ITRs. In some embodiments, the rAAV comprises an rAAV vector represented by the sequence set forth in any one of SEQ ID NOs: 3-9, or a portion thereof. In some embodiments, a composition further comprises a pharmaceutically acceptable carrier.

The compositions of the disclosure may comprise an rAAV alone, or in combination with one or more other viruses (e.g., a second rAAV encoding having one or more different transgenes). In some embodiments, a composition comprises 1, 2, 3, 4, 5, 6, 7, 8, 9, 10, or more different rAAVs each having one or more different transgenes.

Suitable carriers may be readily selected by one of skill in the art in view of the indication for which the rAAV is directed. For example, one suitable carrier includes saline, which may be formulated with a variety of buffering solutions (e.g., phosphate buffered saline). Other exemplary carriers include sterile saline, lactose, sucrose, calcium phosphate, gelatin, dextran, agar, pectin, peanut oil, sesame oil, and water. The selection of the carrier is not a limitation of the present disclosure.

Optionally, the compositions of the disclosure may contain, in addition to the rAAV and carrier(s), other conventional pharmaceutical ingredients, such as preservatives, or chemical stabilizers. Suitable exemplary preservatives include chlorobutanol, potassium sorbate, sorbic acid, sulfur dioxide, propyl gallate, the parabens, ethyl vanillin, glycerin, phenol, parachlorophenol, and poloxamers (non-ionic surfactants) such as Pluronic® F-68. Suitable chemical stabilizers include gelatin and albumin.

The rAAVs are administered in sufficient amounts to transfect the cells of a desired tissue and to provide sufficient levels of gene transfer and expression without undue adverse effects. Conventional and pharmaceutically acceptable routes of administration include, but are not limited to, direct delivery to the selected organ (e.g., intraportal delivery to the liver), oral, inhalation (including intranasal and intratracheal delivery), intraocular, intravenous, intramuscular, subcutaneous, intradermal, intratumoral, and other parental routes of administration. Routes of administration may be combined, if desired.

The dose of rAAV virions required to achieve a particular "therapeutic effect," e.g., the units of dose in genome copies/per kilogram of body weight (GC/kg), will vary based on several factors including, but not limited to: the route of rAAV virion administration, the level of gene or RNA expression required to achieve a therapeutic effect, the specific disease or disorder being treated, and the stability of the gene or RNA product. One of skill in the art can readily determine a rAAV virion dose range to treat a patient having a particular disease or disorder based on the aforementioned factors, as well as other factors that are well known in the art.

An effective amount of an rAAV is an amount sufficient to target infect an animal, target a desired tissue. In some embodiments, an effective amount of an rAAV is administered to the subject during a pre-symptomatic stage of the lysosomal storage disease. In some embodiments, the pre-symptomatic stage of the lysosomal storage disease occurs between birth (e.g., perinatal) and 4-weeks of age.

In some embodiments, rAAV compositions are formulated to reduce aggregation of AAV particles in the composition, particularly where high rAAV concentrations are present (e.g., ~$10^{13}$ GC/mL or more). Methods for reducing aggregation of rAAVs are well known in the art and, include, for example, addition of surfactants, pH adjustment, salt concentration adjustment, etc. (See, e.g., Wright F R, et al., Molecular Therapy (2005) 12, 171-178, the contents of which are incorporated herein by reference.)

Formulation of pharmaceutically-acceptable excipients and carrier solutions is well-known to those of skill in the art, as is the development of suitable dosing and treatment regimens for using the particular compositions described herein in a variety of treatment regimens.

Typically, these formulations may contain at least about 0.1% of the active compound or more, although the percentage of the active ingredient(s) may, of course, be varied and may conveniently be between about 1 or 2% and about 70% or 80% or more of the weight or volume of the total formulation. Naturally, the amount of active compound in each therapeutically-useful composition may be prepared is such a way that a suitable dosage will be obtained in any given unit dose of the compound. Factors such as solubility, bioavailability, biological half-life, route of administration, product shelf life, as well as other pharmacological considerations will be contemplated by one skilled in the art of preparing such pharmaceutical formulations, and as such, a variety of dosages and treatment regimens may be desirable.

In certain circumstances it will be desirable to deliver the rAAV-based therapeutic constructs in suitably formulated pharmaceutical compositions disclosed herein either subcutaneously, intraopancreatically, intranasally, parenterally, intravenously, intramuscularly, intrathecally, or orally, intraperitoneally, or by inhalation. In some embodiments, the administration modalities as described in U.S. Pat. Nos. 5,543,158; 5,641,515 and 5,399,363 (each specifically incorporated herein by reference in its entirety) may be used to deliver rAAVs. In some embodiments, a preferred mode of administration is by portal vein injection.

The pharmaceutical forms suitable for injectable use include sterile aqueous solutions or dispersions and sterile powders for the extemporaneous preparation of sterile injectable solutions or dispersions. Dispersions may also be prepared in glycerol, liquid polyethylene glycols, and mixtures thereof and in oils. Under ordinary conditions of storage and use, these preparations contain a preservative to prevent the growth of microorganisms. In many cases the form is sterile and fluid to the extent that easy syringability exists. It must be stable under the conditions of manufacture and storage and must be preserved against the contaminating action of microorganisms, such as bacteria and fungi. The carrier can be a solvent or dispersion medium containing, for example, water, ethanol, polyol (e.g., glycerol, propylene glycol, and liquid polyethylene glycol, and the like), suitable mixtures thereof, and/or vegetable oils. Proper fluidity may be maintained, for example, by the use of a coating, such as lecithin, by the maintenance of the required particle size in the case of dispersion and by the use of surfactants. The prevention of the action of microorganisms can be brought about by various antibacterial and antifungal agents, for example, parabens, chlorobutanol, phenol, sorbic acid, thimerosal, and the like. In many cases, it will be preferable to include isotonic agents, for example, sugars or sodium chloride. Prolonged absorption of the injectable compositions can be brought about by the use in the compositions of agents delaying absorption, for example, aluminum monostearate and gelatin.

For administration of an injectable aqueous solution, for example, the solution may be suitably buffered, if necessary, and the liquid diluent first rendered isotonic with sufficient saline or glucose. These particular aqueous solutions are especially suitable for intravenous, intramuscular, subcutaneous and intraperitoneal administration. In this connection, a sterile aqueous medium that can be employed will be known to those of skill in the art. For example, one dosage may be dissolved in 1 mL of isotonic NaCl solution and either added to 1000 mL of hypodermoclysis fluid or injected at the proposed site of infusion, (see for example, "Remington's Pharmaceutical Sciences" 15th Edition, pages 1035-1038 and 1570-1580). Some variation in dosage will necessarily occur depending on the condition of the host. The person responsible for administration will, in any event, determine the appropriate dose for the individual host.

Sterile injectable solutions are prepared by incorporating the active rAAV in the required amount in the appropriate solvent with various of the other ingredients enumerated herein, as required, followed by filtered sterilization. Generally, dispersions are prepared by incorporating the various sterilized active ingredients into a sterile vehicle which contains the basic dispersion medium and the required other ingredients from those enumerated above. In the case of sterile powders for the preparation of sterile injectable solutions, the preferred methods of preparation are vacuum-drying and freeze-drying techniques which yield a powder of the active ingredient plus any additional desired ingredient from a previously sterile-filtered solution thereof.

The rAAV compositions disclosed herein may also be formulated in a neutral or salt form. Pharmaceutically-acceptable salts, include the acid addition salts (formed with the free amino groups of the protein) and which are formed with inorganic acids such as, for example, hydrochloric or phosphoric acids, or such organic acids as acetic, oxalic, tartaric, mandelic, and the like. Salts formed with the free carboxyl groups can also be derived from inorganic bases such as, for example, sodium, potassium, ammonium, calcium, or ferric hydroxides, and such organic bases as isopropylamine, trimethylamine, histidine, procaine and the like. Upon formulation, solutions will be administered in a manner compatible with the dosage formulation and in such amount as is therapeutically effective. The formulations are easily administered in a variety of dosage forms such as injectable solutions, drug-release capsules, and the like.

As used herein, "carrier" includes any and all solvents, dispersion media, vehicles, coatings, diluents, antibacterial and antifungal agents, isotonic and absorption delaying agents, buffers, carrier solutions, suspensions, colloids, and the like. The use of such media and agents for pharmaceutical active substances is well known in the art. Supplementary active ingredients can also be incorporated into the compositions. The phrase "pharmaceutically-acceptable" refers to molecular entities and compositions that do not produce an allergic or similar untoward reaction when administered to a host.

Delivery vehicles such as liposomes, nanocapsules, microparticles, microspheres, lipid particles, vesicles, and the like, may be used for the introduction of the compositions of the present disclosure into suitable host cells. In particular, the rAAV vector delivered transgenes may be formulated for delivery either encapsulated in a lipid particle, a liposome, a vesicle, a nanosphere, or a nanoparticle or the like.

Such formulations may be preferred for the introduction of pharmaceutically acceptable formulations of the nucleic acids or the rAAV constructs disclosed herein. The formation and use of liposomes is generally known to those of skill in the art. Recently, liposomes were developed with improved serum stability and circulation half-times (U.S. Pat. No. 5,741,516). Further, various methods of liposome and liposome like preparations as potential drug carriers have been described (U.S. Pat. Nos. 5,567,434; 5,552,157; 5,565,213; 5,738,868 and 5,795,587).

Liposomes have been used successfully with a number of cell types that are normally resistant to transfection by other procedures. In addition, liposomes are free of the DNA length constraints that are typical of viral-based delivery systems. Liposomes have been used effectively to introduce genes, drugs, radiotherapeutic agents, viruses, transcription factors and allosteric effectors into a variety of cultured cell lines and animals. In addition, several successful clinical trials examining the effectiveness of liposome-mediated drug delivery have been completed.

Liposomes are formed from phospholipids that are dispersed in an aqueous medium and spontaneously form multilamellar concentric bilayer vesicles (also termed multilamellar vesicles (MLVs). MLVs generally have diameters of from 25 nm to 4 μm. Sonication of MLVs results in the formation of small unilamellar vesicles (SUVs) with diameters in the range of 200 to 500 Å, containing an aqueous solution in the core.

Alternatively, nanocapsule formulations of the rAAV may be used. Nanocapsules can generally entrap substances in a stable and reproducible way. To avoid side effects due to intracellular polymeric overloading, such ultrafine particles (sized around 0.1 μm) should be designed using polymers able to be degraded in vivo. Biodegradable polyalkyl-cyanoacrylate nanoparticles that meet these requirements are contemplated for use.

In addition to the methods of delivery described above, the following techniques are also contemplated as alternative methods of delivering the rAAV compositions to a host. Sonophoresis (i.e., ultrasound) has been used and described in U.S. Pat. No. 5,656,016 as a device for enhancing the rate and efficacy of drug permeation into and through the circulatory system. Other drug delivery alternatives contemplated are intraosseous injection (U.S. Pat. No. 5,779,708), microchip devices (U.S. Pat. No. 5,797,898), ophthalmic formulations (Bourlais et al., 1998), transdermal matrices (U.S. Pat. Nos. 5,770,219 and 5,783,208) and feedback-controlled delivery (U.S. Pat. No. 5,697,899).

EXAMPLES

AAV vectors encoding both alpha and beta-subunits of hexosaminidase (HexA and HexB, respectively) have been developed (FIG. 1) using two design principles for bicistronic vectors. In AAV-BiP2i-HexAB (P2I), the transgene cassettes are positioned in opposite orientations with the promoters driving expression from the ends of the genome. The other vector, AAV-BiCBA-HexAB (Bic), uses a bidirectional promoter composed of a single CMV enhancer flanked by the minimal chicken β-actin (CBA) promoter to drive expression in opposite directions from the center of the genome.

Short-term studies using AAV-PHP.B vectors demonstrated efficacy. Although AAV9 is considerably less efficient than AAV-PHP.B for systemic CNS gene delivery in mice, it is also a capsid for which there is considerable clinical experience with an excellent safety track record. Moreover, systemic delivery of AAV9 has been observed to mediate transformative therapeutic results in spinal muscular atrophy (SMA) patients. For these reasons, it was included in therapeutic experiments for a total of four vectors being tested.

Four week-old Sandhoff mice ($Hex^{-/-}$) were treated systemically (tail vein injection) with $1\times10^{12}$ vg (n=8) or $4\times10^{12}$ vg (n=14) of AAV9 vectors (Bic or P2I) or $3\times10^{11}$ vg (n=8) or $1\times10^{12}$ vg (n=14) of AAV-PHP.B vectors (Bic or P2I) encoding mouse HexA and HexB proteins. Age matched PBS-injected SD (n=6) and wild-type (n=14) mice were used as controls. All cohorts were composed of equal numbers of males and females. A subset of mice (n=6) in the high dose cohorts and normal controls were sacrificed at 150 days of age, or humane endpoint to assess efficacy using biochemical (enzyme activity and GM2 ganglioside content) and histological outcome measures, while the remaining mice were used for survival analysis. PBS-treated SD mice were euthanized when they reached the humane endpoint (all before 150 days of age). Humane endpoint was determined by any of the following parameters: inability to right themselves for 30 seconds when placed in supine position, paralysis of one hindlimb, or more than 15% body weight loss from peak weight.

Figures 2A, 2B, 2C:
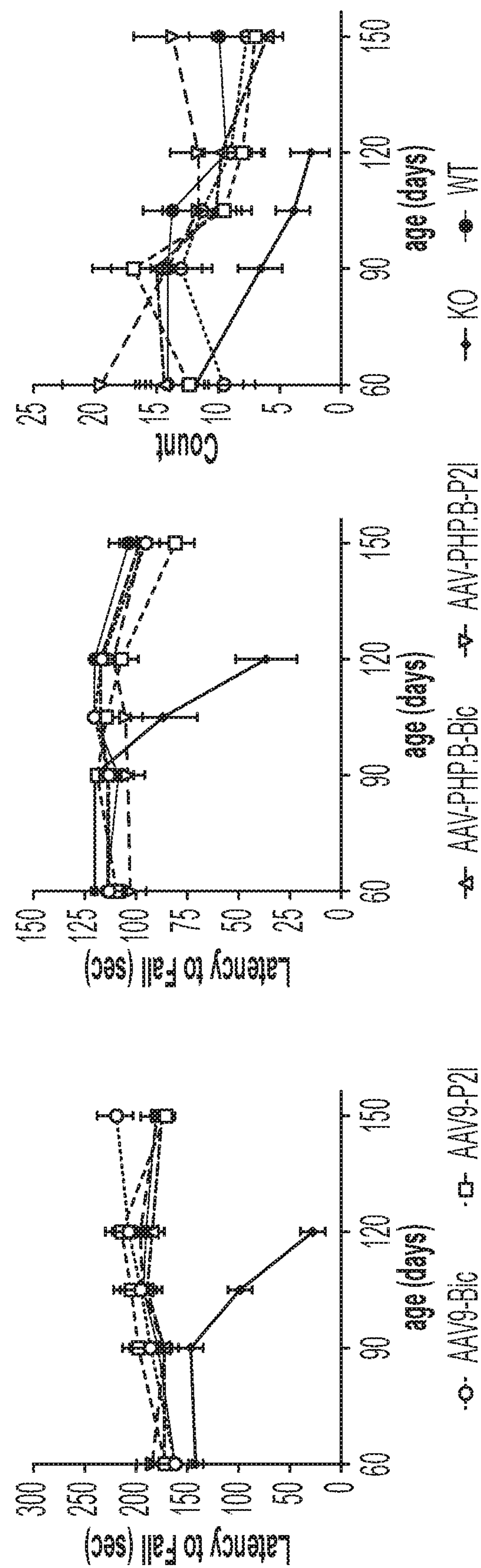
FIGS. 2A-2C show the behavioral performance of AAV-treated Sandhoff (SD) mice ($Hexb^{-/-}$) remained stable over time. Motor coordination and performance of AAV-treated SD mice and controls were assessed at 60, 90, 105, 120, and 149 days of age.

Example 1: Behavioral Performance of AAV-Treated SD Mice Remained Stable Over Time The behavioral performance of AAV-treated SD and control (KO) mice was assessed using the rotarod and inverted screen tests at 60, 90, 105, 120, and 149 days of age. The motor coordination and performance of AAV-treated SD mice remained comparable to normal controls in the accelerated rotarod (FIG. 2A) and inverted screen tests (FIGS. 2B-2C) tests up to the last time point at 149 days of age. The performance of untreated SD mice declined over time and no animals remained alive at the last time point.

Figure 3:
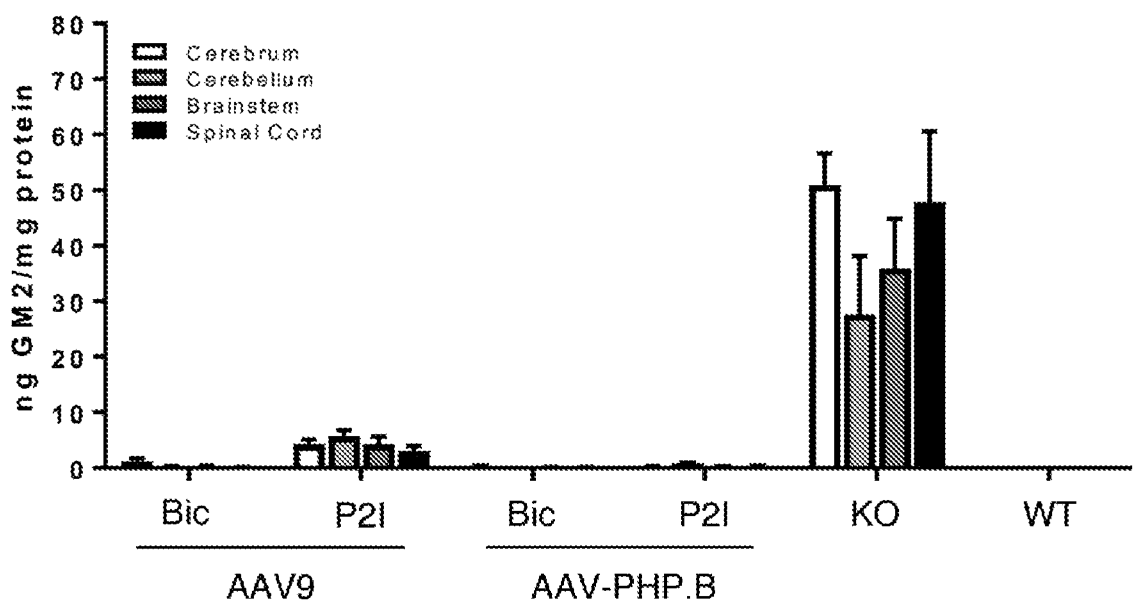
FIG. 3 shows that systemic AAV treatment reduces GM2 ganglioside content throughout the central nervous system (CNS) of SD mice. GM2 ganglioside content was measured at 150 days of age in AAV-treated SD mice ($4\times10^{12}$ vg AAV9 or $1\times10^{12}$ vg AAV-PHP.B) using a liquid chromatography tandem mass spectrometry (LC-MS/MS) method. GM2 ganglioside levels in the CNS of normal animals was below the detection limit of the method.

Example 2: Systemic AAV Treatment Reduces GM2 Ganglioside Content Throughout the Central Nervous System of SD Mice The GM2 ganglioside content in the brain, cerebellum, brainstem, and spinal cord of AAV-treated SD mice (high dose) at 150 days of age was significantly lower than in untreated SD mice at the humane endpoint, and the barely detectable in AAV9-Bic and both AAV-PHP.B treatment groups (FIG. 3). The GM2 levels remained above background in AAV9-P2I treated animals.

Figure 4A:
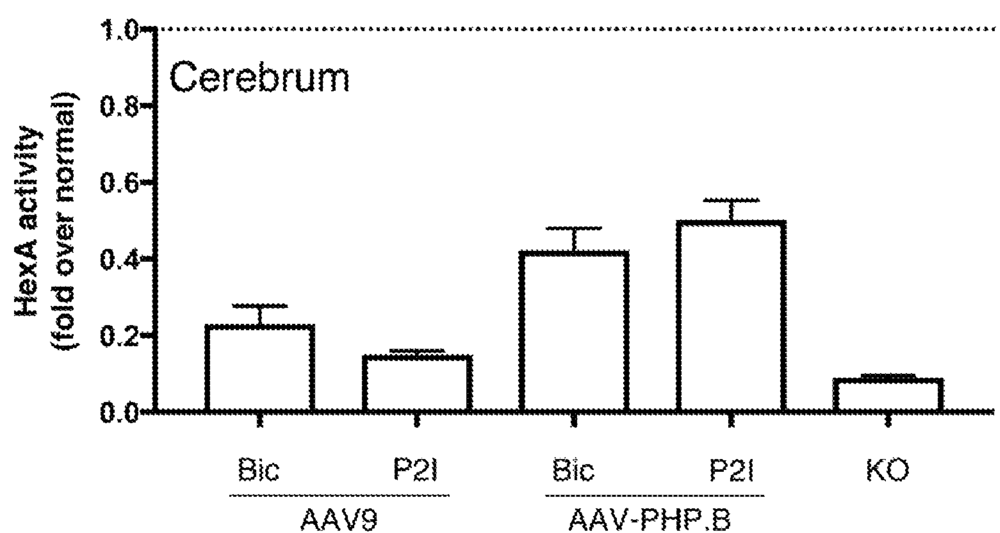
FIGS. 4A-4D show increased hexosaminidase activity in brain of 150 day old SD mice treated with $4\times10^{12}$ vg AAV9 or $1\times10^{12}$ vg AAV-PHP.B vectors.
Figure 4B:
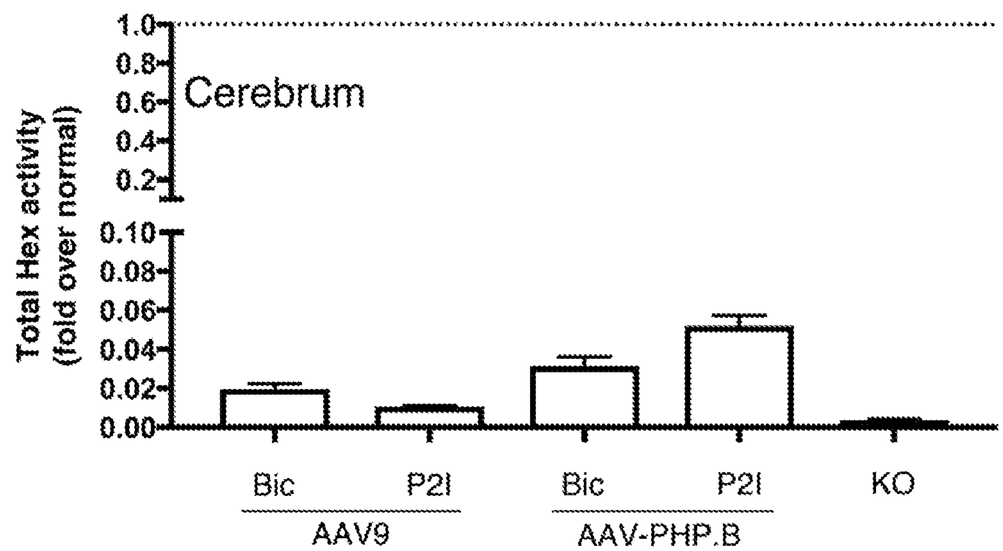
Figure 4C:
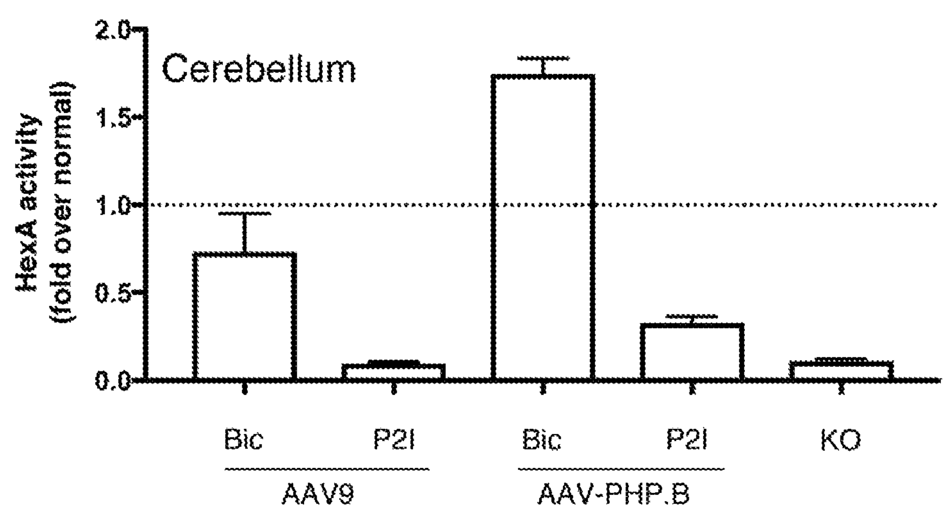
Figure 4D:
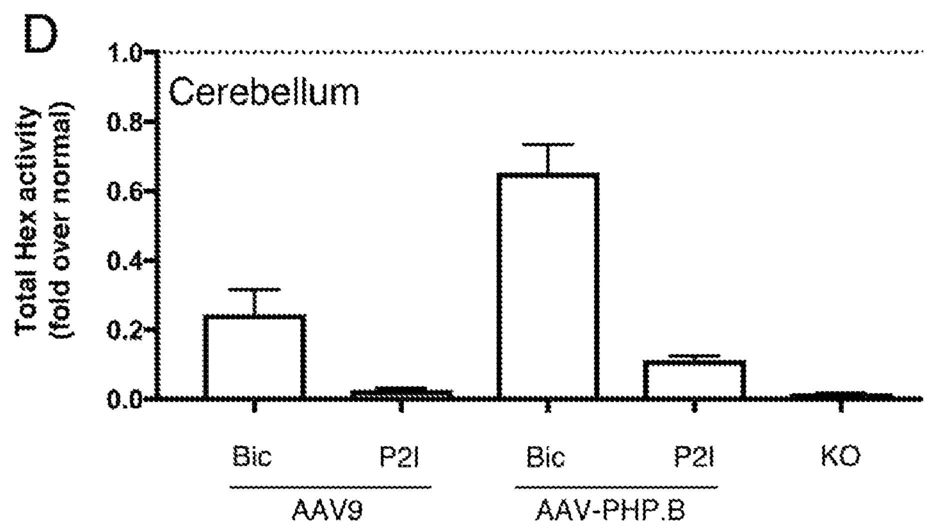
Figure 5:
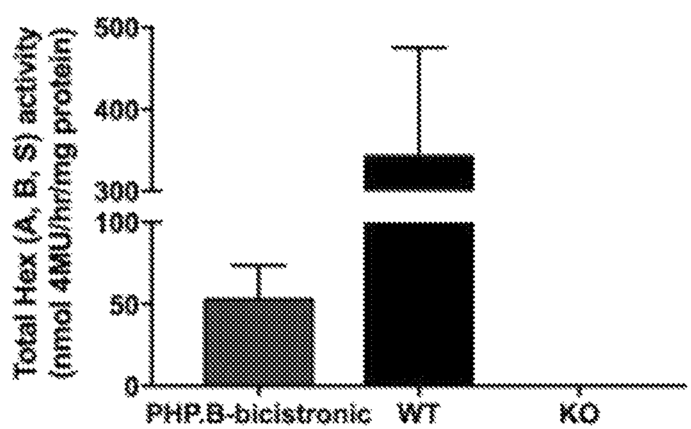
FIG. 5 shows increased total hexosaminidase activity in the liver using the artificial substrate MUG upon systemic delivery of AAV-PHP.B-BiCBA-HexAB in SD mice.

Example 3: Increased Hexosaminidase Activity in Brain and Liver of AAV-Treated SD Mice Hexosaminidase activity in the cerebrum and cerebellum (FIGS. 4A-4D) were consistent with the findings for GM2 ganglioside content. The enzyme activity in the brain of AAV9-P2I treated mice was consistently lower than in other groups, but nonetheless restoration of ~10% of normal HexA activity appears sufficient to significantly reduce GM2 ganglioside content in the cerebrum (FIG. 3). Restoring HexA activity in the cerebrum to ~20% as in AAV9-Bic treated animals (FIG. 4A) appears sufficient to largely eliminate GM2 ganglioside storage (FIG. 3). Total hexosaminidase (HexA, HexB, HexS) activity in the liver was also assessed following systemic administration of AAV-PHP.Bic using the artificial substrate MUG (FIG. 5). In the liver, the total hexosaminidase activity was restored to 15% of normal.

Example 4: Systemic AAV Treatment Extends Survival of SD Mice

Figure 6:
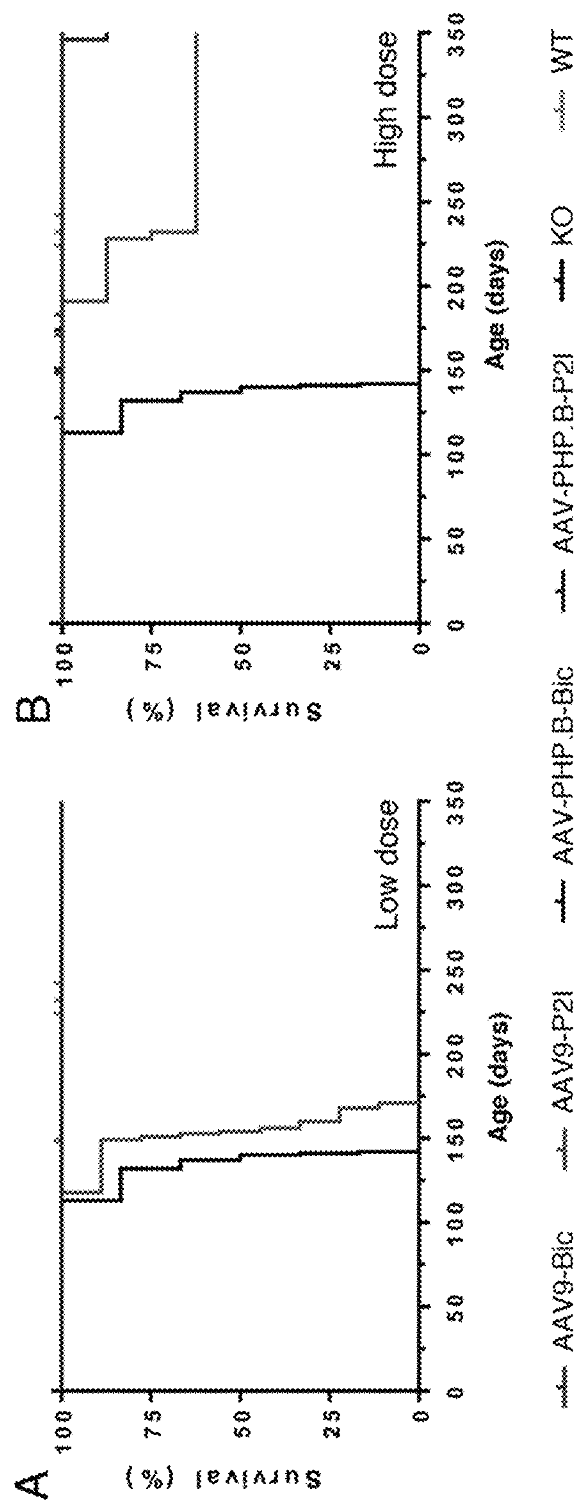
FIGS. 6A-6B show systemic AAV treatment extends survival of SD mice. Four week-old SD mice were treated with either low dose or high dose AAV therapies and survival was assessed.

All SD mice injected with AAV-Bic vectors remain alive past 350 days in the low ($3\times10^{11}$ vg) and high dose cohorts ($1\times10^{12}$ vg) (FIG. 6A-6B). Systemic AAV9-P2I treatment had a marginal impact of survival at the low dose ($1\times10^{12}$ vg), but it increased at the high dose ($4\times10^{12}$ vg) (FIG. 6A-6B). The impact of AAV9-P2I treatment on survival is consistent with the CNS biochemical findings where GM2 ganglioside levels were reduced in relation to untreated control SD mice (FIG. 3), but remained detectable, unlike in other AAV treatment groups or normal cohorts.

Figure 7:
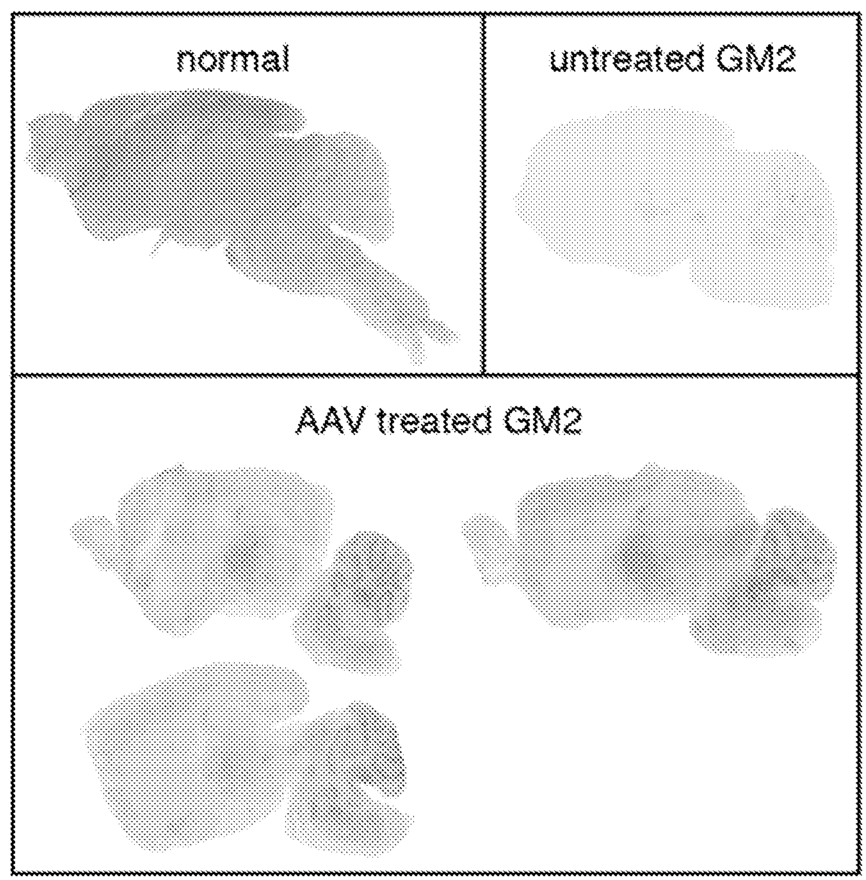
FIG. 7 shows systemic delivery of AAV-PHP.B-BiCBA-HexAB vector restores Hex activity throughout the brain of SD mice. Distribution of Hex enzyme activity was assessed at one month post-injection using an enzyme specific histochemical stain of sagittal brain sections. Sections of all three AAV-treated mice are shown.

Example 5: Systemic AAV Treatment Restores Hex Activity Throughout Brain of SD Mice Analysis of Hexosaminidase distribution in the brain following delivery of AAV-PHP.B-BiCBA-HexAB using a Hexosaminidase specific histochemical stain showed restoration of enzyme activity throughout the brain (FIG. 7) indicating that this approach, in some embodiments, mediates a therapeutic impact.

Figure 8A:
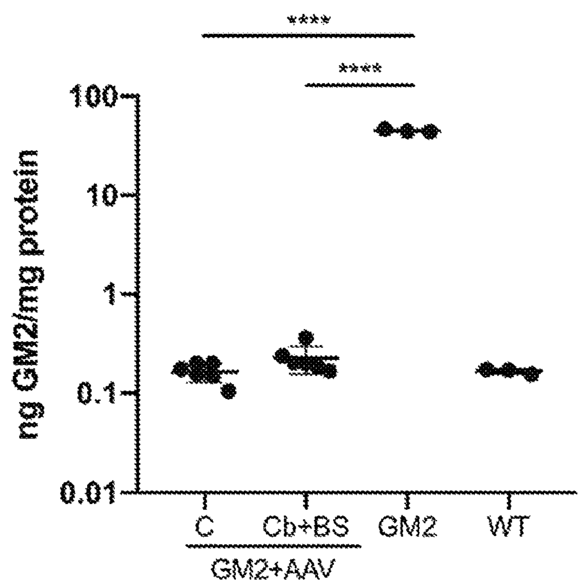
FIGS. 8A-8D show data indicating that neonatal ICV treatment of GM2 mice with bicistronic AAV9 improves neurochemistry, behavior and survival.
Figure 8B:
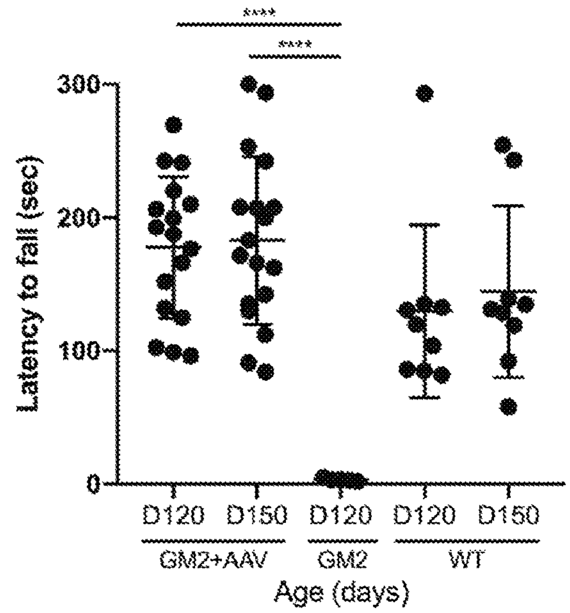
Figure 8C:
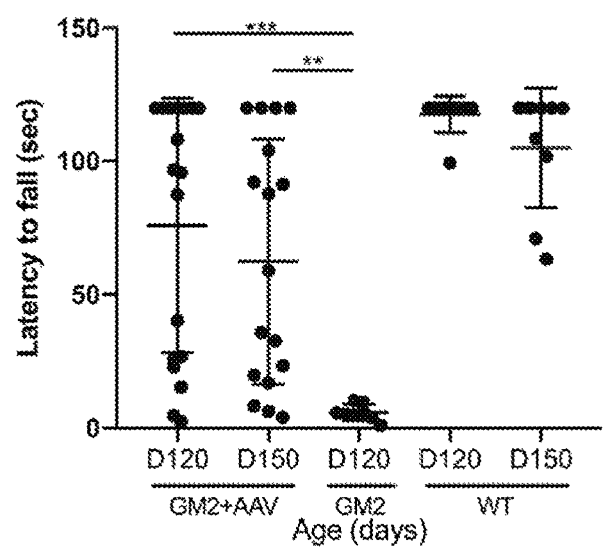
Figure 8D:
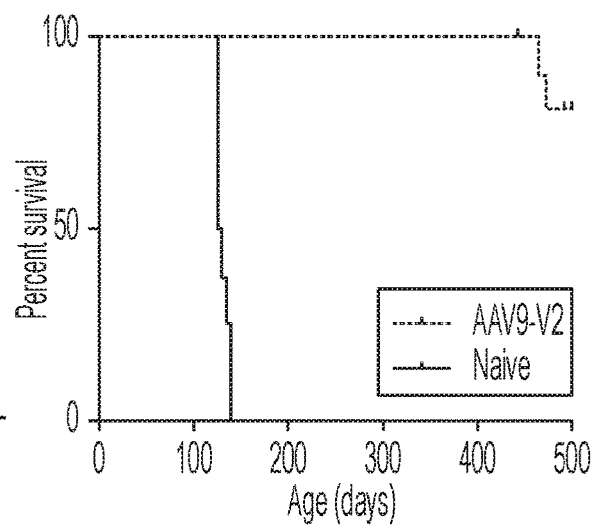

Example 6: CSF Delivery of AAV Gene Therapy for Tay-Sachs and Sandhoff Disease Neonatal GM2 mice (n=31 mice) received bilateral injections of AAV9-BiCB-HexAB ($7.25\times10^{10}$ vg) into the brain lateral ventricles (2 μl per side). Control GM2 mice (n=8) received bilateral injection of phosphate buffered saline. At one month of age the GM2 ganglioside content in the brain of AAV-treated GM2 mice (n=6) was identical to that in normal animals, which is less than 0.5% of the level found in age matched untreated GM2 mice (FIG. 8A). The motor performance of AAV treated GM2 mice in two tasks, rotarod (FIG. 8B) and inverted screen (FIG. 8C), was significantly improved compared to untreated GM2 mice at 120 days of age and remained stable to 150 days of age. Presently the majority of AAV treated GM2 mice remain alive past 400 days of age compared to a median survival of 129.5 days for untreated GM2 mice (FIG. 8D).

Example 7: AAV9-BiCB-HexAB Vector Injected into CSF Through Intrathecal Delivery in Young Adult GM2 Mice Lumbar intrathecal (LIT) injection of $1\times10^{12}$ vg AAV9-BiCB-HexAB vector in 42-45 day-old GM2 mice (n=20) led to improved performance in the rotarod (FIG. 9A) and inverted screen (FIG. 9B) tests. Median survival of AAV treated GM2 mice was observed to be at least 265 days (accounting only for mice that have lived longer than 250 days), compared to 129.5 days for untreated GM2 mice (FIG. 9C; P<0.0001). No naïve GM2 mice were alive at 246 (n=7) and 299 (n=2) days of age (FIG. 9C). Data indicates a therapeutic benefit of AAV9-BiCB-HexAB vector delivered LIT in young adult mice.

| SEQUENCES |
| --- |
| >SEQ ID NO: 1; HexA amino acid sequence<br>MTSSRLWFSLLLAAAFAGRATALWPWPQNFQTSDQRYVLYPNNFQFQYDVSSAAQPG<br>CSVLDEAFQRYRDLLFGSGSWPRPYLTGKRHTLEKNVLVVSVVTPGCNQLPTLESVEN<br>YTLTINDDQCLLLSETVWGALRGLETFSQLVWKSAEGTFFINKTEIEDFPRFPHRGLLLD<br>TSRHYLPLSSILDTLDVMAYNKLNVFHWHLVDDPSFPYESFTFPELMRKGSYNPVTHIY<br>TAQDVKEVIEYARLRGIRVLAEFDTPGHTLSWGPGIPGLLTPCYSGSEPSGTFGPVNPSL<br>NNTYEFMSTFFLEVSSVFPDFYLHLGGDEVDFTCWKSNPEIQDFMRKKGFGEDFKQLES<br>FYIQTLLDIVSSYGKGYVVWQEVFDNKVKIQPDTIIQVWREDIPVNYMKELELVTKAGF<br>RALLSAPWYLNRISYGPDWKDFYVVEPLAFEGTPEQKALVIGGEACMWGEYVDNTNL<br>VPRLWPRAGAVAERLWSNKLTSDLTFAYERLSHFRCELLRRGVQAQPLNVGFCEQEFE<br>QT |
| >SEQ ID NO: 2; HexB amino acid sequence<br>MELCGLGLPRPPMLLALLLATLLAAMLALLTQVALVVQVAEAARAPSVSAKPGPALW<br>PLPLSVKMTPNLLHLAPENFYISHSPNSTAGPSCTLLEEAFRRYHGYIFGFYKWHHEPAE<br>FQAKTQVQQLLVSITLQSECDAFPNISSDESYTLLVKEPVAVLKANRVWGALRGLETFS<br>QLVYQDSYGTFTINESTIIDSPRFSHRGILIDTSRHYLPVKIILKTLDAMAFNKFNVLHWHI<br>VDDQSFPYQSITFPELSNKGSYSLSHVYTPNDVRMVIEYARLRGIRVLPEFDTPGHTLSW<br>GKGQKDLLTPCYSRQNKLDSFGPINPTLNTTYSFLTTFFKEISEVFPDQFIHLGGDEVEFK<br>CWESNPKIQDFMRQKGFGTDFKKLESFYIQKVLDIIATINKGSIVWQEVFDDKAKLAPG<br>TIVEVWKDSAYPEELSRVTASGFPVILSAPWYLDLISYGQDWRKYYKVEPLDFGGTQK |

-continued

| SEQUENCES |
| --- |

QKQLFIGGEACLWGEYVDATNLTPRLWPRASAVGERLWSSKDVRDMDDAYDRLTRH
RCRMVERGIAAQPLYAGYCNHENM

>SEQ ID NO: 3; AAV-BiCBA-HexAB nucleic acid sequence
TTGGCCACTCCCTCTCTGCGCGCTCGCTCGCTCACTGAGGCCGGGCGACCAAAGGTC
GCCCGACGCCCGGGCTTTGCCCGGGCGGCCTCAGTGAGCGAGCGAGCGCGCAGAGA
GGGAGTGGCCAACTCCATCACTAGGGGTTCCTAGATCTGAATTCTACCACATTTGTA
GAGGTTTTACTTGCTTTAAAAAACCTCCCACATCTCCCCCTGAACCTGAAACATAAA
ATGAATGCAATTGTTGTTGTTAACTTGTTTATTGCAGCTTATAATGGTTACAAATAA
AGCAATAGCATCACAAATTTCACAAATAAAGCATTTTTTTCACTGCATTCTAGTTGT
GGTTTGTCCAAACTCATCAATGTATCTTATCATGTCTGTCGAGGCGGCCGCTCAGGT
CTGCTCAAATTCCTGCTCACAGAATCCGACATTCAGGGGCTGTGCCTGCACGCCTCT
CCTCAGCAGCTCGCACCTGAAGTGGCTCAGCCTTTCGTAAGCGAATGTCAGATCAG
AGGTCAGCTTGTTGGACCACAGTCTCTCGGCCACTGCTCCGGCCCTGGGCCACAGTC
GTGGGACCAGATTGGTGTTGTCCACATACTCGCCCCACATACATGCTTCGCCCCCGA
TGACCAGAGCTTTCTGCTCAGGAGTCCCTTCAAAGGCCAGGGGCTCCACAATGTAG
AAATCCTTCCAGTCTGGTCCATATGAGATCCTGTTCAGGTACCAAGGGGCACTCAGC
AGTGCTCGGAAGCCAGCTTTTGTCACCAGTTCCAGCTCCTTCATATAATTGACAGGA
ATATCCTCGCGCCACACTTGAATGATGGTATCGGGCTGGATTTTGACCTTGTTGTCA
AACACTTCCTGCCAGACCACATAGCCCTTTCCGTATGAACTCACAATGTCCAGCAGA
GTCTGGATGTAGAAACTCTCCAGCTGCTTGAAGTCTTCGCCGAACCCTTTCTTCCGC
ATAAAGTCCTGGATCTCTGGATTAGACTTCCAACATGTGAAATCCACTTCGTCTCCG
CCCAGGTGCAGATAAAAGTCAGGGAAGACAGAGGACACCTCCAGAAAGAATGTAG
ACATGAACTCGTAGGTATTGTTCAGGGATGGGTTCACAGGTCCGAAGGTGCCGCTT
GGCTCACTCCCAGAGTAGCAAGGAGTCAGCAGTCCGGGAATTCCTGGGCCCCAGCT
CAGAGTATGGCCAGGTGTATCGAATTCAGCCAGCACTCGAATCCCCCTCAGTCGGG
CATACTCGATGACTTCTTTCACGTCCTGGGCGGTATAGATGTGAGTCACGGGATTGT
AGCTGCCCTTGCGCATCAGCTCTGGAAATGTGAAGCTTTCGTAAGGAAATGAGGGA
TCGTCGACCAGATGCCAGTGGAACACGTTCAGCTTGTTATAAGCCATCACATCCAG
AGTGTCCAGAATGCTTGACAGGGGCAGGTAATGTCTAGATGTATCCAGCAGCAGCC
CCCGGTGTGGAAATCTAGGGAAGTCTTCGATCTCAGTTTTGTTGATAAAGAATGTTC
CCTCGGCTGACTTCCAGACCAGCTGACTGAAAGTCTCCAGGCCCCTCAGTGCCCCCC
ACACTGTTTCGGACAGCAGCAGACACTGATCGTCATTGATTGTCAGGGTATAGTTCT
CCACGGATTCCAGGGTGGGCAGCTGATTGCAGCCTGGAGTGACCACGCTGACCACC
AGCACGTTTTTCTCCAGGGTGTGGCGCTTCCCAGTCAGATAGGGCCGTGGCCAGGA
CCCGCTTCCAAACAGCAGATCGCGGTACCGCTGGAATGCCTCGTCCAGGACGCTGC
ATCCTGGCTGAGCGGCGCTGCTCACGTCGTACTGAAACTGGAAATTGTTTGGATACA
GCACGTACCTCTGGTCAGATGTCTGGAAGTTCTGAGGCCATGGCCACAGGGCGGTT
GCTCGTCCAGCAAATGCAGCGGCCAGCAGCAGGGAGAACCACAGTCTGGAGCTGGT
CATGGTGGCTTTATCGATACTAGCGCTAGAGCTTGCTCCCGCCCGCCGCGCGCTTCG
CTTTTTATAGGGCCGCCGCCGCCGCCGCCTCGCCATAAAAGGAAACTTTCGGAGCG
CGCCGCTCTGATTGGCTGCCGCCGCACCTCTCCGCCTCGCCCCGCCCCGCCCCTCGC
CCCCATCGCTGCACAAAATAATTAAAAAATAAATAAATACAAAATTGGGGGTGGGG
AGGGGGGGGAGATGGGGAGAGTGAAGCAGAACGTGGCCTCGGATCCCCCGGGCTG
CAGTATTAATAGTAATCAATTACGGGGTCATTAGTTCATAGCCCATATATGGAGTTC
CGCGTTACATAACTTACGGTAAATGGCCCGCCTGGCTGACCGCCCAACGACCCCCG
CCCATTGACGTCAATAATGACGTATGTTCCCATAGTAACGCCAATAGGGACTTTCCA
TTGACGTCAATGGGTGGAGTATTTACGGTAAACTGCCCACTTGGCAGTACATCAAGT
GTATCATATGCCAAGTACGCCCCCTATTGACGTCAATGACGGTAAATGGCCCGCCTG
GCATTATGCCCAGTACATGACCTTATGGGACTTTCCTACTTGGCAGTACATCTACGT
ATTAGTCATCGCTATTACCATGTCGAGGCCACGTTCTGCTTCACTCTCCCCATCTCCC
CCCCCTCCCCACCCCCAATTTTGTATTTATTTATTTTTTAATTATTTTGTGCAGCGAT
GGGGGCGAGGGGCGGGGCGGGGCGAGGCGGAGAGGTGCGGCGGCAGCCAATCAG
AGCGGCGCGCTCCGAAAGTTTCCTTTTATGGCGAGGCGGCGGCGGCGGCGGCCCTA
TAAAAAGCGAAGCGCGCGGCGGGCGGGAGCAAGCTCGCTAGCACTAGTGGAGCAC
CATGGAGCTGTGCGGGCTGGGGCTGCCCCGGCCGCCCATGCTGCTGGCGCTGCTGTT
GGCGACACTGCTGGCGGCGATGTTGGCGCTGCTGACTCAGGTGGCGCTGGTGGTGC
AGGTGGCGGAGGCGGCTCGGGCCCCGAGCGTCTCGGCCAAGCCGGGGCCGGCGCT
GTGGCCCCTGCCGCTCTCGGTGAAGATGACCCCGAACCTGCTGCATCTCGCCCCGGA
GAACTTCTACATCAGCCACAGCCCCAATTCCACGGCGGGCCCCTCCTGCACCCTGCT
GGAGGAAGCGTTTCGACGATATCATGGCTATATTTTTGGTTTCTACAAGTGGCATCA
TGAACCTGCTGAATTCCAGGCTAAAACCCAGGTTCAGCAACTTCTTGTCTCAATCAC
CCTTCAGTCAGAGTGTGATGCTTTCCCCAACATATCTTCAGATGAGTCTTATACTTTA
CTTGTGAAAGAACCAGTGGCTGTCCTTAAGGCCAACAGAGTTTGGGGAGCATTACG
AGGTTTAGAGACCTTTAGCCAGTTAGTTTATCAAGATTCTTATGGAACTTTCACCAT
CAATGAATCCACCATTATTGATTCTCCAAGGTTTTCTCACAGAGGAATTTTGATTGA
TACATCCAGACATTATCTGCCAGTTAAGATTATTCTTAAAACTCTGGATGCCATGGC
TTTTAATAAGTTTAATGTTCTTCACTGGCACATAGTTGATGACCAGTCTTTCCCATAT
CAGAGCATCACTTTTCCTGAGTTAAGCAATAAAGGAAGCTATTCTTTGTCTCATGTT
TATACACCAAATGATGTCCGTATGGTGATTGAATATGCCAGATTACGAGGAATTCG
AGTCCTGCCAGAATTTGATACCCCTGGGCATACACTATCTTGGGGAAAAGGTCAGA
AAGACCTCCTGACTCCATGTTACAGTAGACAAAACAAGTTGGACTCTTTTGGACCTA
TAAACCCTACTCTGAATACAACATACAGCTTCCTTACTACATTTTTCAAAGAAATTA
GTGAGGTGTTTCCAGATCAATTCATTCATTTGGGAGGAGATGAAGTGGAATTTAAAT
GTTGGGAATCAAATCCAAAAATTCAAGATTTCATGAGGCAAAAAGGCTTTGGCACA
GATTTTAAGAAACTAGAATCTTTCTACATTCAAAAGGTTTTGGATATTATTGCAACC
ATAAACAAGGGATCCATTGTCTGGCAGGAGGTTTTTGATGATAAAGCAAAGCTTGC -continued

| SEQUENCES |
| --- |

GCCGGGCACAATAGTTGAAGTATGGAAAGACAGCGCATATCCTGAGGAACTCAGTA
GAGTCACAGCATCTGGCTTCCCTGTAATCCTTTCTGCTCCTTGGTACTTAGATTTGAT
TAGCTATGGACAAGATTGGAGGAAATACTATAAAGTGGAACCTCTTGATTTTGGCG
GTACTCAGAAACAGAAACAACTTTTCATTGGTGGAGAAGCTTGTCTATGGGGAGAA
TATGTGGATGCAACTAACCTCACTCCAAGATTATGGCCTCGGGCAAGTGCTGTTGGT
GAGAGACTCTGGAGTTCCAAAGATGTCAGAGATATGGATGACGCCTATGACAGACT
GACAAGGCACCGCTGCAGGATGGTCGAACGTGGAATAGCTGCACAACCTCTTTATG
CTGGATATTGTAACCATGAGAACATGTAACTCGAGGCGGCCGCTCTAGAGATCTTTT
TCCCTCTGCCAAAAATTATGGGGACATCATGAAGCCCCTTGAGCATCTGACTTCTGG
CTAATAAAGGAAATTTATTTTCATTGCAATAGTGTGTTGGAATTTTTTGTGTCTCTCA
CTCGGCATGCTGGGGAGAGATCTAGGAACCCCTAGTGATGGAGTTGGCCACTCCCT
CTCTGCGCGCTCGCTCGCTCACTGAGGCCGCCCGGGCAAAGCCCGGGCGTCGGGCG
ACCTTTGGTCGCCCGGCCTCAGTGAGCGAGCGAGCGCGCAGAGAGGGAGTGGCCAT
GCAGCCAGCTGGCGTAATAGCGAAGAGGCCCGCACCGATCGCCCTTCCCAACAGTT
GCGTAGCCTGAATGGCGAATGGCGCGACGCGCCCTGTAGCGGCGCATTAAGCGCGG
CGGGTGTGGTGGTTACGCGCAGCGTGACCGCTACACTTGCCAGCGCCCTAGCGCCC
GCTCCTTTCGCTTTCTTCCCTTCCTTTCTCGCCACGTTCGCCGGCTTTCCCCGTCAAG
CTCTAAATCGGGGGCTCCCTTTAGGGTTCCGATTTAGTGCTTTACGGCACCTCGACC
CCAAAAAACTTGATTAGGGTGATGGTTCACGTAGTGGGCCATCGCCCTGATAGACG
GTTTTTCGCCCTTTGACGTTGGAGTCCACGTTCTTTAATAGTGGACTCTTGTTCCAAA
CTGGAACAACACTCAACCCTATCTCGGTCTATTCTTTTGATTTATAAGGGATTTTGCC
GATTTCGGCCTATTGGTTAAAAAATGAGCTGATTTAACAAAAATTTAACGCGAATTT
TAACAAAATATTAACGTTTACAATTTCCTGATGCGGTATTTTCTCCTTACGCATCTGT
GCGGTATTTCACACCGCATATGGTGCACTCTCAGTACAATCTGCTCTGATGCCGCAT
AGTTAAGCCAGCCCCGACACCCGCCAACACCCGCTGACGCGCCCTGACGGGCTTGT
CTGCTCCCGGCATCCGCTTACAGACAAGCTGTGACCGTCTCCGGGAGCTGCATGTGT
CAGAGGTTTTCACCGTCATCACCGAAACGCGCGAGACGAAAGGGCCTCGTGATACG
CCTATTTTTATAGGTTAATGTCATGATAATAATGGTTTCTTAGACGTCAGGTGGCAC
TTTTCGGGGAAATGTGCGCGGAACCCCTATTTGTTTATTTTTCTAAATACATTCAAAT
ATGTATCCGCTCATGAGACAATAACCCTGATAAATGCTTCAATAATATTGAAAAAG
GAAGAGTATGAGTATTCAACATTTCCGTGTCGCCCTTATTCCCTTTTTTGCGGCATTT
TGCCTTCCTGTTTTTGCTCACCCAGAAACGCTGGTGAAAGTAAAAGATGCTGAAGAT
CAGTTGGGTGCACGAGTGGGTTACATCGAACTGGATCTCAACAGCGGTAAGATCCT
TGAGAGTTTTCGCCCCGAAGAACGTTTTCCAATGATGAGCACTTTTAAAGTTCTGCT
CTATTCTCAGAATGACTTGGTTGAGTACTCACCAGTCACAGAAAAGCATCTTACGGA
TGGCATGACGTAAGAGAATTATGCAGTGCTGCCATAACCATGAGTGATAACACTGC
GGCCAACTTACTTCTGACAACGATCGGAGGACCGAAGGAGCTAACCGCTTTTTTGC
ACAACATGGGGGATCATGTAACTCGCCTTGATCGTTGGGAACCGGAGCTGAATGAA
GCCATACCAAACGACGAGCGTGACACCACGATGCCTGTAGCAATGGCAACAACGTT
GCGCAAACTATTAACTGGCGAACTACTTACTCTAGCTTCCCGGCAACAATTAATAGA
CTGGATGGAGGCGGATAAAGTTGCAGGACCACTTCTGCGCTCGGCCCTTCCGGCTG
GCTGGTTTATTGCTGATAAATCTGGAGCCGGTGAGCGTGGGTCTCGCGGTATCATTG
CAGCACTGGGGCCAGATGGTAAGCCCTCCCGTATCGTAGTTATCTACACGACGGGG
AGTCAGGCAACTATGGATGAACGAAATAGACAGATCGCTGAGATAGGTGCCTCACT
GATTAAGCATTGGTAACTGTCAGACCAAGTTTACTCATATATACTTTAGATTGATTT
AAAACTTCATTTTTAATTTAAAAGGATCTAGGTGAAGATCCTTTTTGATAATCTCAT
GACCAAAATCCCTTAACGTGAGTTTTCGTTCCACTGAGCGTCAGACCCCGTAGAAA
AGATCAAAGGATCTTCTTGAGATCCTTTTTTTCTGCGCGTAATCTGCTGCTTGCAAA
CAAAAAAACCACCGCTACCAGCGGTGGTTTGTTTGCCGGATCAAGAGCTACCAACT
CTTTTTCCGAAGGTAACTGGCTTCAGCAGAGCGCAGATACCAAATACTGTCCTTCTA
GTGTAGCCGTAGTTAGGCCACCACTTCAAGAACTCTGTAGCACCGCCTACATACCTC
GCTCTGCTAATCCTGTTACCAGTGGCTGCTGCCAGTGGCGATAAGTCGTGTCTTACC
GGGTTGGACTCAAGACGATAGTTACCGGATAAGGCGCAGCGGTCGGGCTGAACGG
GGGGTTCGTGCACACAGCCCAGCTTGGAGCGAACGACCTACACCGAACTGAGATAC
CTACAGCGTGAGCATTGAGAAAGCGCCACGCTTCCCGAAGGGAGAAAGGCGGACA
GGTATCCGGTAAGCGGCAGGGTCGGAACAGGAGAGCGCACGAGGGAGCTTCCAGG
GGGAAACGCCTGGTATCTTTATAGTCCTGTCGGGTTTCGCCACCTCTGACTTGAGCG
TCGATTTTTGTGATGCTCGTCAGGGGGGCGGAGCCTATGGAAAAACGCCAGCAACG
CGGCCTTTTTACGGTTCCTGGCCTTTTGCTGGCCTTTTGCTCACATGTTCTTTCCTGC
GTTATCCCCTGATTCTGTGGATAACCGTATTACCGCCTTTGAGTGAGCTGATACCGC
TCGCCGCAGCCGAACGACCGAGCGCAGCGAGTCAGTGAGCGAGGAAGCGGAAGAG
CGCCCAATACGCAAACCGCCTCTCCCCGCGCGTTGGCCGATTCATTAATGCAGCTGG
GCTGCAGGGGGGGGGGGGGGGGGGTGGGGGGGGGGGGGGGGG

>SEQ ID NO: 4; AAV-BiCBA-HexA:codon optimized-HexB nucleic acid sequence
TTGGCCACTCCCTCTCTGCGCGCTCGCTCGCTCACTGAGGCCGGGCGACCAAAGGTC
GCCCGACGCCCGGGCTTTGCCCGGGCGGCCTCAGTGAGCGAGCGAGCGCGCAGAGA
GGGAGTGGCCAACTCCATCACTAGGGGTTCCTAGATCTGAATTCTACCACATTTGTA
GAGGTTTTACTTGCTTTAAAAAACCTCCCACATCTCCCCCTGAACCTGAAACATAAA
ATGAATGCAATTGTTGTTGTTAACTTGTTTATTGCAGCTTATAATGGTTACAAATAA
AGCAATAGCATCACAAATTTCACAAATAAAGCATTTTTTTCACTGCATTCTAGTTGT
GGTTTGTCCAAACTCATCAATGTATCTTATCATGTCTGTCGAGGCGGCCGCTCAGGT
CTGCTCAAATTCCTGCTCACAGAATCCGACATTCAGGGGCTGTGCCTGCACGCCTCT
CCTCAGCAGCTCGCACCTGAAGTGGCTCAGCCTTTCGTAAGCGAATGTCAGATCAG
AGGTCAGCTTGTTGGACCACAGTCTCTCGGCCACTGCTCCGGCCCTGGGCCACAGTC
GTGGGACCAGATTGGTGTTGTCCACATACTCGCCCCACATACATGCTTCGCCCCCGA -continued

| SEQUENCES |
| --- |
| TGACCAGAGCTTTCTGCTCAGGAGTCCCTTCAAAGGCCAGGGGCTCCACAATGTAG<br>AAATCCTTCCAGTCTGGTCCATATGAGATCCTGTTCAGGTACCAAGGGGCACTCAGC<br>AGTGCTCGGAAGCCAGCTTTTGTCACCAGTTCCAGCTCCTTCATATAATTGACAGGA<br>ATATCCTCGCGCCACACTTGAATGATGGTATCGGGCTGGATTTTGACCTTGTTGTCA<br>AACACTTCCTGCCAGACCACATAGCCCTTTCCGTATGAACTCACAATGTCCAGCAGA<br>GTCTGGATGTAGAAACTCTCCAGCTGCTTGAAGTCTTCGCCGAACCCTTTCTTCCGC<br>ATAAAGTCCTGGATCTCTGGATTAGACTTCCAACATGTGAAATCCACTTCGTCTCCG<br>CCCAGGTGCAGATAAAAGTCAGGGAAGACAGAGGACACCTCCAGAAAGAATGTAG<br>ACATGAACTCGTAGGTATTGTTCAGGGATGGGTTCACAGGTCCGAAGGTGCCGCTT<br>GGCTCACTCCCAGAGTAGCAAGGAGTCAGCAGTCCGGGAATTCCTGGGCCCCAGCT<br>CAGAGTATGGCCAGGTGTATCGAATTCAGCCAGCACTCGAATCCCCCTCAGTCGGG<br>CATACTCGATGACTTCTTTCACGTCCTGGGCGGTATAGATGTGAGTCACGGGATTGT<br>AGCTGCCCTTGCGCATCAGCTCTGGAAATGTGAAGCTTTCGTAAGGAAATGAGGGA<br>TCGTCGACCAGATGCCAGTGGAACACGTTCAGCTTGTTATAAGCCATCACATCCAG<br>AGTGTCCAGAATGCTTGACAGGGGCAGGTAATGTCTAGATGTATCCAGCAGCAGCC<br>CCCGGTGTGGAAATCTAGGGAAGTCTTCGATCTCAGTTTTGTTGATAAAGAATGTTC<br>CCTCGGCTGACTTCCAGACCAGCTGACTGAAAGTCTCCAGGCCCCTCAGTGCCCCCC<br>ACACTGTTTCGGACAGCAGCAGACACTGATCGTCATTGATTGTCAGGGTATAGTTCT<br>CCACGGATTCCAGGGTGGGCAGCTGATTGCAGCCTGGAGTGACCACGCTGACCACC<br>AGCACGTTTTTCTCCAGGGTGTGGCGCTTCCCAGTCAGATAGGGCCGTGGCCAGGA<br>CCCGCTTCCAAACAGCAGATCGCGGTACCGCTGGAATGCCTCGTCCAGGACGCTGC<br>ATCCTGGCTGAGCGGCGCTGCTCACGTCGTACTGAAACTGGAAATTGTTTGGATACA<br>GCACGTACCTCTGGTCAGATGTCTGGAAGTTCTGAGGCCATGGCCACAGGGCGGTT<br>GCTCGTCCAGCAAATGCAGCGGCCAGCAGCAGGGAGAACCACAGTCTGGAGCTGGT<br>CATGGTGGCTTTATCGATACTAGCGCTAGAGCTTGCTCCCGCCCCGCCGCGCGCTTCG<br>CTTTTTATAGGGCCGCCGCCGCCGCCGCCTCGCCATAAAAGGAAACTTTCGGAGCG<br>CGCCGCTCTGATTGGCTGCCGCCGCACCTCTCCGCCTCGCCCCGCCCCGCCCCTCGC<br>CCCCATCGCTGCACAAAATAATTAAAAAATAAATAAATACAAAATTGGGGGTGGGG<br>AGGGGGGGGAGATGGGGAGAGTGAAGCAGAACGTGGCCTCGGATCCCCCGGGCTG<br>CAGTATTAATAGTAATCAATTACGGGGTCATTAGTTCATAGCCCATATATGGAGTTC<br>CGCGTTACATAACTTACGGTAAATGGCCCGCCTGGCTGACCGCCCAACGACCCCCG<br>CCCATTGACGTCAATAATGACGTATGTTCCCATAGTAACGCCAATAGGGACTTTCCA<br>TTGACGTCAATGGGTGGAGTATTTACGGTAAACTGCCCACTTGGCAGTACATCAAGT<br>GTATCATATGCCAAGTACGCCCCCTATTGACGTCAATGACGGTAAATGGCCCGCCTG<br>GCATTATGCCCAGTACATGACCTTATGGGACTTTCCTACTTGGCAGTACATCTACGT<br>ATTAGTCATCGCTATTACCATGTCGAGGCCACGTTCTGCTTCACTCTCCCCATCTCCC<br>CCCCCTCCCCACCCCCAATTTTGTATTTATTTATTTTTTAATTATTTTGTGCAGCGAT<br>GGGGGCGAGGGGCGGGGCGGGGCGAGGCGGAGAGGTGCGGCGGCAGCCAATCAG<br>AGCGGCGCGCTCCGAAAGTTTCCTTTTATGGCGAGGCGGCGGCGGCGGCGGCCCTA<br>TAAAAAGCGAAGCGCGCGGCGGGCGGGAGCAAGCTCGCTAGCACTAGTGGAGCAC<br>CATGGAGCTGTGCGGGCTGGGGCTGCCCCGGCCGCCCATGCTGCTGGCGCTGCTGTT<br>GGCGACACTGCTGGCGGCGATGTTGGCGCTGCTGACTCAGGTGGCGCTGGTGGTGC<br>AGGTGGCGGAGGCGGCTCGGGCCCCGAGCGTCTCGGCCAAGCCGGGGCCGGCGCT<br>GTGGCCCCTGCCGCTCTCGGTGAAGATGACCCCGAACCTGCTGCATCTCGCCCCGGA<br>GAACTTCTACATCAGCCACAGCCCCAATTCCACGGCGGGCCCCTCCTGCACCCTGCT<br>GGAGGAAGCGTTTCGACGATATCATGGCTATATTTTTGGTTTCTACAAGTGGCATCA<br>TGAACCTGCTGAATTCCAGGCTAAAACCCAGGTTCAGCAACTTCTTGTCTCAATCAC<br>CCTTCAGTCAGAGTGTGATGCTTTCCCCAACATATCTTCAGATGAGTCTTATACTTTA<br>CTTGTGAAAGAACCAGTGGCTGTCCTTAAGGCCAACAGAGTTTGGGGAGCATTACG<br>AGGTTTAGAGACCTTTAGCCAGTTAGTTTATCAAGATTCTTATGGAACTTTCACCAT<br>CAATGAATCCACCATTATTGATTCTCCAAGGTTTTCTCACAGAGGAATTTTGATTGA<br>TACATCCAGACATTATCTGCCAGTTAAGATTATTCTTAAAACTCTGGATGCCATGGC<br>TTTTAATAAGTTTAATGTTCTTCACTGGCACATAGTTGATGACCAGTCTTTCCCATAT<br>CAGAGCATCACTTTTCCTGAGTTAAGCAATAAAGGAAGCTATTCTTTGTCTCATGTT<br>TATACACCAAATGATGTCCGTATGGTGATTGAATATGCCAGATTACGAGGAATTCG<br>AGTCCTGCCAGAATTTGATACCCCTGGGCATACACTATCTTGGGGAAAAGGTCAGA<br>AAGACCTCCTGACTCCATGTTACAGTAGACAAAACAAGTTGGACTCTTTTGGACCTA<br>TAAACCCTACTCTGAATACAACATACAGCTTCCTTACTACATTTTTCAAAGAAATTA<br>GTGAGGTGTTTCCAGATCAATTCATTCATTTGGGAGGAGATGAAGTGGAATTTAAAT<br>GTTGGGAATCAAATCCAAAAATTCAAGATTTCATGAGGCAAAAAGGCTTTGGCACA<br>GATTTTAAGAAACTAGAATCTTTCTACATTCAAAAGGTTTTGGATATTATTGCAACC<br>ATAAACAAGGGATCCATTGTCTGGCAGGAGGTTTTTGATGATAAAGCAAAGCTTGC<br>GCCGGGCACAATAGTTGAAGTATGGAAAGACAGCGCATATCCTGAGGAACTCAGTA<br>GAGTCACAGCATCTGGCTTCCCTGTAATCCTTTCTGCTCCTTGGTACTTAGATTTGAT<br>TAGCTATGGACAAGATTGGAGGAAATACTATAAAGTGGAACCTCTTGATTTTGGCG<br>GTACTCAGAAACAGAAACAACTTTTCATTGGTGGAGAAGCTTGTCTATGGGGAGAA<br>TATGTGGATGCAACTAACCTCACTCCAAGATTATGGCCTCGGGCAAGTGCTGTTGGT<br>GAGAGACTCTGGAGTTCCAAAGATGTCAGAGATATGGATGACGCCTATGACAGACT<br>GACAAGGCACCGCTGCAGGATGGTCGAACGTGGAATAGCTGCACAACCTCTTTATG<br>CTGGATATTGTAACCATGAGAACATGTAACTCGAGGCGGCCGCTCTAGAGATCTTTT<br>TCCCTCTGCCAAAAATTATGGGGACATCATGAAGCCCCTTGAGCATCTGACTTCTGG<br>CTAATAAAGGAAATTTATTTTCATTGCAATAGTGTGTTGGAATTTTTTGTGTCTCTCA<br>CTCGGCATGCTGGGGAGAGATCTAGGAACCCCTAGTGATGGAGTTGGCCACTCCCT<br>CTCTGCGCGCTCGCTCGCTCACTGAGGCCGCCCGGGCAAAGCCCGGGCGTCGGGCG<br>ACCTTTGGTCGCCCGGCCTCAGTGAGCGAGCGAGCGCGCAGAGAGGGAGTGGCCAT<br>GCAGCCAGCTGGCGTAATAGCGAAGAGGCCCGCACCGATCGCCCTTCCCAACAGTT<br>GCGTAGCCTGAATGGCGAATGGCGCGACGCGCCCTGTAGCGGCGCATTAAGCGCGG |

-continued

| SEQUENCES |
|---|
| CGGGTGTGGTGGTTACGCGCAGCGTGACCGCTACACTTGCCAGCGCCCTAGCGCCC<br>GCTCCTTTCGCTTTCTTCCCTTCCTTTCTCGCCACGTTCGCCGGCTTTCCCCGTCAAG<br>CTCTAAATCGGGGGCTCCCTTTAGGGTTCCGATTTAGTGCTTTACGGCACCTCGACC<br>CCAAAAAACTTGATTAGGGTGATGGTTCACGTAGTGGGCCATCGCCCTGATAGACG<br>GTTTTTCGCCCTTTGACGTTGGAGTCCACGTTCTTTAATAGTGGACTCTTGTTCCAAA<br>CTGGAACAACACTCAACCCTATCTCGGTCTATTCTTTTGATTTATAAGGGATTTTGCC<br>GATTTCGGCCTATTGGTTAAAAAATGAGCTGATTTAACAAAAATTTAACGCGAATTT<br>TAACAAAATATTAACGTTTACAATTTCCTGATGCGGTATTTTCTCCTTACGCATCTGT<br>GCGGTATTTCACACCGCATATGGTGCACTCTCAGTACAATCTGCTCTGATGCCGCAT<br>AGTTAAGCCAGCCCCGACACCCGCCAACACCCGCTGACGCGCCCTGACGGGCTTGT<br>CTGCTCCCGGCATCCGCTTACAGACAAGCTGTGACCGTCTCCGGGAGCTGCATGTGT<br>CAGAGGTTTTCACCGTCATCACCGAAACGCGCGAGACGAAAGGGCCTCGTGATACG<br>CCTATTTTTATAGGTTAATGTCATGATAATAATGGTTTCTTAGACGTCAGGTGGCAC<br>TTTTCGGGGAAATGTGCGCGGAACCCCTATTTGTTTATTTTTCTAAATACATTCAAAT<br>ATGTATCCGCTCATGAGACAATAACCCTGATAAATGCTTCAATAATATTGAAAAAG<br>GAAGAGTATGAGTATTCAACATTTCCGTGTCGCCCTTATTCCCTTTTTTGCGGCATTT<br>TGCCTTCCTGTTTTTGCTCACCCAGAAACGCTGGTGAAAGTAAAAGATGCTGAAGAT<br>CAGTTGGGTGCACGAGTGGGTTACATCGAACTGGATCTCAACAGCGGTAAGATCCT<br>TGAGAGTTTTCGCCCCGAAGAACGTTTTCCAATGATGAGCACTTTTAAAGTTCTGCT<br>ATGTGGCGCGGTATTATCCCGTATTGACGCCGGGCAAGAGCAACTCGGTCGCCGCA<br>TACACTATTCAGAATGACTTGGTGAGTACTCACCAGTCACAGAAAAGCATCTTACG<br>GATGGCATGACAGTAAGAGAATTATGCAGTGCTGCCATAACCATGAGTGATAACAC<br>TGCGGCCAACTTACTTCTGACAACGATCGGAGGACCGAAGGAGCTAACCGCTTTTTT<br>GCACAACATGGGGGATCATGTAACTCGCCTTGATCGTTGGGAACCGGAGCTGAATG<br>AAGCCATACCAAACGACGAGCGTGACACCACGATGCCTGTAGCAATGGCAACAAC<br>GTTGCGCAAACTATTAACTGGCGAACTACTTACTCTAGCTTCCCGGCAACAATTAAT<br>AGACTGGATGGAGGCGGATAAAGTTGCAGGACCACTTCTGCGCTCGGCCCTTCCGG<br>CTGGCTGGTTTATTGCTGATAAATCTGGAGCCGGTGAGCGTGGGTCTCGCGGTATCA<br>TTGCAGCACTGGGGCCAGATGGTAAGCCCTCCCGTATCGTAGTTATCTACACGACG<br>GGGAGTCAGGCAACTATGGATGAACGAAATAGACAGATCGCTGAGATAGGTGCCTC<br>ACTGATTAAGCATTGGTAACTGTCAGACCAAGTTTACTCATATATACTTTAGATTGA<br>TTTAAAACTTCATTTTTAATTTAAAAGGATCTAGGTGAGATCCTTTTTGATAATCTCA<br>TGACCAAAATCCCTTAACGTGAGTTTTCGTTCCACTGAGCGTCAGACCCCGTAGAAA<br>AGATCAAAGGATCTTCTTGAGATCCTTTTTTTCTGCGCGTAATCTGCTGCTTGCAAA<br>CAAAAAAACCACCGCTACCAGCGGTGGTTTGTTTGCCGGATCAAGAGCTACCAACT<br>CTTTTTCCGAAGGTAACTGGCTTCAGCAGAGCGCAGATACCAAATACTGTCCTTCTA<br>GTGTAGCCGTAGTTAGGCCACCACTTCAAGAACTCTGTAGCACCGCCTACATACCTC<br>GCTCTGCTAATCCTGTTACCAGTGGCTGCTGCCAGTGGCGATAAGTCGTGTCTTACC<br>GGGTTGGACTCAAGACGATAGTTACCGGATAAGGCGCAGCGGTCGGGCTGAACGG<br>GGGGTTCGCATTGAGAAAGCGCCACGCTTCCCGAAGGGAGAAAGGCGGACAGGTA<br>TCCGGTAAGCGGCAGGGTCGGAACAGGAGAGCGCACGAGGGAGCTTCCAGGGGGA<br>AACGCCTGGTATCTTTATAGTCCTGTCGGGTTTCGCCACCTCTGACTTGAGCGTCGA<br>TTTTTGTGATGCTCGTCAGGGGGGCGGAGCCTATGGAAAAACGCCAGCAACGCGGC<br>CTTTTTACGGTTCCTGGCCTTTTGCTGGCCTTTTGCTCACATGTTCTTTCCTGCGTTATC<br>CCCTGATTCTGTGGATAACCGTATTACCGCCTTTGAGTGAGCTGATACCGCTCGCCG<br>CAGCCGAACGACCGAGCGCAGCGAGTCAGTGAGCGAGGAAGCGGAAGAGCGCCCA<br>ATACGCAAACCGCCTCTCCCCGCGCGTTGGCCGATTCATTATGCAGCTGGGCTGCAG<br>GGGGGGGGGGGGGGGGGTGGGGGGGGGGGGGGG<br>GG<br><br>>SEQ ID NO: 5; AAV-BiCBA-HexA:codon optimized-HexB:codon optimized nucleic acid sequence<br>TTGGCCACTCCCTCTCTGCGCGCTCGCTCGCTCACTGAGGCCGGGCGACCAAAGGTC<br>GCCCGACGCCCGGGCTTTGCCCGGGCGGCCTCAGTGAGCGAGCGAGCGCGCAGAGA<br>GGGAGTGGCCAACTCCATCACTAGGGGTTCCTAGATCTGAATTCTACCACATTTGTA<br>GAGGTTTTACTTGCTTTAAAAAACCTCCCACATCTCCCCCTGAACCTGAAACATAAA<br>ATGAATGCAATTGTTGTTGTTAACTTGTTTATTGCAGCTTATAATGGTTACAAATAA<br>AGCAATAGCATCACAAATTTCACAAATAAAGCATTTTTTTCACTGCATTCTAGTTGT<br>GGTTTGTCCAAACTCATCAATGTATCTTATCATGTCTGTCGAGGCGGCCGCTCAGGT<br>CTGCTCAAATTCCTGCTCACAGAATCCGACATTCAGGGGCTGTGCCTGCACGCCTCT<br>CCTCAGCAGCTCGCACCTGAAGTGGCTCAGCCTTTCGTAAGCGAATGTCAGATCAG<br>AGGTCAGCTTGTTGGACCACAGTCTCTCGGCCACTGCTCCGGCCCTGGGCCACAGTC<br>GTGGGACCAGATTGGTGTTGTCCACATACTCGCCCCACATACATGCTTCGCCCCCGA<br>TGACCAGAGCTTTCTGCTCAGGAGTCCCTTCAAAGGCCAGGGGCTCCACAATGTAG<br>AAATCCTTCCAGTCTGGTCCATATGAGATCCTGTTCAGGTACCAAGGGGCACTCAGC<br>AGTGCTCGGAAGCCAGCTTTTGTCACCAGTTCCAGCTCCTTCATATAATTGACAGGA<br>ATATCCTCGCGCCACACTTGAATGATGGTATCGGGCTGGATTTTGACCTTGTTGTCA<br>AACACTTCCTGCCAGACCACATAGCCCTTTCCGTATGAACTCACAATGTCCAGCAGA<br>GTCTGGATGTAGAAACTCTCCAGCTGCTTGAAGTCTTCGCCGAACCCTTTCTTCCGC<br>ATAAAGTCCTGGATCTCTGGATTAGACTTCCAACATGTGAAATCCACTTCGTCTCCG<br>CCCAGGTGCAGATAAAAGTCAGGGAAGACAGAGGACACCTCCAGAAAGAATGTAG<br>ACATGAACTCGTAGGTATTGTTCAGGGATGGGTTCACAGGTCCGAAGGTGCCGCTT<br>GGCTCACTCCCAGAGTAGCAAGGAGTCAGCAGTCCGGGAATTCCTGGGCCCCAGCT<br>CAGAGTATGGCCAGGTGTATCGAATTCAGCCAGCACTCGAATCCCCCTCAGTCGGG<br>CATACTCGATGACTTCTTTCACGTCCTGGGCGGTATAGATGTGAGTCACGGGATTGT<br>AGCTGCCCTTGCGCATCAGCTCTGGAAATGTGAAGCTTTCGTAAGGAAATGAGGGA<br>TCGTCGACCAGATGCCAGTGGAACACGTTCAGCTTGTTATAAGCCATCACATCCAG |

-continued

| SEQUENCES |
| --- |
| AGTGTCCAGAATGCTTGACAGGGGCAGGTAATGTCTAGATGTATCCAGCAGCAGCC<br>CCCGGTGTGGAAATCTAGGGAAGTCTTCGATCTCAGTTTTGTTGATAAAGAATGTTC<br>CCTCGGCTGACTTCCAGACCAGCTGACTGAAAGTCTCCAGGCCCCTCAGTGCCCCCC<br>ACACTGTTTCGGACAGCAGCAGACACTGATCGTCATTGATTGTCAGGGTATAGTTCT<br>CCACGGATTCCAGGGTGGGCAGCTGATTGCAGCCTGGAGTGACCACGCTGACCACC<br>AGCACGTTTTTCTCCAGGGTGTGGCGCTTCCCAGTCAGATAGGGCCGTGGCCAGGA<br>CCCGCTTCCAAACAGCAGATCGCGGTACCGCTGGAATGCCTCGTCCAGGACGCTGC<br>ATCCTGGCTGAGCGGCGCTGCTCACGTCGTACTGAAACTGGAAATTGTTTGGATACA<br>GCACGTACCTCTGGTCAGATGTCTGGAAGTTCTGAGGCCATGGCCACAGGGCGGTT<br>GCTCGTCCAGCAAATGCAGCGGCCAGCAGCAGGGAGAACCACAGTCTGGAGCTGGT<br>CATGGTGGCTTTATCGATACTAGCGCTAGAGCTTGCTCCCGCCCGCCGCGCGCTTCG<br>CTTTTTATAGGGCCGCCGCCGCCGCCGCCTCGCCATAAAAGGAAACTTTCGGAGCG<br>CGCCGCTCTGATTGGCTGCCGCCGCACCTCTCCGCCTCGCCCCGCCCCGCCCCTCGC<br>CCCCATCGCTGCACAAAATAATTAAAAAATAAATAAATACAAAATTGGGGGTGGGG<br>AGGGGGGGGAGATGGGGAGAGTGAAGCAGAACGTGGCCTCGGATCCCCCGGGCTG<br>CAGTATTAATAGTAATCAATTACGGGGTCATTAGTTCATAGCCCATATATGGAGTTC<br>CGCGTTACATAACTTACGGTAAATGGCCCGCCTGGCTGACCGCCCAACGACCCCCG<br>CCCATTGACGTCAATAATGACGTATGTTCCCATAGTAACGCCAATAGGGACTTTCCA<br>TTGACGTCAATGGGTGGAGTATTTACGGTAAACTGCCCACTTGGCAGTACATCAAGT<br>GTATCATATGCCAAGTACGCCCCCTATTGACGTCAATGACGGTAAATGGCCCGCCTG<br>GCATTATGCCCAGTACATGACCTTATGGGACTTTCCTACTTGGCAGTACATCTACGT<br>ATTAGTCATCGCTATTACCATGTCGAGGCCACGTTCTGCTTCACTCTCCCCATCTCCC<br>CCCCCTCCCCACCCCCAATTTTGTATTTATTTATTTTTTAATTATTTTGTGCAGCGAT<br>GGGGGCGAGGGGCGGGGCGGGGCGAGGCGGAGAGGTGCGGCGGCAGCCAATCAG<br>AGCGGCGCGCTCCGAAAGTTTCCTTTTATGGCGAGGCGGCGGCGGCGGCGGCCCTA<br>TAAAAAGCGAAGCGCGCGGCGGGCGGGAGCAAGCTCGCTAGCACTAGTAAAGCCA<br>CCATGGAACTGTGCGGACTGGGACTGCCTAGACCCCCTATGCTGCTGGCTCTGCTGC<br>TGGCTACCCTGCTGGCTGCTATGCTGGCCCTGCTGACTCAGGTGGCCCTGGTGGTCC<br>AGGTCGCAGAGGCAGCTAGGGCTCCTTCAGTGAGCGCAAAGCCAGGACCTGCCCTG<br>TGGCCACTGCCACTGTCCGTGAAAATGACACCAAACCTGCTGCACCTGGCCCCCGA<br>AAATTTCTACATCTCCCATTCTCCTAACAGTACAGCAGGGCCATCATGCACTCTGCT<br>GGAGGAAGCCTTCCGGAGATACCACGGGTATATTTTCGGCTTCTACAAGTGGCACC<br>ATGAGCCCGCAGAATTTCAGGCCAAAACCCAGGTGCAGCAGCTGCTGGTCAGCATC<br>ACACTGCAGTCCGAGTGTGACGCTTTCCCAAATATTAGCTCCGATGAGAGCTACACC<br>CTGCTGGTGAAGGAACCCGTGGCTGTCCTGAAAGCAAACAGAGTCTGGGGCGCACT<br>GAGGGGGCTGGAGACATTCTCCCAGCTGGTGTACCAGGACTCTTACGGAACATTTA<br>CTATCAACGAATCCACTATCATCGACTCCCCTAGGTTTTCTCACCGCGGCATCCTGA<br>TTGATACTTCTCGCCATTACCTGCCAGTGAAGATCATTCTGAAAACCCTGGATGCAA<br>TGGCCTTCAACAAGTTTAATGTGCTGCACTGGCATATCGTCGACGATCAGTCTTTCC<br>CTTACCAGAGTATTACATTTCCAGAGCTGAGTAATAAAGGCAGTTACTCACTGAGCC<br>ACGTGTATACTCCAAACGACGTGAGAATGGTCATCGAGTATGCCAGGCTGCGCGGA<br>ATTAGGGTGCTGCCAGAATTCGATACTCCCGGCCATACCCTGTCTTGGGGCAAGGG<br>GCAGAAAGACCTGCTGACCCCCTGCTACAGTCGGCAGAACAAGCTGGATTCATTCG<br>GCCCTATCAACCCAACACTGAATACCACATACTCTTTTCTGACTACCTTCTTTAAGG<br>AGATCAGTGAAGTGTTCCCCGACCAGTTTATTCACCTGGGCGGGGATGAGGTCGAA<br>TTCAAGTGTTGGGAGAGCAATCCTAAAATCCAGGACTTTATGAGACAGAAGGGATT<br>CGGCACCGACTTCAAGAAACTGGAATCATTCTACATTCAGAAGGTGCTGGACATCA<br>TTGCCACAATCAACAAAGGGAGCATCGTGTGGCAGGAGGTCTTTGACGATAAGGCC<br>AAACTGGCTCCCGGAACTATCGTGGAAGTCTGGAAGGATAGCGCCTATCCTGAGGA<br>ACTGTCACGCGTGACCGCTAGCGGCTTTCCCGTCATCCTGAGCGCACCTTGGTACCT<br>GGACCTGATTTCCTATGGGCAGGATTGGCGAAAGTACTATAAAGTGGAGCCCCTGG<br>ACTTCGGAGGCACCCAGAAGCAGAAACAGCTGTTTATCGGGGGAGAGGCCTGCCTG<br>TGGGGGGAATACGTGGATGCTACCAATCTGACACCACGACTGTGGCCTCGGGCTAG<br>CGCAGTGGGAGAGCGCCTGTGGTCTAGTAAGGACGTGCGGGATATGGACGATGCCT<br>ATGACCGGCTGACCCGACATCGGTGTAGAATGGTGGAACGGGGCATTGCCGCTCAG<br>CCACTGTATGCCGGGTACTGTAATCACGAAAATATGTGACTCGAGGCGGCCGCTCT<br>AGAGATCTTTTTCCCTCTGCCAAAAATTATGGGGACATCATGAAGCCCCTTGAGCAT<br>CTGACTTCTGGCTAATAAAGGAAATTTATTTTCATTGCAATAGTGTGTTGGAATTTTT<br>TGTGTCTCTCACTCGGCATGCTGGGGAGAGATCTAGGAACCCCTAGTGATGGAGTT<br>GGCCACTCCCTCTCTGCGCGCTCGCTCGCTCACTGAGGCCGCCCGGGCAAAGCCCG<br>GGCGTCGGGCGACCTTTGGTCGCCCGGCCTCAGTGAGCGAGCGAGCGCGCAGAGAG<br>GGAGTGGCCATGCAGCCAGCTGGCGTAATAGCGAAGAGGCCCGCACCGATCGCCCT<br>TCCCAACAGTTGCGTAGCCTGAATGGCGAATGGCGCGACGCGCCCTGTAGCGGCGC<br>ATTAAGCGCGGCGGGTGTGGTGGTTACGCGCAGCGTGACCGCTACACTTGCCAGCG<br>CCCTAGCGCCCGCTCCTTTCGCTTTCTTCCCTTCCTTTCTCGCCACGTTCGCCGGCTTT<br>CCCCGTCAAGCTCTAAATCGGGGGCTCCCTTTAGGGTTCCGATTTAGTGCTTTACGG<br>CACCTCGACCCCAAAAAACTTGATTAGGGTGATGGTTCACGTAGTGGGCCTCGCCCT<br>GATAGACGGTTTTTCGCCCTTTGACGTTGGAGTCCACGTTCTTTAATAGTGGACTCTT<br>GTTCCAAACTGGAACAACACTCAACCCTATCTCGGTCTATTCTTTTGATTTATAAGG<br>GATTTTGCCGATTTCGGCCTATTGGTTAAAAAATGAGCTGATTTAACAAAAATTTAA<br>CGCGAATTTTAACAAAATATTAACGTTTACAATTTCCTGATGCGGTATTTTCTCCTTA<br>CGCATCTGTGCGGTATTTCACACCGCATATGGTGCACTCTCAGTACAATCTGCTCTG<br>ATGCCGCATAGTTAAGCCAGCCCCGACACCCGCCAACACCCGCTGACGCGCCCTGA<br>CGGGCTTGTCTGCTCCCGGCATCCGCTTACAGACAAGCTGTGACCGTCTCCGGGAGC<br>TGCATGTGTCAGAGGTTTTCACCGTCATCACCGAAACGCGCGAGACGAAAGGGCCT<br>CGTGATACGCCTATTTTTATAGGTTAATGTCATGATAATAATGGTTTCTTAGACGTC<br>AGGTGGCACTTTTCGGGGAAATGTGCGCGGAACCCCTATTTGTTTATTTTTCTAAAT |

-continued

SEQUENCES

ACATTCAAATATGTATCCGCTCATGAGACAATAACCCTGATAAATGCTTCAATAATA
TTGAAAAAGGAAGAGTATGAGTATTCAACATTTCCGTGTCGCCCTTATTCCCTTTTT
TGCGGCATTTTGCCTTCCTGTTTTTGCTCACCCAGAAACGCTGGTGAAAGTAAAAGA
TGCTGAAGATCAGTTGGGTGCAGAGTGGGTTACATCGAACTGGATCTCAACAGCGG
TAAGATCCTTGAGAGTTTTCGCCCCGAAGAACGTTTTCCAATGATGAGCACTTTTAA
AGTTCTGCTATGTGGCGCGGTATTATCCCGTATTGACGCCGGGCAAGAGCAACTCG
GTCGCCGCATACACTATTCTCAGAATGACTTGGTTGAGTACTCACCAGTCACAGAAA
AGCATCTTACGGATGGCATGACAGTAAGAGAATTATGCAGTGCTGCCATAACCATG
AGTGATAACACTGCGGCCAACTTACTTCTGACAACGATCGGAGGACCGAAGGAGCT
AACCGCTTTTTTGCACAACATGGGGGATCATGTAACTCGCCTTGATCGTTGGGAACC
GGAGCTGAATGAAGCCATACCAAACGACGAGCGTGACACCACGATGCCTGTAGCA
ATGGCAACAACGTTGCGCAAACTATTAACTGGCGAACTACTTACTCTAGCTTCCCGG
CAACAATTAATAGACTGGATGGAGGCGGATAAAGTTGCAGGACCACTTCTGCGCTC
GGCCCTTCCGGCTGGCTGGTTTATTGCTGATAAATCTGGAGCCGGTGAGCGTGGGTC
TCGCGGTATCATTGCAGCACTGGGGCCAGATGGTAAGCCCTCCCGTATCGTAGTTAT
CTACACGACGGGGAGTCAGGCAACTATGGATGAACGAAATAGACAGATCGCTGAG
ATAGGTGCCTCACTGATTAAGCATTGGTAACTGTCAGACCAAGTTTACTCATATATA
CTTTAGATTGATTTAAAACTTCATTTTTAATTTAAAAGGATCTAGGTGAAGATCCTTT
TTGATAATCTCATGACCAAAATCCCTTAACGTGAGTTTTCGTTCCACTGAGCGTCAG
ACCCCGTAGAAAAGATCAAAGGATCTTCTTGAGATCCTTTTTTTCTGCGCGTAATCT
GCTGCTTGCAAACAAAAAAACCACCGCTACCAGCGGTGGTTTGTTTGCCGGATCAA
GAGCTACCAACTCTTTTTCCGAAGGTAACTGGCTTCAGCAGAGCGCAGATACCAAA
TACTGTCCTTCTAGTGTAGCCGTAGTTAGGCCACCACTTCAAGAACTCTGTAGCACC
GCCTACATACCTCGCTCTGCTAATCCTGTTACCAGTGGCTGCTGCCAGTGGCGATAA
GTCGTGTCTTACCGGGTTGGACTCAAGACGATAGTTACCGGATAAGGCGCAGCGGT
CGGGCTGAACGGGGGGTTCGTGCACACAGCCCAGCTTGGAGCGAACGACCTACACC
GAACTGAGATACCTACAGCGTGAGCATTGAGAAAGCGCCACGCTTCCCGAAGGGAG
AAAGGCGGACAGGTATCCGGTAAGCGGCAGGGTCGGAACAGGAGAGCGCACGAGG
GAGCTTCCAGGGGGAAACGCCTGGTATCTTTATAGTCCTGTCGGGTTTCGCCACCTC
TGACTTGAGCGTCGATTTTTGTGATGCTCGTCAGGGGGGCGGAGCCTATGGAAAAA
CGCCAGCAACGCGGCCTTTTTACGGTTCCTGGCCTTTTGCTGGCCTTTTGCTCACATG
TTCTTTCCTGCGTTATCCCCTGATTCTGTGGATAACCGTATTACCGCCTTTGAGTGAG
CTGATACCGCTCGCCGCAGCCGAACGACCGAGCGCAGCGAGTCAGTGAGCGAGGA
AGCGGAAGAGCGCCCAATACGCAAACCGCCTCTCCCCGCGCGTTGGCCGATTCATT
AATGCAGCTGGGCTGCAGGGGGGGGGGGGGGGGGGGTGGGGGGGGGGGGGGGGG

>SEQ ID NO: 6: P2i-mHexAB nucleic acid sequence
TTGGCCACTCCCTCTCTGCGCGCTCGCTCGCTCACTGAGGCCGGGCGACCAAAGGTC
GCCCGACGCCCGGGCTTTGCCCGGGCGGCCTCAGTGAGCGAGCGAGCGCGCAGAGA
GGGAGTGGCCAACTCCATCACTAGGGGTTCCTAGATCTGAATTCCTGGAGCCGGTG
TCAGGTTGCTCCGGTAACGGTGACGTGCACGCGTGGGCGGAGCCATCACGCAGGTT
GCTATATAAGCAGAGCTCGTTTAGTGAACCGTCAGAATCGATCCACCATGGCCGGC
TGCAGGCTCTGGGTTTCGCTGCTGCTGGCGGCGGCGTTGGCTTGCTTGGCCACGGCA
CTGTGGCCGTGGCCCCAGTACATCCAAACCTACCACCGGCGCTACACCCTGTACCCC
AACAACTTCCAGTTCCGGTACCATGTCAGTTCGGCCGCGCAGGCGGGCTGCGTCGTC
CTCGACGAGGCCTTTCGACGCTACCGTAACCTGCTCTTCGGTTCCGGCTCTTGGCCC
CGACCCAGCTTCTCAAATAAACAGCAAACGTTGGGGAAGAACATTCTGGTGGTCTC
CGTCGTCACAGCTGAATGTAATGAATTTCCTAATTTGGAGTCGGTAGAAAATTACAC
CCTAACCATTAATGATGACCAGTGTTTACTCGCCTCTGAGACTGTCTGGGGCGCTCT
CCGAGGTCTGGAGACTTTCAGTCAGCTTGTTTGGAAATCAGCTGAGGGCACGTTCTT
TATCAACAAGACAAAGATTAAAGACTTTCCTCGATTCCCTCACCGGGGCGTACTGCT
GGATACATCTCGCCATTACCTGCCATTGTCTAGCATCCTGGATACACTGGATGTCAT
GGCATACAATAAATTCAACGTGTTCCACTGGCACTTGGTGGACGACTCTTCCTTCCC
ATATGAGAGCTTCACTTTCCCAGAGCTCACCAGAAAGGGGTCCTTCAACCCTGTCAC
TCACATCTACACAGCACAGGATGTGAAGGAGGTCATTGAATACGCAAGGCTTCGGG
GTATCCGTGTGCTGGCAGAATTTGACACTCCTGGCCACACTTTGTCCTGGGGGCCAG
GTGCCCCTGGGTTATTAACACCTTGCTACTCTGGGTCTCATCTCTCTGGCACATTTGG
ACCGGTGAACCCCAGTCTCAACAGCACCTATGACTTCATGAGCACACTCTTCCTGGA
GATCAGCTCAGTCTTCCCGGACTTTTATCTCCACCTGGGAGGGGATGAAGTCGACTT
CACCTGCTGGAAGTCCAACCCCAACATCCAGGCCTTCATGAAGAAAAAGGGCTTTA
CTGACTTCAAGCAGCTGGAGTCCTTCTACATCCAGACGCTGCTGGACATCGTCTCTG
ATTATGACAAGGGCTATGTGGTGTGGCAGGAGGTATTTGATAATAAAGTGAAGGTT
CGGCCAGATACAATCATACAGGTGTGGCGGGAAGAAATGCCAGTAGAGTACATGTT
GGAGATGCAAGATATCACCAGGGCTGGCTTCCGGGCCCTGCTGTCTGCTCCCTGGTA
CCTGAACCGTGTAAAGTATGGCCCTGACTGGAAGGACATGTACAAAGTGGAGCCCC
TGGCGTTTCATGGTACGCCTGAACAGAAGGCTCTGGTCATTGGAGGGGAGGCCTGT
ATGTGGGGAGAGTATGTGGACAGCACCAACCTGGTCCCCAGACTCTGGCCCAGAGC
GGGTGCCGTCGCTGAGAGACTGTGGAGCAGTAACCTGACAACTAATATAGACTTTG
CCTTTAAACGTTTGTCGCATTTCCGTTGTGAGCTGGTGAGGAGAGGAATCCAGGCCC
AGCCCATCAGTGTAGGCTACTGTGAGCAGGAGTTTGAGCAGACTTGAGCGGCCGCG
ACTAGAGCTCGCTGATCAGCCTCGACTGTGCCTTCTAGTTGCCAGCCATCTGTTGTT
TGCCCCTCCCCCGTGCCTTCCTTGACCCTGGAAGGTGCCACTCCCACTGTCCTTTCCT
AATAAAATGAGGAAATTGCATCGCATTGTCTGAGTAGGTGTCATTCTATTCTGGGGG
GTGGGGTGGGGCAGGACAGCAAGGGGGAGGATTGGGAAGACAATAGCAGTACCAC
ATTTGTAGAGGTTTTACTTGCTTTAAAAAACCTCCCACATCTCCCCCTGAACCTGAA
ACATAAAATGAATGCAATTGTTGTTGTTAACTTGTTTATTGCAGCTTATAATGGTTA
CAAATAAAGCAATAGCATCACAAATTTCACAAATAAAGCATTTTTTTCACTGCATTC -continued

| SEQUENCES |
| --- |
| TAGTTGTGGTTTGTCCAAACTCATCAATGTATCTTATCATGTCTGCTCGACCTCGAGC<br>TATATTTTATTCTCATAGTTACAGTATCCAGTATAGAGAGGTTGTGCAGCTATTCCA<br>CGGCTGACCATTCTGCAGCGGTGCACGGCCAGTCGTTTGTAGGCATTTTCTAGGTCA<br>GTGACAGTTTTAGGGCTCCAGAGTCTCTCACCAACAGCGCTTGCTCGAGGCCATAAT<br>CTTGGAGTAAGGTTAGTTGCATCCACAAATTCTCCCCACAGGCAAGCTTCTCCACCA<br>ATAACAAGTTGTTTCTGCTTCTCAGAGCCTTCAAAATTAAGGGGCTCAACTTTGTAG<br>TAGTTTTTCCAGTCTTGCCCATAGCTGATCAGGTCTAAGTACCAAGGAGCAGAAAG<br>GATGGCAGGGAAGCCAGAGCCTGTGACTTGCTTTAGCTCATATGAATAATGCTCAC<br>TCTTCCACACTTCGACTACTGTGCCCGGCTGAAGCTCCACCTTATCATCAAAAACTT<br>CTTGCCAAACAATGGAGTTCTTCTTTAAGGATGAAATAATTTCCAAAATCTTTTTAA<br>TATAAAAGGATTCTAGTCTTCTAAAATCGCTGCCAAAGCCCTTTCTCTTCATGAAAC<br>CTTGGATGTTTGGATTTGATGCCCAACATTGAAATTCTACTTCATCTCCTCCCAAGTG<br>GATGAACTGATCTGGAAACACACTGCTGATTTCTTTGAAAAATGTGTTAAAGAATG<br>CATACGTTGTGTTTACAGTTGGGTCTACAGGCCCAAACACTTGAGTTTTAGTTTTTTG<br>ATTGTAACATGGAGTTAGAAGGTTTTTCTGTCCTTTGCCCCAAGACTGTGTATGGCC<br>AGGGGTATCAAATTCTGGTATGACTCGAATCCCTCGGAGCCGGGCGTACTCCAGCA<br>CCATCCGGACATCGTTTGGTGTATAGACATGAGACAAAGAGTAGCTTCCCTTATTGC<br>TTAGCTCAGGAAAAGTGGTACTCTGATAAGGGAAAGACTGGTCGTCCACTATGTGC<br>CAGTGAAGAACATTAAACTTATTAAAAGCCATGGCATCCAGAGTTTTTAAAATTGTC<br>TTCACAGGCAGGAAGTGTCTAGATGTATCAATTAAAATTCCTCTATGAGGGAATCTT<br>GGAGAATCAGCTATACTGGATTCATTGATGGTGAAAGTCCCGAAAGAGTCTTGGTA<br>AACTAACTGGCTAAACGTCTCTAAACCTCGTAACGCTCCCCAAACGCTGTTGGCCTT<br>GAGGACGGCTACTGGTTCTTGTACAAGCAGAGAATAGGTTTCATCTGAAGACAGAC<br>TAGGGAAGGACTCGCACTCTGACTCGAGGGTAATGGAGACCAGGAGCTTCTGCAAC<br>TGTGGCTCAGCTCGAAATCTAGCAGGGCCATGATGTCTCTTGTAGAAACCAAAAAC<br>ATAGTTGTAATATCGCCGAAACGCCTCCTGTAGCAGCGAGCAGGAAGGGCCCGCTG<br>TGGAATTGGGACTGTGGTCGATGCTGAAGTCCTCCGCGGAGATGTACAACAGCCGC<br>GGGAACATCTGCACCGAGCGCGGGAAGGGCCATAGCGCAGGTTGCAGTCGGGCCG<br>GGGCCACTAGGGCCAGCGACACTAGCGACACCAGCGCCTGCAGCAGCAGCAGCCC<br>GGGGGCGCTACGCGGGGACTGCGGCATGGTGGACTAGTTCTGACGGTTCACTAAAC<br>GAGCTCTGCTTATATAGCAACCTGCGTGATGGCTCCGCCCACGCGTGCACGTCACCG<br>TTACCGGAGCAACCTGACACCGGCTCCAGGCATGCTGGGGAGAGATCTAGGAACCC<br>CTAGTGATGGAGTTGGCCACTCCCTCTCTGCGCGCTCGCTCGCTCACTGAGGCCGCC<br>CGGGCAAAGCCCGGGCGTCGGGCGACCTTTGGTCGCCCGGCCTCAGTGAGCGAGCG<br>AGCGCGCAGAGAGGGAGTGGCCATGCAGCCAGCTGGCGTAATAGCGAAGAGGCCC<br>GCACCGATCGCCCTTCCCAACAGTTGCGTAGCCTGAATGGCGAATGGCGCGACGCG<br>CCCTGTAGCGGCGCATTAAGCGCGGCGGGTGTGGTGGTTACGCGCAGCGTGACCGC<br>TACACTTGCCAGCGCCCTAGCGCCCGCTCCTTTCGCTTTCTTCCCTTCCTTTCTCGCC<br>ACGTTCGCCGGCTTTCCCCGTCAAGCTCTAAATCGGGGGCTCCCTTTAGGGTTCCGA<br>TTTAGTGCTTTACGGCACCTCGACCCCAAAAAACTTGATTAGGGTGATGGTTCACGT<br>AGTGGGCCATCGCCCTGATAGACGGTTTTTCGCCCTTTGACGTTGGAGTCCACGTTC<br>TTTAATAGTGGACTCTTGTTCCAAACTGGAACAACACTCAACCCTATCTCGGTCTAT<br>TCTTTTGATTTATAAGGGATTTTGCCGATTTCGGCCTATTGGTTAAAAAATGAGCTG<br>ATTTAACAAAAATTTAACGCGAATTTTAACAAAATATTAACGTTTACAATTTCCTGA<br>TGCGGTATTTTCTCCTTACGCATCTGTGCGGTATTTCACACCGCATATGGTGCACTCT<br>CAGTACAATCTGCTCTGATGCCGCATAGTTAAGCCAGCCCCGACACCCGCCAACAC<br>CCGCTGACGCGCCCTGACGGGCTTGTCTGCTCCCGGCATCCGCTTACAGACAAGCTG<br>TGACCGTCTCCGGGAGCTGCATGTGTCAGAGGTTTTCACCGTCATCACCGAAACGCG<br>CGAGACGAAAGGGCCTCGTGATACGCCTATTTTTATAGGTTAATGTCATGATAATAA<br>TGGTTTCTTAGACGTCAGGTGGCACTTTTCGGGGAAATGTGCGCGGAACCCCTATTT<br>GTTTATTTTTCTAAATACATTCAAATATGTATCCGCTCATGAGACAATAACCCTGAT<br>AAATGCTTCAATAATATTGAAAAAGGAAGAGTATGAGTATTCAACATTTCCGTGTC<br>GCCCTTATTCCCTTTTTTGCGGCATTTTGCCTTCCTGTTTTTGCTCACCCAGAAACGC<br>TGGTGAAAGTAAAAGATGCTGAAGATCAGTTGGGTGCACGAGTGGGTTACATCGAA<br>CTGGATCTCAACAGCGGTAAGATCCTTGAGAGTTTTCGCCCCGAAGAACGTTTTCCA<br>ATGATGAGCACTTTTAAAGTTCTGCTATGTGGCGCGGTATTATCCCGTATTGACGCC<br>GGGCAAGAGCAACTCGGTCGCCGCATACACTATTCTCAGAATGACTTGGTTGAGTA<br>CTCACCAGTCACAGAAAAGCATCTTACGGATGGCATGACAGTAAGAGAATTATGCA<br>GTGCTGCCATAACCATGAGTGATAACACTGCGGCCAACTTACTTCTGACAACGATC<br>GGAGGACCGAAGGAGCTAACCGCTTTTTTGCACAACATGGGGGATCATGTAACTCG<br>CCTTGATCGTTGGGAACCGGAGCTGAATGAAGCCATACCAAACGACGAGCGTGACA<br>CCACGATGCCTGTAGCAATGGCAACAACGTTGCGCAAACTATTAACTGGCGAACTA<br>CTTACTCTAGCTTCCCGGCAACAATTAATAGACTGGATGGAGGCGGATAAAGTTGC<br>AGGACCACTTCTGCGCTCGGCCCTTCCGGCTGGCTGGTTTATTGCTGATAAATCTGG<br>AGCCGGTGAGCGTGGGTCTCGCGGTATCATTGCAGCACTGGGGCCAGATGGTAAGC<br>CCTCCCGTATCGTAGTTATCTACACGACGGGGAGTCAGGCAACTATGGATGAACGA<br>AATAGACAGATCGCTGAGATAGGTGCCTCACTGATTAAGCATTGGTAACTGTCAGA<br>CCAAGTTTACTCATATATACTTTAGATTGATTTAAAACTTCATTTTTAATTTAAAAGG<br>ATCTAGGTGAAGATCCTTTTTGATAATCTCATGACCAAAATCCCTTAACGTGAGTTT<br>TCGTTCCACTGAGCGTCAGACCCCGTAGAAAAGATCAAAGGATCTTCTTGAGATCCT<br>TTTTTTCTGCGCGTAATCTGCTGCTTGCAAACAAAAAAACCACCGCTACCAGCGGTG<br>GTTTGTTTGCCGGATCAAGAGCTACCAACTCTTTTTCCGAAGGTAACTGGCTTCAGC<br>AGAGCGCAGATACCAAATACTGTCCTTCTAGTGTAGCCGTAGTTAGGCCACCACTTC<br>AAGAACTCTGTAGCACCGCCTACATACCTCGCTCTGCTAATCCTGTTACCAGTGGCT<br>GCTGCCAGTGGCGATAAGTCGTGTCTTACCGGGTTGGACTCAAGACGATAGTTACC<br>GGATAAGGCGCAGCGGTCGGGCTGAACGGGGGGTTCGTGCACACAGCCCAGCTTGG<br>AGCGAACGACCTACACCGAACTGAGATACCTACAGCGTGAGCATTGAGAAAGCGCC |

SEQUENCES

ACGCTTCCCGAAGGGAGAAAGGCGGACAGGTATCCGGTAAGCGGCAGGGTCGGAA
CAGGAGAGCGCACGAGGGAGCTTCCAGGGGGAAACGCCTGGTATCTTTATAGTCCT
GTCGGGTTTCGCCACCTCTGACTTGAGCGTCGATTTTTGTGATGCTCGTCAGGGGGG
CGGAGCCTATGGAAAAACGCCAGCAACGCGGCCTTTTTACGGTTCCTGGCCTTTTGC
TGGCCTTTTGCTCACATGTTCTTTCCTGCGTTATCCCCTGATTCTGTGGATAACCGTA
TTACCGCCTTTGAGTGAGCTGATACCGCTCGCCGCAGCCGAACGACCGAGCGCAGC
GAGTCAGTGAGCGAGGAAGCGGAAGAGCGCCCAATACGCAAACCGCCTCTCCCCG
CGCGTTGGCCGATTCATTAATGCAGCTGGCTGCAGGGGGGGGGGGGGGGGGGGTG
GGGGGGGGGGGGGGGG

>SEQ ID NO: 7: AAV-hHexA:codon optimized-BiCBA-hHexB nucleic acid sequence
TTGGCCACTCCCTCTCTGCGCGCTCGCTCGCTCACTGAGGCCGGGCGACCAAAGGTC
GCCCGACGCCCGGGCTTTGCCCGGGCGGCCTCAGTGAGCGAGCGAGCGCGCAGAGA
GGGAGTGGCCAACTCCATCACTAGGGGTTCCTAGATCTGAATTCTACCACATTTGTA
GAGGTTTTACTTGCTTTAAAAAACCTCCCACATCTCCCCCTGAACCTGAAACATAAA
ATGAATGCAATTGTTGTTGTTAACTTGTTTATTGCAGCTTATAATGGTTACAAATAA
AGCAATAGCATCACAAATTTCACAAATAAAGCATTTTTTTCACTGCATTCTAGTTGT
GGTTTGTCCAAACTCATCAATGTATCTTATCATGTCTGTCGAGGCGGCCGCTCAGGT
CTGCTCAAATTCCTGCTCACAGAATCCGACATTCAGGGGCTGTGCCTGCACGCCTCT
CCTCAGCAGCTCGCACCTGAAGTGGCTCAGCCTTTCGTAAGCGAATGTCAGATCAG
AGGTCAGCTTGTTGGACCACAGTCTCTCGGCCACTGCTCCGGCCCTGGGCCACAGTC
GTGGGACCAGATTGGTGTTGTCCACATACTCGCCCCACATACATGCTTCGCCCCCGA
TGACCAGAGCTTTCTGCTCAGGAGTCCCTTCAAAGGCCAGGGGCTCCACAATGTAG
AAATCCTTCCAGTCTGGTCCATATGAGATCCTGTTCAGGTACCAAGGGGCACTCAGC
AGTGCTCGGAAGCCAGCTTTTGTCACCAGTTCCAGCTCCTTCATATAATTGACAGGA
ATATCCTCGCGCCACACTTGAATGATGGTATCGGGCTGGATTTTGACCTTGTTGTCA
AACACTTCCTGCCAGACCACATAGCCCTTTCCGTATGAACTCACAATGTCCAGCAGA
GTCTGGATGTAGAAACTCTCCAGCTGCTTGAAGTCTTCGCCGAACCCTTTCTTCCGC
ATAAAGTCCTGGATCTCTGGATTAGACTTCCAACATGTGAAATCCACTTCGTCTCCG
CCCAGGTGCAGATAAAAGTCAGGGAAGACAGAGGACACCTCCAGAAAGAATGTAG
ACATGAACTCGTAGGTATTGTTCAGGGATGGGTTCACAGGTCCGAAGGTGCCGCTT
GGCTCACTCCCAGAGTAGCAAGGAGTCAGCAGTCCGGGAATTCCTGGGCCCCAGCT
CAGAGTATGGCCAGGTGTATCGAATTCAGCCAGCACTCGAATCCCCCTCAGTCGGG
CATACTCGATGACTTCTTTCACGTCCTGGGCGGTATAGATGTGAGTCACGGGATTGT
AGCTGCCCTTGCGCATCAGCTCTGGAAATGTGAAGCTTTCGTAAGGAAATGAGGGA
TCGTCGACCAGATGCCAGTGGAACACGTTCAGCTTGTTATAAGCCATCACATCCAG
AGTGTCCAGAATGCTTGACAGGGGCAGGTAATGTCTAGATGTATCCAGCAGCAGCC
CCCGGTGTGGAAATCTAGGGAAGTCTTCGATCTCAGTTTTGTTGATAAAGAATGTTC
CCTCGGCTGACTTCCAGACCAGCTGACTGAAAGTCTCCAGGCCCCTCAGTGCCCCCC
ACACTGTTTCGGACAGCAGCAGACACTGATCGTCATTGATTGTCAGGGTATAGTTCT
CCACGGATTCCAGGGTGGGCAGCTGATTGCAGCCTGGAGTGACCACGCTGACCACC
AGCACGTTTTTCTCCAGGGTGTGGCGCTTCCCAGTCAGATAGGGCCGTGGCCAGGA
CCCGCTTCCAAACAGCAGATCGCGGTACCGCTGGAATGCCTCGTCCAGGACGCTGC
ATCCTGGCTGAGCGGCGCTGCTCACGTCGTACTGAAACTGGAAATTGTTTGGATACA
GCACGTACCTCTGGTCAGATGTCTGGAAGTTCTGAGGCCATGGCCACAGGGCGGTT
GCTCGTCCAGCAAATGCAGCGGCCAGCAGCAGGGAGAACCACAGTCTGGAGCTGGT
CATGGTGGCTTTATCGATACTAGCGCTAGAGCTTGCTCCCGCCCGCCGCGCGCTTCG
CTTTTTATAGGGCCGCCGCCGCCGCCGCCTCGCCATAAAAGGAAACTTTCGGAGCG
CGCCGCTCTGATTGGCTGCCGCCGCACCTCTCCGCCTCGCCCCGCCCCGCCCCTCGC
CCCCATCGCTGCACAAAATAATTAAAAAATAAATAAATACAAAATTGGGGGTGGGG
AGGGGGGGGAGATGGGGAGAGTGAAGCAGAACGTGGCCTCGGATCCCCCGGGCTG
CAGTATTAATAGTAATCAATTACGGGGTCATTAGTTCATAGCCCATATATGGAGTTC
CGCGTTACATAACTTACGGTAAATGGCCCGCCTGGCTGACCGCCCAACGACCCCCG
CCCATTGACGTCAATAATGACGTATGTTCCCATAGTAACGCCAATAGGGACTTTCCA
TTGACGTCAATGGGTGGAGTATTTACGGTAAACTGCCCACTTGGCAGTACATCAAGT
GTATCATATGCCAAGTACGCCCCCTATTGACGTCAATGACGGTAAATGGCCCGCCTG
GCATTATGCCCAGTACATGACCTTATGGGACTTTCCTACTTGGCAGTACATCTACGT
ATTAGTCATCGCTATTACCATGTCGAGGCCACGTTCTGCTTCACTCTCCCCATCTCCC
CCCCCTCCCCACCCCCAATTTTGTATTTATTTATTTTTTAATTATTTTGTGCAGCGAT
GGGGGCGAGGGGCGGGGCGGGGCGAGGCGGAGAGGTGCGGCGGCAGCCAATCAG
AGCGGCGCGCTCCGAAAGTTTCCTTTTATGGCGAGGCGGCGGCGGCGGCGGCCCTA
TAAAAAGCGAAGCGCGCGGCGGGCGGGAGCAAGCTCGCTAGCACTAGTGGAGCAC
CATGGAGCTGTGCGGGCTGGGGCTGCCCCGGCCGCCCATGCTGCTGGCGCTGCTGTT
GGCGACACTGCTGGCGGCGATGTTGGCGCTGCTGACTCAGGTGGCGCTGGTGGTGC
AGGTGGCGGAGGCGGCTCGGGCCCCGAGCGTCTCGGCCAAGCCGGGGCCGGCGCT
GTGGCCCCTGCCGCTCTCGGTGAAGATGACCCCGAACCTGCTGCATCTCGCCCCGGA
GAACTTCTACATCAGCCACAGCCCCAATTCCACGGCGGGCCCCTCCTGCACCCTGCT
GGAGGAAGCGTTTCGACGATATCATGGCTATATTTTTGGTTTCTACAAGTGGCATCA
TGAACCTGCTGAATTCCAGGCTAAAACCCAGGTTCAGCAACTTCTTGTCTCAATCAC
CCTTCAGTCAGAGTGTGATGCTTTCCCCAACATATCTTCAGATGAGTCTTATACTTTA
CTTGTGAAAGAACCAGTGGCTGTCCTTAAGGCCAACAGAGTTTGGGGAGCATTACG
AGGTTTAGAGACCTTTAGCCAGTTAGTTTATCAAGATTCTTATGGAACTTTCACCAT
CAATGAATCCACCATTATTGATTCTCCAAGGTTTTCTCACAGAGGAATTTTGATTGA
TACATCCAGACATTATCTGCCAGTTAAGATTATTCTTAAAACTCTGGATGCCATGGC
TTTTAATAAGTTTAATGTTCTTCACTGGCACATAGTTGATGACCAGTCTTTCCCATAT
CAGAGCATCACTTTTCCTGAGTTAAGCAATAAAGGAAGCTATTCTTTGTCTCATGTT -continued

| SEQUENCES |
|---|

TATACACCAAATGATGTCCGTATGGTGATTGAATATGCCAGATTACGAGGAATTCG
AGTCCTGCCAGAATTTGATACCCCTGGGCATACACTATCTTGGGGAAAAGGTCAGA
AAGACCTCCTGACTCCATGTTACAGTAGACAAAACAAGTTGGACTCTTTTGGACCTA
TAAACCCTACTCTGAATACAACATACAGCTTCCTTACTACATTTTTCAAAGAAATTA
GTGAGGTGTTTCCAGATCAATTCATTCATTTGGGAGGAGATGAAGTGGAATTTAAAT
GTTGGGAATCAAATCCAAAAATTCAAGATTTCATGAGGCAAAAAGGCTTTGGCACA
GATTTTAAGAAACTAGAATCTTTCTACATTCAAAAGGTTTTGGATATTATTGCAACC
ATAAACAAGGGATCCATTGTCTGGCAGGAGGTTTTTGATGATAAAGCAAAGCTTGC
GCCGGGCACAATAGTTGAAGTATGGAAAGACAGCGCATATCCTGAGGAACTCAGTA
GAGTCACAGCATCTGGCTTCCCTGTAATCCTTTCTGCTCCTTGGTACTTAGATTTGAT
TAGCTATGGACAAGATTGGAGGAAATACTATAAAGTGGAACCTCTTGATTTTGGCG
GTACTCAGAAACAGAAACAACTTTTCATTGGTGGAGAAGCTTGTCTATGGGGAGAA
TATGTGGATGCAACTAACCTCACTCCAAGATTATGGCCTCGGGCAAGTGCTGTTGGT
GAGAGACTCTGGAGTTCCAAAGATGTCAGAGATATGGATGACGCCTATGACAGACT
GACAAGGCACCGCTGCAGGATGGTCGAACGTGGAATAGCTGCACAACCTCTTTATG
CTGGATATTGTAACCATGAGAACATGTAACTCGAGGCGGCCGCTCTAGAGATCTTTT
TCCCTCTGCCAAAAATTATGGGGACATCATGAAGCCCCTTGAGCATCTGACTTCTGG
CTAATAAAGGAAATTTATTTTCATTGCAATAGTGTGTTGGAATTTTTTGTGTCTCTCA
CTCGGCATGCTGGGGAGAGATCTGAGGAACCCCTAGTGATGGAGTTGGCCACTCCC
TCTCTGCGCGCTCGCTCGCTCACTGAGGCCGCCCGGGCAAAGCCCGGGCGTCGGGC
GACCTTTGGTCGCCCGGCCTCAGTGAGCGAGCGAGCGCGCAGAGAGGGAGTGGCCA
TGCAGCCAGCTGGCGTAATAGCGAAGAGGCCCGCACCGATCGCCCTTCCCAACAGT
TGCGTAGCCTGAATGGCGAATGGCGCGACGCGCCCTGTAGCGGCGCATTAAGCGCG
GCGGGTGTGGTGGTTACGCGCAGCGTGACCGCTACACTTGCCAGCGCCCTAGCGCC
CGCTCCTTTCGCTTTCTTCCCTTCCTTTCTCGCCACGTTCGCCGGCTTTCCCCGTCAA
GCTCTAAATCGGGGGCTCCCTTTAGGGTTCCGATTTAGTGCTTTACGGCACCTCGAC
CCCAAAAAACTTGATTAGGGTGATGGTTCACGTAGTGGGCCATCGCCCTGATAGAC
GGTTTTTCGCCCTTTGACGTTGGAGTCCACGTTCTTTAATAGTGGACTCTTGTTCCAA
ACTGGAACAACACTCAACCCTATCTCGGTCTATTCTTTTGATTTATAAGGGATTTTG
CCGATTTCGGCCTATTGGTTAAAAAATGAGCTGATTTAACAAAAATTTAACGCGAAT
TTTAACAAAATATTAACGTTTACAATTTCCTGATGCGGTATTTTCTCCTTACGCATCT
GTGCGGTATTTCACACCGCATATGGTGCACTCTCAGTACAATCTGCTCTGATGCCGC
ATAGTTAAGCCAGCCCCGACACCCGCCAACACCCGCTGACGCGCCCTGACGGGCTT
GTCTGCTCCCGGCATCCGCTTACAGACAAGCTGTGACCGTCTCCGGGAGCTGCATGT
GTCAGAGGTTTTCACCGTCATCACCGAAACGCGCGAGACGAAAGGGCCTCGTGATA
CGCCTATTTTTATAGGTTAATGTCATGATAATAATGGTTTCTTAGACGTCAGGTGGC
ACTTTTCGGGGAAATGTGCGCGGAACCCCTATTTGTTTATTTTTCTAAATACATTCA
AATATGTATCCGCTCATGAGACAATAACCCTGATAAATGCTTCAATAATATTGAAA
AAGGAAGAGTATGAGTATTCAACATTTCCGTGTCGCCCTTATTCCCTTTTTTGCGGC
ATTTTGCCTTCCTGTTTTTGCTCACCCAGAAACGCTGGTGAAAGTAAAAGATGCTGA
AGATCAGTTGGGTGCACGAGTGGGTTACATCGAACTGGATCTCAACAGCGGTAAGA
TCCTTGAGAGTTTTCGCCCCGAAGAACGTTTTCCAATGATGAGCACTTTTAAAGTTC
TGCTATGTGGCGCGGTATTATCCCGTATTGACGCCGGGCAAGAGCAACTCGGTCGC
CGCATACACTATTCTCAGAATGACTTGGTTGAGTACTCACCAGTCACAGAAAAGCA
TCTTACGGATGGCATGACAGTAAGAGAATTATGCAGTGCTGCCATAACCATGAGTG
ATAACACTGCGGCCAACTTACTTCTGACAACGATCGGAGGACCGAAGGAGCTAACC
GCTTTTTTGCACAACATGGGGGATCATGTAACTCGCCTTGATCGTTGGGAACCGGAG
CTGAATGAAGCCATACCAAACGACGAGCGTGACACCACGATGCCTGTAGCAATGGC
AACAACGTTGCGCAAACTATTAACTGGCGAACTACTTACTCTAGCTTCCCGGCAACA
ATTAATAGACTGGATGGAGGCGGATAAAGTTGCAGGACCACTTCTGCGCTCGGCCC
TTCCGGCTGGCTGGTTTATTGCTGATAAATCTGGAGCCGGTGAGCGTGGGTCTCGCG
GTATCATTGCAGCACTGGGGCCAGATGGTAAGCCCTCCCGTATCGTAGTTATCTACA
CGACGGGGAGTCAGGCAACTATGGATGAACGAAATAGACAGATCGCTGAGATAGG
TGCCTCACTGATTAAGCATTGGTAACTGTCAGACCAAGTTTACTCATATATACTTTA
GATTGATTTAAAACTTCATTTTTAATTTAAAAGGATCTAGGTGAAGATCCTTTTTGA
TAATCTCATGACCAAAATCCCTTAACGTGAGTTTTCGTTCCACTGAGCGTCAGACCC
CGTAGAAAAGATCAAAGGATCTTCTTGAGATCCTTTTTTTCTGCGCGTAATCTGCTG
CTTGCAAACAAAAAAACCACCGCTACCAGCGGTGGTTTGTTTGCCGGATCAAGAGC
TACCAACTCTTTTTCCGAAGGTAACTGGCTTCAGCAGAGCGCAGATACCAAATACTG
TCCTTCTAGTGTAGCCGTAGTTAGGCCACCACTTCAAGAACTCTGTAGCACCGCCTA
CATACCTCGCTCTGCTAATCCTGTTACCAGTGGCTGCTGCCAGTGGCGATAAGTCGT
GTCTTACCGGGTTGGACTCAAGACGATAGTTACCGGATAAGGCGCAGCGGTCGGGC
TGAACGGGGGGTTCGTGCACACAGCCCAGCTTGGAGCGAACGACCTACACCGAACT
GAGATACCTACAGCGTGAGCATTGAGAAAGCGCCACGCTTCCCGAAGGGAGAAAG
GCGGACAGGTATCCGGTAAGCGGCAGGGTCGGAACAGGAGAGCGCACGAGGGAGC
TTCCAGGGGGAAACGCCTGGTATCTTTATAGTCCTGTCGGGTTTCGCCACCTCTGAC
TTGAGCGTCGATTTTTGTGATGCTCGTCAGGGGGGCGGAGCCTATGGAAAAACGCC
AGCAACGCGGCCTTTTTACGGTTCCTGGCCTTTTGCTGGCCTTTTGCTCACATGTTCT
TTCCTGCGTTATCCCCTGATTCTGTGGATAACCGTATTACCGCCTTTGAGTGAGCTG
ATACCGCTCGCCGCAGCCGAACGACCGAGCGCAGCGAGTCAGTGAGCGAGGAAGC
GGAAGAGCGCCCAATACGCAAACCGCCTCTCCCCGCGCGTTGGCCGATTCATTAAT
GCAGCTGGGCTGCAGGGGGGGGGGGGGGGGGGGGTGGGGGGGGGGGGGGGGG

>SEQ ID NO: 8: AAV-hHexA:codon optimized-BiCBA-hHexB: codon optimized nucleic acid sequence
TTGGCCACTCCCTCTCTGCGCGCTCGCTCGCTCACTGAGGCCGGGCGACCAAAGGTC
GCCCGACGCCCGGGCTTTGCCCGGGCGGCCTCAGTGAGCGAGCGAGCGCGCAGAGA -continued

| SEQUENCES |
| --- |
| GGGAGTGGCCAACTCCATCACTAGGGGTTCCTCAGATCTGAATTCTACCACATTTGT<br>AGAGGTTTTACTTGCTTTAAAAAACCTCCCACATCTCCCCCTGAACCTGAAACATAA<br>AATGAATGCAATTGTTGTTGTTAACTTGTTTATTGCAGCTTATAATGGTTACAAATA<br>AAGCAATAGCATCACAAATTTCACAAATAAAGCATTTTTTTCACTGCATTCTAGTTG<br>TGGTTTGTCCAAACTCATCAATGTATCTTATCATGTCTGTCGAGGCGGCCGCTCAGG<br>TCTGCTCAAATTCCTGCTCACAGAATCCGACATTCAGGGGCTGTGCCTGCACGCCTC<br>TCCTCAGCAGCTCGCACCTGAAGTGGCTCAGCCTTTCGTAAGCGAATGTCAGATCAG<br>AGGTCAGCTTGTTGGACCACAGTCTCTCGGCCACTGCTCCGGCCCTGGGCCACAGTC<br>GTGGGACCAGATTGGTGTTGTCCACATACTCGCCCCACATACATGCTTCGCCCCCGA<br>TGACCAGAGCTTTCTGCTCAGGAGTCCCTTCAAAGGCCAGGGGCTCCACAATGTAG<br>AAATCCTTCCAGTCTGGTCCATATGAGATCCTGTTCAGGTACCAAGGGGCACTCAGC<br>AGTGCTCGGAAGCCAGCTTTTGTCACCAGTTCCAGCTCCTTCATATAATTGACAGGA<br>ATATCCTCGCGCCACACTTGAATGATGGTATCGGGCTGGATTTTGACCTTGTTGTCA<br>AACACTTCCTGCCAGACCACATAGCCCTTTCCGTATGAACTCACAATGTCCAGCAGA<br>GTCTGGATGTAGAAACTCTCCAGCTGCTTGAAGTCTTCGCCGAACCCTTTCTTCCGC<br>ATAAAGTCCTGGATCTCTGGATTAGACTTCCAACATGTGAAATCCACTTCGTCTCCG<br>CCCAGGTGCAGATAAAAGTCAGGGAAGACAGAGGACACCTCCAGAAAGAATGTAG<br>ACATGAACTCGTAGGTATTGTTCAGGGATGGGTTCACAGGTCCGAAGGTGCCGCTT<br>GGCTCACTCCCAGAGTAGCAAGGAGTCAGCAGTCCGGGAATTCCTGGGCCCCAGCT<br>CAGAGTATGGCCAGGTGTATCGAATTCAGCCAGCACTCGAATCCCCCTCAGTCGGG<br>CATACTCGATGACTTCTTTCACGTCCTGGGCGGTATAGATGTGAGTCACGGGATTGT<br>AGCTGCCCTTGCGCATCAGCTCTGGAAATGTGAAGCTTTCGTAAGGAAATGAGGGA<br>TCGTCGACCAGATGCCAGTGGAACACGTTCAGCTTGTTATAAGCCATCACATCCAG<br>AGTGTCCAGAATGCTTGACAGGGGCAGGTAATGTCTAGATGTATCCAGCAGCAGCC<br>CCCGGTGTGGAAATCTAGGGAAGTCTTCGATCTCAGTTTTGTTGATAAAGAATGTTC<br>CCTCGGCTGACTTCCAGACCAGCTGACTGAAAGTCTCCAGGCCCCTCAGTGCCCCCC<br>ACACTGTTTCGGACAGCAGCAGACACTGATCGTCATTGATTGTCAGGGTATAGTTCT<br>CCACGGATTCCAGGGTGGGCAGCTGATTGCAGCCTGGAGTGACCACGCTGACCACC<br>AGCACGTTTTTCTCCAGGGTGTGGCGCTTCCCAGTCAGATAGGGCCGTGGCCAGGA<br>CCCGCTTCCAAACAGCAGATCGCGGTACCGCTGGAATGCCTCGTCCAGGACGCTGC<br>ATCCTGGCTGAGCGGCGCTGCTCACGTCGTACTGAAACTGGAAATTGTTTGGATACA<br>GCACGTACCTCTGGTCAGATGTCTGGAAGTTCTGAGGCCATGGCCACAGGGCGGTT<br>GCTCGTCCAGCAAATGCAGCGGCCAGCAGCAGGGAGAACCACAGTCTGGAGCTGGT<br>CATGGTGGCTTTATCGATACTAGCGCTAGAGCTTGCTCCCGCCCGCCGCGCGCTTCG<br>CTTTTTATAGGGCCGCCGCCGCCGCCGCCTCGCCATAAAAGGAAACTTTCGGAGCG<br>CGCCGCTCTGATTGGCTGCCGCCGCACCTCTCCGCCTCGCCCCGCCCCGCCCCTCGC<br>CCCCATCGCTGCACAAAATAATTAAAAAATAAATAAATACAAAATTGGGGGTGGGG<br>AGGGGGGGGAGATGGGGAGAGTGAAGCAGAACGTGGCCTCGGATCCCCCGGGCTG<br>CAGTATTAATAGTAATCAATTACGGGGTCATTAGTTCATAGCCCATATATGGAGTTC<br>CGCGTTACATAACTTACGGTAAATGGCCCGCCTGGCTGACCGCCCAACGACCCCCG<br>CCCATTGACGTCAATAATGACGTATGTTCCCATAGTAACGCCAATAGGGACTTTCCA<br>TTGACGTCAATGGGTGGAGTATTTACGGTAAACTGCCCACTTGGCAGTACATCAAGT<br>GTATCATATGCCAAGTACGCCCCCTATTGACGTCAATGACGGTAAATGGCCCGCCTG<br>GCATTATGCCCAGTACATGACCTTATGGGACTTTCCTACTTGGCAGTACATCTACGT<br>ATTAGTCATCGCTATTACCATGTCGAGGCCACGTTCTGCTTCACTCTCCCCATCTCCC<br>CCCCCTCCCCACCCCCAATTTTGTATTTATTTATTTTTTAATTATTTTGTGCAGCGAT<br>GGGGGCGAGGGGCGGGGCGGGGCGAGGCGGAGAGGTGCGGCGGCAGCCAATCAG<br>AGCGGCGCGCTCCGAAAGTTTCCTTTTATGGCGAGGCGGCGGCGGCGGCGGCCCTA<br>TAAAAAGCGAAGCGCGCGGCGGGCGGGAGCAAGCTCGCTAGCACTAGTAAAGCCA<br>CCATGGAACTGTGCGGACTGGGACTGCCTAGACCCCCTATGCTGCTGGCTCTGCTGC<br>TGGCTACCCTGCTGGCTGCTATGCTGGCCCTGCTGACTCAGGTGGCCCTGGTGGTCC<br>AGGTCGCAGAGGCAGCTAGGGCTCCTTCAGTGAGCGCAAAGCCAGGACCTGCCCTG<br>TGGCCACTGCCACTGTCCGTGAAAATGACACCAAACCTGCTGCACCTGGCCCCCGA<br>AAATTTCTACATCTCCCATTCTCCTAACAGTACAGCAGGGCCATCATGCACTCTGCT<br>GGAGGAAGCCTTCCGGAGATACCACGGGTATATTTTCGGCTTCTACAAGTGGCACC<br>ATGAGCCCGCAGAATTTCAGGCCAAAACCCAGGTGCAGCAGCTGCTGGTCAGCATC<br>ACACTGCAGTCCGAGTGTGACGCTTTCCCAAATATTAGCTCCGATGAGAGCTACACC<br>CTGCTGGTGAAGGAACCCGTGGCTGTCCTGAAAGCAAACAGAGTCTGGGGCGCACT<br>GAGGGGGCTGGAGACATTCTCCCAGCTGGTGTACCAGGACTCTTACGGAACATTTA<br>CTATCAACGAATCCACTATCATCGACTCCCCTAGGTTTTCTCACCGCGGCATCCTGA<br>TTGATACTTCTCGCCATTACCTGCCAGTGAAGATCATTCTGAAAACCCTGGATGCAA<br>TGGCCTTCAACAAGTTTAATGTGCTGCACTGGCATATCGTCGACGATCAGTCTTTCC<br>CTTACCAGAGTATTACATTTCCAGAGCTGAGTAATAAAGGCAGTTACTCACTGAGCC<br>ACGTGTATACTCCAAACGACGTGAGAATGGTCATCGAGTATGCCAGGCTGCGCGGA<br>ATTAGGGTGCTGCCAGAATTCGATACTCCCGGCCATACCCTGTCTTGGGGCAAGGG<br>GCAGAAAGACCTGCTGACCCCCTGCTACAGTCGGCAGAACAAGCTGGATTCATTCG<br>GCCCTATCAACCCAACACTGAATACCACATACTCTTTTCTGACTACCTTCTTTAAGG<br>AGATCAGTGAAGTGTTCCCCGACCAGTTTATTCACCTGGGCGGGGATGAGGTCGAA<br>TTCAAGTGTTGGGAGAGCAATCCTAAAATCCAGGACTTTATGAGACAGAAGGGATT<br>CGGCACCGACTTCAAGAAACTGGAATCATTCTACATTCAGAAGGTGCTGGACATCA<br>TTGCCACAATCAACAAAGGGAGCATCGTGTGGCAGGAGGTCTTTGACGATAAGGCC<br>AAACTGGCTCCCGGAACTATCGTGGAAGTCTGGAAGGATAGCGCCTATCCTGAGGA<br>ACTGTCACGCGTGACCGCTAGCGGCTTTCCCGTCATCCTGAGCGCACCTTGGTACCT<br>GGACCTGATTTCCTATGGGCAGGATTGGCGAAAGTACTATAAAGTGGAGCCCCTGG<br>ACTTCGGAGGCACCCAGAAGCAGAAACAGCTGTTTATCGGGGGAGAGGCCTGCCTG<br>TGGGGGGAATACGTGGATGCTACCAATCTGACACCACGACTGTGGCCTCGGGCTAG<br>CGCAGTGGGAGAGCGCCTGTGGTCTAGTAAGGACGTGCGGGATATGGACGATGCCT |

SEQUENCES

ATGACCGGCTGACCCGACATCGGTGTAGAATGGTGGAACGGGGCATTGCCGCTCAG
CCACTGTATGCCGGGTACTGTAATCACGAAAATATGTGACTCGAGGCGGCCGCTCT
AGAGATCTTTTTCCCTCTGCCAAAAATTATGGGGACATCATGAAGCCCCTTGAGCAT
CTGACTTCTGGCTAATAAAGGAAATTTATTTTCATTGCAATAGTGTGTTGGAATTTTT
TGTGTCTCTCACTCGGCATGCTGGGGAGAGATCTGAGGAACCCCTAGTGATGGAGT
TGGCCACTCCCTCTCTGCGCGCTCGCTCGCTCACTGAGGCCGCCCGGGCAAAGCCCG
GGCGTCGGGCGACCTTTGGTCGCCCGGCCTCAGTGAGCGAGCGAGCGCGCAGAGAG
GGAGTGGCCATGCAGCCAGCTGGCGTAATAGCGAAGAGGCCCGCACCGATCGCCCT
TCCCAACAGTTGCGTAGCCTGAATGGCGAATGGCGCGACGCGCCCTGTAGCGGCGC
ATTAAGCGCGGCGGGTGTGGTGGTTACGCGCAGCGTGACCGCTACACTTGCCAGCG
CCCTAGCGCCCGCTCCTTTCGCTTTCTTCCCTTCCTTTCTCGCCACGTTCGCCGGCTTT
CCCCGTCAAGCTCTAAATCGGGGGCTCCCTTTAGGGTTCCGATTTAGTGCTTTACGG
CACCTCGACCCCAAAAAACTTGATTAGGGTGATGGTTCACGTAGTGGGCCATCGCC
CTGATAGACGGTTTTTCGCCCTTTGACGTTGGAGTCCACGTTCTTTAATAGTGGACT
CTTGTTCCAAACTGGAACAACACTCAACCCTATCTCGGTCTATTCTTTTGATTTATAA
GGGATTTTGCCGATTTCGGCCTATTGGTTAAAAAATGAGCTGATTTAACAAAAATTT
AACGCGAATTTTAACAAAATATTAACGTTTACAATTTCCTGATGCGGTATTTTCTCC
TTACGCATCTGTGCGGTATTTCACACCGCATATGGTGCACTCTCAGTACAATCTGCT
CTGATGCCGCATAGTTAAGCCAGCCCCGACACCCGCCAACACCCGCTGACGCGCCC
TGACGGGCTTGTCTGCTCCCGGCATCCGCTTACAGACAAGCTGTGACCGTCTCCGGG
AGCTGCATGTGTCAGAGGTTTTCACCGTCATCACCGAAACGCGCGAGACGAAAGGG
CCTCGTGATACGCCTATTTTTATAGGTTAATGTCATGATAATAATGGTTTCTTAGAC
GTCAGGTGGCACTTTTCGGGGAAATGTGCGCGGAACCCCTATTTGTTTATTTTTCTA
AATACATTCAAATATGTATCCGCTCATGAGACAATAACCCTGATAAATGCTTCAATA
ATATTGAAAAAGGAAGAGTATGAGTATTCAACATTTCCGTGTCGCCCTTATTCCCTT
TTTTGCGGCATTTTGCCTTCCTGTTTTTGCTCACCCAGAAACGCTGGTGAAAGTAAA
AGATGCTGAAGATCAGTTGGGTGCACGAGTGGGTTACATCGAACTGGATCTCAACA
GCGGTAAGATCCTTGAGAGTTTTCGCCCCGAAGAACGTTTTCCAATGATGAGCACTT
TTAAAGTTCTGCTATGTGGCGCGGTATTATCCCGTATTGACGCCGGGCAAGAGCAAC
TCGGTCGCCGCATACACTATTCTCAGAATGACTTGGTTGAGTACTCACCAGTCACAG
AAAAGCATCTTACGGATGGCATGACAGTAAGAGAATTATGCAGTGCTGCCATAACC
ATGAGTGATAACACTGCGGCCAACTTACTTCTGACAACGATCGGAGGACCGAAGGA
GCTAACCGCTTTTTTGCACAACATGGGGGATCATGTAACTCGCCTTGATCGTTGGGA
ACCGGAGCTGAATGAAGCCATACCAAACGACGAGCGTGACACCACGATGCCTGTAG
CAATGGCAACAACGTTGCGCAAACTATTAACTGGCGAACTACTTACTCTAGCTTCCC
GGCAACAATTAATAGACTGGATGGAGGCGGATAAAGTTGCAGGACCACTTCTGCGC
TCGGCCCTTCCGGCTGGCTGGTTTATTGCTGATAAATCTGGAGCCGGTGAGCGTGGG
TCTCGCGGTATCATTGCAGCACTGGGGCCAGATGGTAAGCCCTCCCGTATCGTAGTT
ATCTACACGACGGGGAGTCAGGCAACTATGGATGAACGAAATAGACAGATCGCTG
AGATAGGTGCCTCACTGATTAAGCATTGGTAACTGTCAGACCAAGTTTACTCATATA
TACTTTAGATTGATTTAAAACTTCATTTTTAATTTAAAAGGATCTAGGTGAAGATCC
TTTTTGATAATCTCATGACCAAAATCCCTTAACGTGAGTTTTCGTTCCACTGAGCGTC
AGACCCCGTAGAAAAGATCAAAGGATCTTCTTGAGATCCTTTTTTTCTGCGCGTAAT
CTGCTGCTTGCAAACAAAAAAACCACCGCTACCAGCGGTGGTTTGTTTGCCGGATC
AAGAGCTACCAACTCTTTTTCCGAAGGTAACTGGCTTCAGCAGAGCGCAGATACCA
AATACTGTCCTTCTAGTGTAGCCGTAGTTAGGCCACCACTTCAAGAACTCTGTAGCA
CCGCCTACATACCTCGCTCTGCTAATCCTGTTACCAGTGGCTGCTGCCAGTGGCGAT
AAGTCGTGTCTTACCGGGTTGGACTCAAGACGATAGTTACCGGATAAGGCGCAGCG
GTCGGGCTGAACGGGGGGTTCGTGCACACAGCCCAGCTTGGAGCGAACGACCTACA
CCGAACTGAGATACCTACAGCGTGAGCATTGAGAAAGCGCCACGCTTCCCGAAGGG
AGAAAGGCGGACAGGTATCCGGTAAGCGGCAGGGTCGGAACAGGAGAGCGCACGA
GGGAGCTTCCAGGGGGAAACGCCTGGTATCTTTATAGTCCTGTCGGGTTTCGCCACC
TCTGACTTGAGCGTCGATTTTTGTGATGCTCGTCAGGGGGGCGGAGCCTATGGAAA
AACGCCAGCAACGCGGCCTTTTTACGGTTCCTGGCCTTTTGCTGGCCTTTTGCTCAC
ATGTTCTTTCCTGCGTTATCCCCTGATTCTGTGGATAACCGTATTACCGCCTTTGAGT
GAGCTGATACCGCTCGCCGCAGCCGAACGACCGAGCGCAGCGAGTCAGTGAGCGA
GGAAGCGGAAGAGCGCCCAATACGCAAACCGCCTCTCCCCGCGCGTTGGCCGATTC
ATTAATGCAGCTGGGCTGCAGGGGGGGGGGGGGGGGGGTGGGGGGGGGGGGGG
GGG

>SEQ ID NO: 9: AAV-hHexA-BiCBA-hHexB nucleic acid sequence
TTGGCCACTCCCTCTCTGCGCGCTCGCTCGCTCACTGAGGCCGGGCGACCAAAGGTC
GCCCGACGCCCGGGCTTTGCCCGGGCGGCCTCAGTGAGCGAGCGAGCGCGCAGAGA
GGGAGTGGCCAACTCCATCACTAGGGGTTCCTCAGATCTGAATTCTACCACATTTGT
AGAGGTTTTACTTGCTTTAAAAAACCTCCCACATCTCCCCCTGAACCTGAAACATAA
AATGAATGCAATTGTTGTTGTTAACTTGTTTATTGCAGCTTATAATGGTTACAAATA
AAGCAATAGCATCACAAATTTCACAAATAAAGCATTTTTTTCACTGCATTCTAGTTG
TGGTTTGTCCAAACTCATCAATGTATCTTATCATGTCTGTCGAGTCAGGTCTGTTCAA
ACTCCTGCTCACAGAAGCCTACATTGAGGGGTTGGGCCTGGACACCTCGCCTCAGC
AACTCACAGCGGAAGTGTGACAAACGTTCATAGGCAAATGTCAGGTCAGATGTCAA
CTTGTTGCTCCACAGCCTTTCGGCAACAGCCCCTGCTCTGGGCCAGAGCCTGGGGAC
CAGGTTTGTGTTGTCCACATATTCTCCCCACATACAAGCCTCTCCACCAATCACCAG
AGCCTTCTGCTCAGGGGTACCTTCAAATGCCAGGGGTTCCACTATGTAGAAATCCTT
CCAGTCAGGGCCATAGGATATACGGTTCAGGTACCAGGGGGCAGAGAGAAGGGCC
CGGAAGCCGGCCTTGGTGACCAGTTCCAGCTCCTTCATATAGTTCACTGGAATATCC
TCTCGCCACACCTGTATGATTGTGTCTGGCTGAATCTTTACTTTATTATCAAACACCT
CCTGCCACACCACATAGCCCTTGCCATAAGAAGAGACGATGTCCAGCAGCGTCTGG -continued

| SEQUENCES |
| --- |
| ATGTAGAAGGACTCCAGCTGCTTGAAGTCCTCACCGAAGCCTTTCTTCCTCATAAAG<br>TCCTGGATCTCTGGGTTGGACTTCCAGCAGGTGAAATCAACCTCATCTCCTCCAAGA<br>TGAAGATAAAAATCTGGGAAGACAGAGCTGACTTCTAAGAAGAATGTGCTCATGAA<br>CTCATAGGTATTATTGAGACTGGGATTCACTGGTCCAAAGGTGCCAGAGGGCTCAG<br>ACCCAGAGTAGCAAGGAGTCAGTAATCCAGGGATACCTGGTCCCCAGGACAAAGTG<br>TGGCCAGGAGTGTCAAACTCTGCAAGCACACGGATACCCCGGAGCCGTGCGTATTC<br>AATGACCTCCTTCACATCCTGTGCTGTGTAGATGTGGGTGACAGGGTTGTAGGACCC<br>CTTTCTCATGAGCTCTGGAAAAGTGAAGCTCTCATATGGGAAGGAAGGATCATCTA<br>CCAGATGCCAGTGGAACACGTTCAATTTATTGTACGCCATGACATCCAGAGTGTCCA<br>GGATGCTAGAGAGTGGCAGGTAATGGCGAGATGTATCCAACAGCAAGCCCCGGTG<br>AGGAAAGCGGGGAAAGTCCTCAATCTCAGTCTTGTTGATAAAGAATGTGCCCTCAG<br>CAGATTTCCAAACAAGCTGGCTAAAAGTCTCCAGACCTCGGAGAGCTCCCCAGACA<br>GTCTCAGAGAGGAGTAAACACTGGTCATCATTTATGGTCAGGGTATAATTCTCCACT<br>GACTCCAAAGTAGGAAGCTGGTTACATCCAGGTGTGACTACAGAGACAACCAACAC<br>ATTCTTCTCCAGTGTATGCCGTTTCCCTGTGAGGTAAGGACGGGGCCAAGACCCGGA<br>ACCGAAAAGCAGGTCACGATAGCGCTGGAAGGCCTCGTCGAGGACTGAGCAGCCG<br>GGCTGCGCGGCCGAGCTGACATCGTACTGGAATTGAAAGTTGTTCGGGTAAAGGAC<br>GTAGCGCTGGTCGGAGGTTTGGAAGTTCTGAGGCCAGGGCCAGAGGGCCGTCGCCC<br>GTCCTGCGAACGCTGCCGCCAGCAGCAGCGAAAACCAAAGCCTGGAACTTGTCATG<br>GTGCTCCACTAGCGCTAGAGCTTGCTCCCGCCCGCCGCGCGCTTCGCTTTTTATAGG<br>GCCGCCGCCGCCGCCGCCTCGCCATAAAAGGAAACTTTCGGAGCGCGCCGCTCTGA<br>TTGGCTGCCGCCGCACCTCTCCGCCTCGCCCCGCCCCGCCCCTCGCCCCCATCGCTG<br>CACAAAATAATTAAAAAATAAATAAATACAAAATTGGGGGTGGGGAGGGGGGGA<br>GATGGGGAGAGTGAAGCAGAACGTGGCCTCGGATCCCCCGGGCTGCAGTATTAATA<br>GTAATCAATTACGGGGTCATTAGTTCATAGCCCATATATGGAGTTCCGCGTTACATA<br>ACTTACGGTAAATGGCCCGCCTGGCTGACCGCCCAACGACCCCCGCCCATTGACGT<br>CAATAATGACGTATGTTCCCATAGTAACGCCAATAGGGACTTTCCATTGACGTCAAT<br>GGGTGGAGTATTTACGGTAAACTGCCCACTTGGCAGTACATCAAGTGTATCATATGC<br>CAAGTACGCCCCCTATTGACGTCAATGACGGTAAATGGCCCGCCTGGCATTATGCCC<br>AGTACATGACCTTATGGGACTTTCCTACTTGGCAGTACATCTACGTATTAGTCATCG<br>CTATTACCATGTCGAGGCCACGTTCTGCTTCACTCTCCCCATCTCCCCCCCCTCCCCA<br>CCCCCAATTTTGTATTTATTTATTTTTTAATTATTTTGTGCAGCGATGGGGGCGAGGG<br>GCGGGGCGGGGCGAGGCGGAGAGGTGCGGCGGCAGCCAATCAGAGCGGCGCGCTC<br>CGAAAGTTTCCTTTTATGGCGAGGCGGCGGCGGCGGCCCTATAAAAAGCGAAG<br>CGCGCGGCGGGCGGGAGCAAGCTCGCTAGCACTAGTGGAGCACCATGGAGCTGTGC<br>GGGCTGGGGCTGCCCCGGCCGCCCATGCTGCTGGCGCTGCTGTTGGCGACACTGCT<br>GGCGGCGATGTTGGCGCTGCTGACTCAGGTGGCGCTGGTGGTGCAGGTGGCGGAGG<br>CGGCTCGGGCCCCGAGCGTCTCGGCCAAGCCGGGGCCGGCGCTGTGGCCCCTGCCG<br>CTCTCGGTGAAGATGACCCCGAACCTGCTGCATCTCGCCCCGGAGAACTTCTACATC<br>AGCCACAGCCCCAATTCCACGGCGGGCCCCTCCTGCACCCTGCTGGAGGAAGCGTT<br>TCGACGATATCATGGCTATATTTTTGGTTTCTACAAGTGGCATCATGAACCTGCTGA<br>ATTCCAGGCTAAAACCCAGGTTCAGCAACTTCTTGTCTCAATCACCCTTCAGTCAGA<br>GTGTGATGCTTTCCCCAACATATCTTCAGATGAGTCTTATACTTTACTTGTGAAAGA<br>ACCAGTGGCTGTCCTTAAGGCCAACAGAGTTTGGGGAGCATTACGAGGTTTAGAGA<br>CCTTTAGCCAGTTAGTTTATCAAGATTCTTATGGAACTTTCACCATCAATGAATCCA<br>CCATTATTGATTCTCCAAGGTTTTCTCACAGAGGAATTTTGATTGATACATCCAGAC<br>ATTATCTGCCAGTTAAGATTATTCTTAAAACTCTGGATGCCATGGCTTTTAATAAGT<br>TTAATGTTCTTCACTGGCACATAGTTGATGACCAGTCTTTCCCATATCAGAGCATCA<br>CTTTTCCTGAGTTAAGCAATAAAGGAAGCTATTCTTTGTCTCATGTTTATACACCAA<br>ATGATGTCCGTATGGTGATTGAATATGCCAGATTACGAGGAATTCGAGTCCTGCCA<br>GAATTTGATACCCCTGGGCATACACTATCTTGGGGAAAAGGTCAGAAAGACCTCCT<br>GACTCCATGTTACAGTAGACAAAACAAGTTGGACTCTTTTGGACCTATAAACCCTAC<br>TCTGAATACAACATACAGCTTCCTTACTACATTTTTCAAAGAAATTAGTGAGGTGTT<br>TCCAGATCAATTCATTCATTTGGGAGGAGATGAAGTGGAATTTAAATGTTGGGAAT<br>CAAATCCAAAAATTCAAGATTTCATGAGGCAAAAAGGCTTTGGCACAGATTTTAAG<br>AAACTAGAATCTTTCTACATTCAAAAGGTTTTGGATATTATTGCAACCATAAACAAG<br>GGATCCATTGTCTGGCAGGAGGTTTTTGATGATAAAGCAAAGCTTGCGCCGGGCAC<br>AATAGTTGAAGTATGGAAAGACAGCGCATATCCTGAGGAACTCAGTAGAGTCACAG<br>CATCTGGCTTCCCTGTAATCCTTTCTGCTCCTTGGTACTTAGATTTGATTAGCTATGG<br>ACAAGATTGGAGGAAATACTATAAAGTGGAACCTCTTGATTTTGGCGGTACTCAGA<br>AACAGAAACAACTTTTCATTGGTGGAGAAGCTTGTCTATGGGGAGAATATGTGGAT<br>GCAACTAACCTCACTCCAAGATTATGGCCTCGGGCAAGTGCTGTTGGTGAGAGACT<br>CTGGAGTTCCAAAGATGTCAGAGATATGGATGACGCCTATGACAGACTGACAAGGC<br>ACCGCTGCAGGATGGTCGAACGTGGAATAGCTGCACAACCTCTTTATGCTGGATATT<br>GTAACCATGAGAACATGTAACTCGAGGCGGCCGCTCTAGAGATCTTTTTCCCTCTGC<br>CAAAAATTATGGGGACATCATGAAGCCCCTTGAGCATCTGACTTCTGGCTAATAAA<br>GGAAATTTATTTTCATTGCAATAGTGTGTTGGAATTTTTTGTGTCTCTCACTCGGCAT<br>GCTGGGGAGAGATCTGAGGAACCCCTAGTGATGGAGTTGGCCACTCCCTCTCTGCG<br>CGCTCGCTCGCTCACTGAGGCCGCCCGGGCAAAGCCCGGGCGTCGGGCGACCTTTG<br>GTCGCCCGGCCTCAGTGAGCGAGCGAGCGCGCAGAGAGGGAGTGGCCATGCAGCC<br>AGCTGGCGTAATAGCGAAGAGGCCCGCACCGATCGCCCTTCCCAACAGTTGCGTAG<br>CCTGAATGGCGAATGGCGCGACGCGCCCTGTAGCGGCGCATTAAGCGCGGCGGGTG<br>TGGTGGTTACGCGCAGCGTGACCGCTACACTTGCCAGCGCCCTAGCGCCCGCTCCTT<br>TCGCTTTCTTCCCTTCCTTTCTCGCCACGTTCGCCGGCTTTCCCCGTCAAGCTCTAAA<br>TCGGGGGCTCCCTTTAGGGTTCCGATTTAGTGCTTTACGGCACCTCGACCCCAAAAA<br>ACTTGATTAGGGTGATGGTTCACGTAGTGGGCCATCGCCCTGATAGACGGTTTTTCG<br>CCCTTTGACGTTGGAGTCCACGTTCTTTAATAGTGGACTCTTGTTCCAAACTGGAAC |

-continued

| SEQUENCES |
| --- |
| AACACTCAACCCTATCTCGGTCTATTCTTTTGATTTATAAGGGATTTTGCCGATTTCG<br>GCCTATTGGTTAAAAAATGAGCTGATTTAACAAAAATTTAACGCGAATTTTAACAA<br>AATATTAACGTTTACAATTTCCTGATGCGGTATTTTCTCCTTACGCATCTGTGCGGTA<br>TTTCACACCGCATATGGTGCACTCTCAGTACAATCTGCTCTGATGCCGCATAGTTAA<br>GCCAGCCCCGACACCCGCCAACACCCGCTGACGCGCCCTGACGGGCTTGTCTGCTC<br>CCGGCATCCGCTTACAGACAAGCTGTGACCGTCTCCGGGAGCTGCATGTGTCAGAG<br>GTTTTCACCGTCATCACCGAAACGCGCGAGACGAAAGGGCCTCGTGATACGCCTAT<br>TTTTATAGGTTAATGTCATGATAATAATGGTTTCTTAGACGTCAGGTGGCACTTTTC<br>GGGGAAATGTGCGCGGAACCCCTATTTGTTTATTTTTCTAAATACATTCAAATATGT<br>ATCCGCTCATGAGACAATAACCCTGATAAATGCTTCAATAATATTGAAAAAGGAAG<br>AGTATGAGTATTCAACATTTCCGTGTCGCCCTTATTCCCTTTTTTGCGGCATTTTGCC<br>TTCCTGTTTTTGCTCACCCAGAAACGCTGGTGAAAGTAAAAGATGCTGAAGATCAGT<br>TGGGTGCACGAGTGGGTTACATCGAACTGGATCTCAACAGCGGTAAGATCCTTGAG<br>AGTTTTCGCCCCGAAGAACGTTTTCCAATGATGAGCACTTTTAAAGTTCTGCTATGT<br>GGCGCGGTATTATCCCGTATTGACGCCGGGCAAGAGCAACTCGGTCGCCGCATACA<br>CTATTCTCAGAATGACTTGGTTGAGTACTCACCAGTCACAGAAAAGCATCTTACGGA<br>TGGCATGACAGTAAGAGAATTATGCAGTGCTGCCATAACCATGAGTGATAACACTG<br>CGGCCAACTTACTTCTGACAACGATCGGAGGACCGAAGGAGCTAACCGCTTTTTTG<br>CACAACATGGGGGATCATGTAACTCGCCTTGATCGTTGGGAACCGGAGCTGAATGA<br>AGCCATACCAAACGACGAGCGTGACACCACGATGCCTGTAGCAATGGCAACAACGT<br>TGCGCAAACTATTAACTGGCGAACTACTTACTCTAGCTTCCCGGCAACAATTAATAG<br>ACTGGATGGAGGCGGATAAAGTTGCAGGACCACTTCTGCGCTCGGCCCTTCCGGCT<br>GGCTGGTTTATTGCTGATAAATCTGGAGCCGGTGAGCGTGGGTCTCGCGGTATCATT<br>GCAGCACTGGGGCCAGATGGTAAGCCCTCCCGTATCGTAGTTATCTACACGACGGG<br>GAGTCAGGCAACTATGGATGAACGAAATAGACAGATCGCTGAGATAGGTGCCTCAC<br>TGATTAAGCATTGGTAACTGTCAGACCAAGTTTACTCATATATACTTTAGATTGATT<br>TAAAACTTCATTTTTAATTTAAAAGGATCTAGGTGAAGATCCTTTTTGATAATCTCA<br>TGACCAAAATCCCTTAACGTGAGTTTTCGTTCCACTGAGCGTCAGACCCCGTAGAAA<br>AGATCAAAGGATCTTCTTGAGATCCTTTTTTTCTGCGCGTAATCTGCTGCTTGCAAA<br>CAAAAAAACCACCGCTACCAGCGGTGGTTTGTTTGCCGGATCAAGAGCTACCAACT<br>CTTTTTCCGAAGGTAACTGGCTTCAGCAGAGCGCAGATACCAAATACTGTCCTTCTA<br>GTGTAGCCGTAGTTAGGCCACCACTTCAAGAACTCTGTAGCACCGCCTACATACCTC<br>GCTCTGCTAATCCTGTTACCAGTGGCTGCTGCCAGTGGCGATAAGTCGTGTCTTACC<br>GGGTTGGACTCAAGACGATAGTTACCGGATAAGGCGCAGCGGTCGGGCTGAACGG<br>GGGGTTCGTGCACACAGCCCAGCTTGGAGCGAACGACCTACACCGAACTGAGATAC<br>CTACAGCGTGAGCATTGAGAAAGCGCCACGCTTCCCGAAGGGAGAAAGGCGGACA<br>GGTATCCGGTAAGCGGCAGGGTCGGAACAGGAGAGCGCACGAGGGAGCTTCCAGG<br>GGGAAACGCCTGGTATCTTTATAGTCCTGTCGGGTTTCGCCACCTCTGACTTGAGCG<br>TCGATTTTTGTGATGCTCGTCAGGGGGGCGGAGCCTATGGAAAAACGCCAGCAACG<br>CGGCCTTTTTACGGTTCCTGGCCTTTTGCTGGCCTTTTGCTCACATGTTCTTTCCTGC<br>GTTATCCCCTGATTCTGTGGATAACCGTATTACCGCCTTTGAGTGAGCTGATACCGC<br>TCGCCGCAGCCGAACGACCGAGCGCAGCGAGTCAGTGAGCGAGGAAGCGGAAGAG<br>CGCCCAATACGCAAACCGCCTCTCCCCGCGCGTTGGCCGATTCATTAATGCAGCTGG<br>GCTGCAGGGGGGGGGGGGGGGGGGGGTGGGGGGGGGGGGGGGGGG |

What is claimed is:

1. An isolated nucleic acid construct, comprising (i) a first expression cassette, comprising a nucleic acid encoding a hexosaminidase alpha-subunit, and (ii) a second expression cassette, comprising a nucleic acid encoding a hexosaminidase beta-subunit, wherein the first expression cassette and the second expression cassette are operably linked by a bidirectional promoter, wherein the bidirectional promoter comprises two chicken 3-actin (CBA) promoters, and wherein the first expression cassette and the second expression cassette are flanked by adeno-associated virus (AAV) inverted terminal repeats (ITRs), and wherein the isolated nucleic acid construct comprises a sequence set forth in any one of SEQ ID NOs: 3-5 and 7-9.

2. An isolated nucleic acid comprising the sequence set forth in any one of SEQ ID NOs: 3-9.

3. A recombinant AAV (rAAV) comprising:

(i) a capsid protein; and (ii) a nucleic acid comprising a first expression cassette comprising a nucleic acid encoding a hexosaminidase alpha-subunit as set forth in any one of SEQ ID NOs: 3-5 and 7-9, and a second expression cassette comprising a nucleic acid encoding a hexosaminidase beta-subunit as set forth in any one of SEQ ID NOs: 3-5 and 7-9, wherein the first expression cassette and the second expression cassette are operably linked by a bidirectional promoter, wherein the bidirectional promoter comprises two chicken β-actin (CBA) promoters, and wherein the first expression cassette and the second expression cassette are flanked by adeno-associated virus (AAV) inverted terminal repeats (ITRs).

4. The rAAV of claim 3, wherein the capsid protein is of a serotype selected from AAV1, AAV2, AAV3, AAV4, AAV5, AAV6, AAV7, AAV8, AAVrh8, AAV9, AAV10, AAVrh10, and AAV.PHP.B.

5. The rAAV of claim 3, wherein the nucleic acid comprises an ITR selected from the group consisting of AAV 1 ITR, AAV2 ITR, AAV3 ITR, AAV4 ITR, AAV5 ITR, or AAV6 ITR.

6. A host cell comprising the nucleic acid of claim 1.

7. The host cell of claim 6, wherein the host cell is a mammalian cell, yeast cell, bacterial cell, insect cell, plant cell, or fungal cell.

8. An isolated nucleic acid construct, comprising (i) a first expression cassette, comprising a nucleic acid encoding a hexosaminidase alpha-subunit, and (ii) a second expression cassette, comprising a nucleic acid encoding a hexosaminidase beta-subunit, wherein the first expression cassette and the second expression cassette are flanked by adeno-associated virus (AAV) inverted terminal repeats (ITRs), and wherein the isolated nucleic acid construct comprises the sequence set forth in SEQ ID NO: 6.

9. A host cell comprising the nucleic acid of claim 8.

10. The host cell of claim 9, wherein the host cell is a mammalian cell, yeast cell, bacterial cell, insect cell, plant cell, or fungal cell.

* * * * *